US012691656B2

(12) United States Patent
Schalk et al.

(10) Patent No.: US 12,691,656 B2
(45) Date of Patent: Jul. 28, 2026

(54) FORMING STATION WITH GUIDE WALL

(71) Applicant: Sprick GmbH Bielefelder Papier- und Wellpappenwerke & Co., Bielefeld (DE)

(72) Inventors: Bastian Schalk, Detmold (DE); Erik Albert, Horn-Bad Meinberg (DE); Vitali Krebs, Ahlen (DE)

(73) Assignee: Sprick GmbH Bielefelder Papier- und Wellpappenwerke & Co., Bielefeld (DE)

( * ) Notice: Subject to any disclaimer, the term of this patent is extended or adjusted under 35 U.S.C. 154(b) by 55 days.

(21) Appl. No.: 18/695,978

(22) PCT Filed: Sep. 28, 2022

(86) PCT No.: PCT/EP2022/076996
§ 371 (c)(1),
(2) Date: Mar. 27, 2024

(87) PCT Pub. No.: WO2023/052433
PCT Pub. Date: Apr. 6, 2023

(65) Prior Publication Data

US 2024/0416610 A1 Dec. 19, 2024

(30) Foreign Application Priority Data

Sep. 28, 2021 (DE) ......................... 102021125092.7
Sep. 28, 2021 (DE) ......................... 102021125103.6
Sep. 28, 2021 (DE) ......................... 102021125142.7

(51) Int. Cl.
*B31D 5/00* (2017.01)
*B65D 81/113* (2006.01)

(52) U.S. Cl.
CPC .......... *B31D 5/0052* (2013.01); *B65D 81/113* (2013.01); *B31D 2205/0023* (2013.01);
(Continued)

(58) Field of Classification Search
CPC .. B31D 5/0073; B31D 5/0052; B31D 5/0043; B31D 2205/0023; B31D 2205/0047;
(Continued)

(56) References Cited

U.S. PATENT DOCUMENTS 5,873,809 A 2/1999 Kempster et al.
5,906,569 A * 5/1999 Ratzel .................... B26D 1/245 493/464
2011/0053751 A1* 3/2011 Arora .................. B31D 5/0047 493/464

FOREIGN PATENT DOCUMENTS

DE 102017002325 A1 9/2018
DE 102017109330 A1 11/2018
(Continued)

OTHER PUBLICATIONS

Jun. 1, 2022 (DE) Office Action—App. 102021125092.7.
Jun. 16, 2023 (PCT) International Search Report and Written Opinion—App. PCT/EP2022/076996.

*Primary Examiner* — Thomas M Wittenschlaeger
(74) *Attorney, Agent, or Firm* — Banner & Witcoff, Ltd.

(57) ABSTRACT

An apparatus for mechanically producing a three-dimensional packaging product from a web-shaped starting material (e.g., paper starting material); may include a forming station with a convergence channel for transversely compressing (e.g., turning-in or rolling-in) the starting material, and a conveying device for drawing off the starting material from a supply of starting material which is arrangeable upstream of the forming station in the conveying direction. The forming station a may have mounting plate, on a guide side thereof, which is facing the convergence channel. The starting material entering the forming station is guided. The mounting plate may have at least one drive means of the conveying device rotatably mounted thereon, and a motor driving the at least one drive means may be further attached.

22 Claims, 19 Drawing Sheets

(52) U.S. Cl.
CPC ................ *B31D 2205/0047* (2013.01); *B31D 2205/0082* (2013.01); *B65D 2581/053* (2013.01)

(58) Field of Classification Search
CPC .... B31D 2205/0064; B31D 2205/0082; B65D 81/113; B65D 2581/053
See application file for complete search history.

(56) References Cited

FOREIGN PATENT DOCUMENTS

| | | | |
|---|---|---|---|
| DE | 102018110595 | A1 | 12/2018 |
| GB | 2549257 | A | 10/2017 |
| WO | 9531296 | A2 | 11/1995 |
| WO | 2020176257 | A1 | 9/2020 |
| WO | 2020205193 | A1 | 10/2020 |

* cited by examiner

FORMING STATION WITH GUIDE WALL

CROSS REFERENCE TO RELATED APPLICATIONS

This patent application is a U.S. National Stage Application of International Application No. PCT/EP2022/076996, filed Sep. 28, 2022, which claims priority to German Patent Application No. 10 2021 125 103.6, filed Sep. 28, 2021, German Patent Application No. 10 2021 125 142.7, filed Sep. 28, 2021, and German Patent Application No. 10 2021 125 092.7, filed Sep. 28, 2021. Each of these applications is incorporated herein by reference in its entirety.

BACKGROUND

Field

The present disclosure relates to an apparatus for mechanically producing a three-dimensional packaging product from a web-shaped starting material, in particular paper starting material. Furthermore, the disclosure relates to a system comprising an apparatus according to the disclosure and a web-shaped starting material. Furthermore, the disclosure relates to a packaging product produced by means of an apparatus or system according to the disclosure.

Related Art

Generic packaging products are flexible and shock-absorbent and are used to be filled into transport crates or cartons in order to protect transport items. Accordingly, a packaging product can also be referred to as a shock-absorbing filling material product. A three-dimensional packaging product is formed by forming a two-dimensional starting material in a predetermined manner to produce the three-dimensional packaging product in an infinitely repeatable manner.

Paper material in particular is used for the web-shaped starting material. Waste paper is increasingly being used for the paper material, mainly for ecological reasons, which, however, due to its inhomogeneity is difficult to form, especially if the three-dimensional packaging product is always to be produced uniformly and as simply and economically as possible. The web-shaped starting material—which can also be referred to as packaging material web—can be made of paper, such as recycled paper, in particular waste paper and/or 100% recyclable paper, which can be produced without chemical ingredients. Recycled paper may include paper materials with a low proportion (less than 50%) of fresh fiber-containing paper material. For example, paper materials containing 70% to 100% waste paper are used. The recycled paper in the sense of the present disclosure can be paper material that can have a tensile strength index along the machine direction of at most 90 Nm/g, preferably a tensile strength of 15 Nm/g to 60 Nm/g, and a tensile strength index transversely to the machine direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. Additionally, or alternatively, a recycled paper property or waste paper property can be characterized by the so-called burst resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a basis weight of, in particular, 40 g/m$^2$ to max. 140 g/m$^2$. The starting material can be in the form of a material web roll or a zigzag-folded packaging material stack, also known as a leporello-stack.

An example of a generic packaging product is given in EP 2 711 167 B1. In a first forming step, according to EP 2 711 167 B1, the longitudinal edge strips of the material web are substantially loosely rolled inwards. In a central connecting section or central area, which connects the two rolled-up longitudinal edge strips of the paper web section and which each realize a crumpled cavity, an embossing is introduced for stiffening and fixing the longitudinal edge strips of the packaging product, which is formed by a sequence of valley- and projection sections. In this way, the laterally rolled-up cushion section, which delimits a cavity for forming a crumple zone, is to be substantially thicker than the embossed central region. Perforations can also be introduced into the embossed deformation or attaching zone in the central region to cause the superimposed web layers to interlock.

A generic apparatus for mechanically producing a three-dimensional packaging product is known from WO95/31296. This comprises a forming station with a channel tapering in the conveying direction for transversely compressing web-shaped starting material. Three pairs of drive wheels are integrated in the forming station, which are responsible for drawing in and conveying the starting material. Downstream of the forming station, an embossing station with two embossing wheels is arranged, by means of which a central section of the transversely compressed packaging product is deformed and embossed. The apparatus further includes a motor that drives both the embossing wheels as well as the three pairs of drive wheels. Here, the driving force is transmitted first to the embossing wheels and finally to the drive wheels via a belt transmission. Thereby, the transmission is to be adjusted so that the drive wheels impart a greater conveying speed to the starting material than the embossing wheels, so that the starting material is compressed in the conveying direction.

A disadvantage of the apparatus from WO95/31296 is that the large number of conveying wheel pairs used in combination with the transmission of the drive forces via a belt transmission increase the installation space requirement of the apparatus. Furthermore, it has been found that the compression of the starting material in the conveying direction increases the risk of blockages in the apparatus. In particular, it has been found that the reduction of the risk of jamming on the one hand and the reduction of the installation space requirement on the other hand represent a conflict of interests which could not be satisfactorily resolved prior to the present disclosure.

Despite the high number of wheel pairs driving the material web, it has been found that the apparatus from WO95/31296 does not allow reliable drawing-in of the starting material. In particular, during drawing off from the outside of a material web roll, in particular from a horizontal material web roll, the reliability of the drawing off has been found to be insufficient. In addition, it has been found that driving the three pairs of wheels and the embossing station requires a large amount of installation space. In particular, it has been found that increasing the drive power, for example via more powerful and larger motors, to increase the reliability of the draw-in on the one hand and reducing the installation space requirement, for example by using smaller motors, represent a conflict of interests which could not be satisfactorily resolved prior to the present disclosure. In addition, it has been found that the apparatus of WO95/31296 is prone to dust formation to an increased degree.

A further generic apparatus for mechanically producing a three-dimensional packaging product is known from GB 2 549 257 A. This comprises a forming station with a channel tapering in the conveying direction for transversely compressing web-shaped starting material. Furthermore, a conveying and embossing station is provided downstream of the forming station, which draws the starting material from a material web supply through the forming station and embosses the material transversely compressed by the forming station. For dust removal, a cover portion of the conveying and embossing station and a cover part of the preforming station shall be pivotable in opposite directions to each other. In addition, to assist in drawing-in of the starting material, it shall be possible to provide another conveying device in the preforming station.

However, it has been found that the further conveying device from GB 2 549 257 A installed in the forming station does not allow reliable drawing-in of the starting material from the material web supply. In particular, during drawing off of the starting material from the outside of a material web roll, in particular a horizontal material web roll, even the combination of the two conveying devices used in GB 2 549 257 A has proven to be insufficient for reliable drawing off of the starting material. Furthermore, in particular the threading-in of starting material into the device of GB 2 549 257 A as well as the dust removal has proven to be complicated. A further disadvantage is the large dimensioning of the apparatus from GB 2 549 257. Furthermore, the device from GB 2 549 257 A tends to form dust.

The inventors of the present disclosure have further recognized that there is a need for small packaging products, i.e., those reduced in width dimension transversely to the longitudinal extension, because these are easier to integrate in narrow volumes to be cushioned out in packaging cartons or bags. In the past, packaging products of the generic shape with an undulating, longitudinally extending embossing section and lateral symmetrically adjoining tube-shaped crumpled cavities produced by one-piece forming of a web-shaped starting material have always been produced to a fairly uniform size, wherein the constraints of the starting material as well as of the apparatuses provided for their production, have not permitted a width of less than 15 cm. The inventors of the present disclosure have now succeeded in creating apparatuses by means of which packaging products of the above structure with a width of less than 15 cm can be manufactured. Furthermore, they have succeeded in significantly reducing the dimensioning of the apparatus compared to previous apparatuses.

In particular, because of the complicated force guidance of the belt transmission, the apparatus in WO95/31296 cannot easily be redesigned to meet the high demand for small paper packaging products and/or apparatus that are delimited in their installation space.

In particular, because of the complicated structure with two embossing zones and two covers of the preforming station and embossing station which are pivotable in opposite directions, the apparatus from GB 2 549 257 A cannot easily be redesigned to meet the high demand for small paper packaging products and/or apparatuses that are limited in their installation space.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

FIG. 1: A side view of an apparatus for mechanically producing a three-dimensional packaging product from web-shaped starting material provided in a material web roll;

FIG. 2: A side view of an apparatus for mechanically producing a three-dimensional packaging product from web-shaped starting material provided in a leporello-stack;

FIG. 3: A schematic representation of an exemplary embodiment of a packaging product according to the disclosure;

FIG. 4: A perspective sectional-side view of an apparatus with forming station in operating position;

FIG. 5: Another sectional-side view of the forming station of FIG. 4 in operating position;

FIG. 6: A perspective side view of the forming station of FIG. 4 in operating position;

FIG. 7: A side view of the forming station of FIG. 4 in the releasing position;

FIG. **8*a*: A view from the rear of the forming station in the releasing position shown in FIG. 7**;

FIG. **8*b*: A perspective view from the side of an, compared to FIG. 8*a***, alternative forming station in releasing position;

FIG. 9: A perspective view from the side of the forming station of FIG. **8*a*** in a less wide open releasing position;

FIG. 10: A perspective view from the side of an, compared to FIG. 6, alternative forming station in the closed position;

FIG. 11: A perspective sectional view from the rear in the forming station of FIG. 6 in operating position;

FIG. 12: A detailed view of a pressing device from FIG. 11;

FIG. 13: A perspective sectional view from the rear in an, compared to FIG. 10, alternative forming station in operating position;

FIG. 14: Another perspective sectional view of the forming station of FIG. 13 in operating position;

FIG. **15*a***: A top view of a schematically illustrated apparatus with conveying rollers;

FIG. **15*b***: A top view of a schematically illustrated apparatus with conveying rollers;

FIGS. 16 to 20: Alternative embodiments of conveying devices of the forming station;

FIG. 21: A perspective sectional view from the rear of an, compared to FIGS. 4 and 5, alternative forming station in operating position;

FIG. 22: Another perspective sectional view of the forming station of FIG. 21 in operating position;

FIGS. 23 to 27: Alternative embodiments of conveying devices of the forming station.

FIG. 28: A perspective side view of the forming station of FIG. 4 in operating position;

FIG. 29: A side view of the forming station of FIG. 4 in the releasing position;

FIG. 30: A rear view in the forming station in the releasing position shown in FIG. 29;

FIG. 31: A perspective view from the side of an, comparted to FIG. 30, alternative forming station in the releasing position;

FIG. 32: A perspective view from the side of the forming station of FIG. 31 in a less wide open releasing position;

FIG. 33: A perspective view from the side of an, compared to FIG. 28, alternative forming station in the closed position;

FIG. 34: A perspective sectional view from the rear in the forming station of FIG. 28 in operating position;

FIG. 35: A detailed view of a pressing device of FIG. 33; and

FIG. 36: A top view of a schematically illustrated apparatus with conveying rollers.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

The object of the present disclosure is to overcome the disadvantages of the prior art, in particular to improve an apparatus for producing a three-dimensional packaging product from a web-shaped starting material in such a way that the risk of jam generation is reduced and/or that the apparatus is optimized in terms of installation space, and/or that the reliability of the feeding of starting material is increased without increasing the required installation space for the apparatus or the risk of material jams, and/or that it simplifies the threading-in of starting material into the forming station and the dust removal, a reliable feeding of the material web is enabled and/or the apparatus is optimized in terms of installation space.

Accordingly, an apparatus is provided for producing a three-dimensional packaging product, such as a cushioning product, from a web-shaped starting material, such as a single- or multi-layered paper web, in particular paper. Producing a three-dimensional packaging product is to be understood in particular as the conversion of a web-shaped starting material into a state having a greater extension in the starting material thickness direction compared to the starting material. Waste paper is increasingly being used for the paper material, mainly for ecological reasons, which, however, due to its inhomogeneity is difficult to form, especially if the three-dimensional packaging product is always to be produced uniformly and as simply and economically as possible.

The starting material web can be made of paper, such as recycled paper, in particular waste paper and/or 100% recyclable paper, which can be produced without chemical ingredients. Recycled paper may include paper materials with a low percentage (less than 50%) of fresh fiber-containing paper material. For example, paper materials containing 70% to 100% recycled paper are used. The recycled paper in the sense of the present disclosure can be paper material that can have a tensile strength index along the machine direction of at most 90 Nm/g, preferably a tensile strength of 15 Nm/g to 60 Nm/g, and a tensile strength index transversely to the machine direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. Additionally, or alternatively, a recycled paper property or waste paper property can be characterized by the so-called burst resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a basis weight of, in particular, 40 g/m$^2$ to max. 140 g/m$^2$. The starting material can be in the form of a material web roll or a zigzag-folded packaging material stack, also known as a leporello-stack.

The apparatus can basically be dimensioned and arranged in such a way that it is miniaturized, i.e. significantly smaller in size than corresponding apparatuses in the prior art and/or capable of producing significantly smaller packaging products. Thus, the need for small packaging products can be satisfied. On the other hand, apparatuses according to the disclosure meet the demand for increasingly smaller available storage areas for such apparatuses. For example, as a rule of thumb for the overall dimensions of apparatuses according to the disclosure, it has been required that they not exceed the outer dimension of a standard industrial pallet. For example, apparatuses according to the disclosure have an overall dimension of less than 650 mm length in conveying direction, of less than 450 mm width transversely to the conveying direction, and of less than 300 mm height transversely to the conveying- and width direction. The apparatus according to the disclosure may be arranged to produce small or miniature packaging products or cushions. Such small or miniature packaging products may have a length in conveying direction of less than 30 mm, a width of less than 120 mm, in particular in the range of 80 to 90 mm, and a height of less than 40 mm, in particular in the range of 20 to 30 mm.

A first aspect of the disclosure relates to an apparatus for mechanically producing a three-dimensional packaging product from a web-shaped starting material, in particular paper starting material. The apparatus comprises a forming station with a convergence channel for transversely compressing, in particular turning-in or rolling-in, of the starting material, and a conveying device for drawing off the starting material from a starting material supply which is arrangeable upstream of the forming station in the conveying direction. Furthermore, the forming station comprises a mounting plate, on a guide side thereof, which is facing the convergence channel, starting material entering the forming station is guided and on which at least one drive means of the conveying devices is rotatably mounted and a motor driving the at least one drive means is attached.

Surprisingly, it has been found that by the use of the mounting plate according to the disclosure the installation space requirements of the apparatus can be reduced without increasing the risk of material jams. It has been found that the functional union of mounting plate for attaching the motor and the at least one drive means and guiding the starting material entering the forming station on the guide side of the mounting plate resolves the previous conflict of objectives between keeping the apparatus as small as possible and the jam risk as low as possible. For example, by mounting the drive and the at least one drive means on the mounting plate, which also serves as the guide side, it was possible to dispense with a belt guide that requires a lot of installation space. The installation space thus saved could in turn be used for larger motors and/or drive means, which had a positive effect on the jam risk. It has also been shown that mounting the motor and drive means on the mounting plate, which also serves for guiding the starting material, makes sense for reasons of installation space efficiency, since guiding the initially web-shaped starting material requires a large extension of the guide side in the conveying direction and in the starting material width direction. This large extension can be used advantageously to planarly distribute components, such as drive means and motors, on the mounting plate and thus reduce the installation space required by the apparatus in the starting material thickness direction.

In an exemplary embodiment, the mounting plate is formed in a trapezoidal shape. In an exemplary embodiment, the mounting plate tapers in the conveying direction, in particular trapezoidally. In an exemplary embodiment, the guide side is the side of the mounting plate facing the guide channel in the starting material thickness direction. In particular, a mounting plate is to be understood as a guide wall to which at least one drive means of the conveying device is rotatably mounted and a motor driving the at least one drive means is attached.

By guiding the starting material through the guide side, it is to be understood that the starting material contacts or is guided close to the guide side when entering the convergence channel, in particular before it is transversely compressed. Close means in particular a distance of the starting material from the guide side of less than 20 mm, 16 mm, 12 mm or 8 mm. In an exemplary embodiment, the guiding of the starting material at the guide side is realized in particular by the force transmission contact between the at least one drive means and the starting material, when it is conveyed through the apparatus, being spaced apart from the guide side by a maximum of 20 mm, 16 mm, 12 mm or 8 mm in the starting material thickness direction. Alternatively, to the definition of the guide side by the guiding of the starting material, the guide side can also be defined as the side delimiting the convergence channel in the starting material thickness direction, on which the starting material is supported during transversely compressing in the starting material thickness direction. In particular, the guide side is the side on which the central region of the starting material is supported when the longitudinal edge strips of the starting material are turned-in in the starting material thickness direction during transversely compressing. Alternatively, the guide side may be defined as the side facing the convergence channel in the starting material thickness direction of that limiting wall which delimits the convergence channel in the starting material thickness direction and which is closest to the starting material when it enters the convergence channel in the starting material thickness direction. In an exemplary embodiment, the guide side is defined as the side facing the convergence channel in the starting material thickness direction of that guide wall which delimits the convergence channel in the direction of gravity.

In an exemplary embodiment, the at least one drive means and/or the motor is attached to a mounting side of the mounting plate facing away from the convergence channel in the starting material thickness direction. In particular, the mounting side is the side of the mounting plate opposite the guide side. In an exemplary embodiment, the mounting side and the guide side extend parallel to each other.

In an exemplary embodiment, the guide side and/or the mounting side extend planarly, in particular trapezoidally. In an exemplary embodiment, the guide side and/or the mounting side each taper in the conveying direction, in particular trapezoidally. In particular, the guide side and the mounting side extend in the conveying direction and in the starting material width direction.

By attaching the motor to the mounting plate, the weight of the adjustable limiting wall and thus the weight force acting on the rotatable drive means via the adjustable limiting wall described below can be better adjusted, which has a positive effect on the risk of material jams.

Producing a three-dimensional packaging product is to be understood in particular as the conversion of a web-shaped starting material into a state having a greater extension in the starting material thickness direction compared to the starting material. This can be achieved, for example, by transversely compressing as described above and below. The compression may be followed by the attachment of longitudinal strips that have been turned-in or rolled-in during transversely compressing. For this purpose, the apparatus has in particular an embossing and/or perforating station arranged downstream of the forming station.

By the conveying direction in particular the direction is to be understood in which the starting material is drawn off during operation from the starting material supply, such as a starting material roll, in particular in the form of a coreless roll, or a leporello-stack, and conveyed through the apparatus. This direction may also be referred to as the starting material longitudinal direction.

The starting material width direction means in particular the direction in which the starting material extends between longitudinal edges of the web-shaped starting material. In particular, the longitudinal edges extend in the conveying direction. In particular, the starting material width direction is the direction in which the starting material is transversely compressed as it is conveyed through the forming station.

A web-shaped starting material is to be understood in particular as a starting material which extends in particular planarly along the starting material longitudinal direction (conveying direction) and the starting material width direction. In particular, orthogonally to an area defined by the starting material longitudinal direction and the starting material width direction, the web-shaped starting material extends in a starting material thickness direction. In particular, the extension, in particular strength or thickness, of the web-shaped starting material in the starting material thickness direction is significantly smaller than the extension, in particular width, of the web-shaped starting material in the starting material width direction. By significantly smaller it is to be understood in particular an extension in the starting material thickness direction of at most 20%, 10%, 5%, 3%, 2%, 1% or 0.5% of the extension of the starting material in the starting material width direction.

In particular, the starting material longitudinal direction, the starting material width direction and the starting material thickness direction define a coordinate system with three mutually orthogonal directions, also known as a Cartesian coordinate system. In particular, in embodiments in which the starting material is redirected, the coordinate system travels with the starting material. For example, in one embodiment, the starting material may be conveyed in a horizontal direction from the starting material supply to the apparatus. At the apparatus, the starting material may then be redirected in a horizontal direction in which it passes through the apparatus. In this case, prior to entering the forming station, the conveying direction corresponds to a vertical direction and the starting material thickness- and width direction correspond to horizontal directions, respectively. Within the apparatus, the conveying direction and starting material width direction each correspond to a horizontal direction, and the starting material thickness direction corresponds to a vertical direction.

Information on features of the apparatus and its components, such as the forming station, made with respect to conveying direction, starting material thickness direction and/or starting material width direction therefore always refers to the coordinate system as it is aligned at conveying direction height of the corresponding component or a section of the component.

Since the directions in which the starting material extends in width and thickness can change and partially overlap during and after transversely compressing, the traveling coordinate system is determined in the state of the starting material before its transversely compressed, in particular in the starting material supply, between the starting material supply and the apparatus or immediately before the first transverse compression. In particular, the coordinate system is determined upon entering the forming station. In an example where the starting material enters the apparatus horizontally, the conveying direction and the starting material width direction correspond to respective horizontal directions extending orthogonal to each other, and the starting material thickness direction corresponds to a vertical direction. In this example, if the starting material were to be subsequently redirected in the vertical direction, the coordinate system would correspondingly move with the starting material or the transversely compressed material, so that subsequently the starting material thickness direction and the starting material width direction would each correspond to respective horizontal directions extending orthogonal to each other, and the conveying direction would correspond to a vertical direction.

In particular, within the forming station, the starting material width direction can alternatively be referred to as the convergence direction. The convergence direction extends in particular orthogonally to the conveying direction and describes the direction in which the extension of the convergence channel decreases in the conveying direction, in particular due to the channel tapering in the conveying direction. Alternatively, or additionally, the starting material thickness direction can be referred to as the normal direction, particularly within the forming station. The normal direction is the direction describing a normal to a plane defined by the conveying direction and the convergence direction. It should be understood that all indications made before and below about the starting material width direction and the starting material thickness direction within the apparatus, in particular forming station, can also be made using the convergence direction and the normal direction.

The convergence channel is to be understood in particular as a channel that tapers in the conveying direction. In particular, the convergence channel tapers in a funnel shape in the conveying direction. In particular, the convergence channel is delimited in the starting material thickness direction at least from one side by at least one, limiting wall. In particular, the at least one limiting wall is formed in a funnel shape and/or tapers in a funnel shape, in particular in conveying direction. In particular, the at least one limiting wall extends in a planar manner in the conveying direction and starting material thickness direction, in particular in the operating state. In an exemplary embodiment, the at least one limiting wall is formed by the mounting plate according to the first aspect of the disclosure or by a guide wall according to the second and/or third aspect of the disclosure described further below.

In particular, the at least one limiting wall has two limiting walls which, in particular in the operating state, lie opposite each other in the starting material thickness direction and extend in particular parallel to each other. In particular, both limiting walls are formed trapezoidally and/or taper trapezoidally in conveying direction. In particular, the convergence channel is delimited on both sides by the two limiting walls in the starting material thickness direction, in particular in the operating state. In an exemplary embodiment, one of the two limiting walls is formed by the mounting plate according to the first aspect of the disclosure or by a guide wall according to the second and/or third aspect of the disclosure described further below. The second limiting wall is preferably adjustable, in particular pivotable, between an operating position in which the starting material is transversely compressed as it is conveyed through and a releasing position in which access into the convergence channel is released. This limiting wall is also referred to below as the cover for simplified readability. The guide wall is also referred to hereinafter as the bottom for simplified readability. However, it should be made clear that these terms (cover and bottom) are only for simplified readability and are not intended to impose any mandatory restrictions.

Alternatively, or additionally, the forming station has at least two side walls delimiting the convergence channel in the starting material width direction. In particular, the at least one side wall has two side walls that run toward each other in conveying direction. In particular, the two side walls delimit the convergence channel on both sides in the starting material width direction. In particular, the convergence channel tapers as a result of the side walls running towards each other in the conveying direction, so that the extension of the convergence channel in the starting material width direction is greater, in particular at least 100%, 150%, 200% or 300% greater, at the upstream end of the forming station in the conveying direction than at the downstream end of the forming station in the conveying direction.

In an exemplary embodiment, the forming station has a starting material inlet via which the starting material can be drawn into the forming station, and a starting material outlet via which the transversely compressed starting material can be discharged from the forming station. In particular, the forming station is delimited between the starting material inlet and the starting material outlet by one or more of the previously described limiting walls and/or side walls in the starting material width direction and/or in the starting material thickness direction. In particular, the at least two side walls together with the trapezoidal limiting walls circumferentially delimit the convergence channel in the operating position between the starting material inlet and the starting material outlet. In an exemplary embodiment, the side walls, the adjustable limiting wall and/or the guide wall delimit the convergence channel up to the channel output. In an exemplary embodiment, the channel output is spaced apart by a maximum of 200 mm, 150 mm, 100 mm, 75 mm, 50 mm, 30 mm, 15 mm or 5 mm from an embossing and/or perforating zone of an embossing and/or perforating station adjoining the forming station in the conveying direction. In particular, this allows the transversely compressed starting material to be kept straight up to the embossing and/or perforation zone, which in particular prevents tearing of laterally turned-in longitudinal edge strips and thus the occurrence of tears and paper jams.

As described above and below, the starting material is preferably transversely compressed when passing through the convergence channel. Preferably, transversely compressing is to be understood as turning-in or rolling-in longitudinal strips of the starting material web, in particular for forming external crumpled cavities in the starting material width direction.

For this purpose, the starting material is preferably received and guided in the operating position via a limiting wall, in particular one of the trapezoidal limiting walls described above, and in particular is supported in the starting material thickness direction. In an exemplary embodiment, this limiting wall is formed by the mounting plate according to the first aspect of the disclosure or by a guide wall according to the second and/or third aspect of the disclosure described further below. In an exemplary embodiment, as the starting material is conveyed further through the convergence channel in the conveying direction, the longitudinal edge strips of the starting material which lie on the outside in the starting material width direction push against the side walls and are redirected by them in the starting material thickness direction, in particular turned-in. By means of the side walls running towards each other in conveying direction, the longitudinal edge strips are further redirected in starting material thickness direction as it is conveyed through the convergence channel until they are preferably transferred to turn-over cheeks, at which the redirected longitudinal edge strips are directed back in starting material thickness direction as it is conveyed through. Alternatively, or additionally, rolling-in can occur in that the longitudinal edge strips push against a further limiting wall, in particular the second trapezoidal limiting wall described above, against which the redirected longitudinal edge strips are directed back, in particular rolled-in, as it is conveyed through in the starting material thickness direction.

In an exemplary embodiment, the limiting wall directing back the longitudinal edge strips and/or the limiting wall supporting the turn-over cheeks form the adjustable limiting wall described above. When the adjustable limiting wall is displaced to the releasing position, the region of the convergence channel previously covered by the adjustable limiting wall is released, allowing engagement with the convergence channel.

Alternatively, or additionally, transversely compressing can also be understood as a simple compression, in particular accordion-like compression, of the starting material in the starting material width direction.

In an exemplary embodiment, the at least one drive means rotatably mounted to the mounting plate is at least one conveying wheel and/or at least one conveying roller. The exemplary embodiments of the conveying device explained above and below in connection with the mounting plate can also be applied to the guide wall in connection with the second and/or third aspect of the disclosure. In particular, a conveying roller is understood as a rotatably mounted drive means whose axial extension is greater, preferably at least 10%, 30%, 50%, 70%, 100%, 150%, 200% or 300% greater, than its radial extension. In an exemplary embodiment, the at least one drive means rotatably mounted on the mounting plate comprises at least two drive means rotatably mounted on the mounting plate.

In an exemplary embodiment, the conveying device comprises at least one pair of rotatably mounted drive means, in particular at least one pair of conveying wheels or one pair of conveying rollers, which are preferably braced against one another in the operating position while forming a force transmission contact with the starting material and are spaced apart from one another in the releasing position. In particular, the at least one drive means mounted on the mounting plate forms a drive means of the at least one pair of drive means, wherein preferably the other drive means of the at least one pair of drive means is rotatably mounted on a limiting wall opposite the mounting plate, in particular on the previously described adjustable limiting wall. In an exemplary embodiment, one drive means of the at least one pair of drive means is coupled to the motor, in particular via a gear, in particular a gear train, and the other drive means of the at least one pair of drive means is freely rotatably mounted. In an exemplary embodiment, the at least one drive means mounted on the mounting plate is the drive means coupled to the motor. Alternatively, or additionally, the freely rotatably mounted drive means is mounted on a limiting wall opposite the mounting plate in the starting material thickness direction, in particular on the adjustable limiting wall.

The drive means attached to the mounting plate may be formed as a conveying wheel or conveying roller whose radius is larger than the radius of the drive means mounted on the opposite limiting plate formed as a conveying wheel or conveying roller.

The conveying devices may have at least two of the pairs of drive means described above, in particular pairs of conveying wheels, which are spaced apart from one another, in particular in the starting material width direction, and/or are arranged at the same conveying direction height.

In an exemplary embodiment, the at least one drive means has at least one conveying wheel or conveying roller whose axis of rotation is arranged outside the convergence channel and which projects into the convergence channel through a recess in the mounting plate, in particular projects into by at least 1%, 3%, 5%, 10% or 15% and/or at most 20%, 25%, 30%, 40% or 45% of the radial extension of the at least one drive means beyond the guide side into the convergence channel. In an exemplary embodiment, the at least one drive means projects into the convergence channel in the starting material thickness direction. In an exemplary embodiment, the recess is adapted to the dimension of the at least one drive means in such a way that respectively between the drive means and the recess in the conveying direction and/or in the starting material width direction there is a distance of at least 1 mm, 3 mm, 5 mm or 10 mm and/or at most 15 mm, 20 mm, 25 mm or 30 mm.

In one embodiment, the at least one drive means has at least two drive means, in particular conveying wheels or conveying rollers. In this embodiment, the mounting plate preferably has two of the previously described recesses. In an exemplary embodiment, the at least two conveying wheels and/or recesses are spaced apart from one another in the starting material width direction. In this embodiment, the motor is preferably arranged in the starting material width direction between the two drive means. Alternatively, or additionally, a gear is arranged in starting material width direction between the drive means. In an exemplary embodiment, the gear is attached to the mounting plate, in particular the mounting side. Both the gear and the motor may be arranged in the starting material width direction between the conveying wheels. In an exemplary embodiment, the gear is arranged at the same conveying direction height of the at least two conveying wheels. In an exemplary embodiment, the motor is arranged downstream in the conveying direction of the at least two conveying wheels and/or the gear. The motor output shaft of the motor may extend from the motor upstream in the conveying direction to the gear, and is in particular coupled upstream in the conveying direction to the gear.

The at least one drive means may be rotatably mounted at an upstream end section of the mounting plate in the conveying direction. The upstream end section of the mounting plate in the conveying direction corresponds in particular to the region of the mounting plate that extends in the conveying direction, starting from the upstream end of the mounting plate in the conveying direction by 30%, 25%, 20%, 15% or 10% of the total extension of the mounting plate in the conveying direction.

In an exemplary embodiment, the rotatable mounting of the at least one drive means is realized via a drive shaft extending in particular in the starting material width direction. In particular, the drive shaft is attached to the mounting plate via at least two, in particular three, bearings. The at least one drive means may be flanked by the two bearings in the starting material width direction. The two bearings may be spaced apart from the at least one drive means in the starting material width direction by a maximum of 50 mm, 30 mm, 20 mm or 10 mm. In an embodiment with at least two drive means, one respective bearing is spaced apart from one respective conveying wheel by a maximum of this distance in the starting material width direction. In an embodiment with one conveying roller, preferably one respective bearing is spaced apart by this distance from a respective axial end of the conveying roller. The drive shaft may be coupled to the gear in the starting material width direction between the at least two drive means.

In an exemplary embodiment, the motor has a motor output shaft which extends longitudinally, in particular parallel to the conveying direction. Alternatively, or additionally, the motor output shaft projects out of the motor in the direction opposite to the conveying direction. Alternatively, or additionally, a gear, in particular a reversing gear, is attached to the mounting plate, via which the motor output shaft is coupled to the at least one drive means. In particular, the reversing gear converts the rotary motion of the motor output shaft extending in the conveying direction into a rotary motion of a drive shaft of the at least one drive means extending in the starting material width direction. In an exemplary embodiment, the motor and or the gear are attached to the mounting plate, in particular on the mounting side, in the starting material width direction between two rotatably mounted drive means of the at least one drive means.

In an exemplary embodiment, the mounting plate has a wall thickness of at least 1 mm and at most 12 mm, preferably of at least 2 mm and at most 8 mm, particularly preferably of at least 2.5 mm at most 3.5 mm. Alternatively or additionally, the mounting plate has a flexural fatigue strength of at least 80 $N/mm^2$, 160 $N/mm^2$ or 320 $N/mm^2$ and/or of at most 375 $N/mm^2$, 500 $N/mm^2$ or 625 $N/mm^2$. Alternatively, or additionally, the mounting plate is formed from a metal, in particular from steel. By means of these embodiments, in particular a mounting plate can be provided which, on the one hand, provides sufficient strength to accommodate the at least one drive means of the conveying device and, on the other hand, requires as little material as possible.

In an exemplary embodiment, the mounting plate has a trapezoidal shape tapering in the conveying direction. The guide side facing the convergence channel and/or the mounting side of the mounting plate facing away from the convergence channel may have trapezoidal shape tapering in the conveying direction. Alternatively, or additionally, the mounting plate has a substantially constant wall thickness. By a substantially constant wall thickness is to be understood in particular as a wall thickness which varies along the extension of the mounting plate by a maximum of 50%, 30% or 10%.

In an exemplary embodiment, the apparatus has two panels running towards each other, in particular in conveying direction, which together with the mounting plate form an enclosure for the at least one drive means and the motor. In particular, the panels and the mounting plate are formed from one piece, in particular bent. In particular, the panels and the mounting plate have substantially the same material thickness. In an exemplary embodiment, the panels extend from the mounting plate in the starting material thickness direction at least up to 50% 70%, 90% or 100% of the radial extension of the at least one drive means, particularly preferably beyond the at least one drive means. In this way, in particular, unintentional interference by a person with the rotating parts of the conveying device can be avoided. The enclosure does not need to completely enclose the motor and the at least one drive means. Therefore, the enclosure may also be referred to as an at least partial enclosure. The panels may extend in conveying direction along the trapezoidal tapering of the mounting plate, in particular along the entire extension of the mounting plate.

A second aspect of the disclosure also relates to an apparatus for mechanically producing a three-dimensional packaging product from a web-shaped starting material, in particular paper starting material. The apparatus comprises a forming station with a convergence channel for transversely compressing, in particular turning-in or rolling-in, the starting material, and a guide wall on which starting material entering the forming station is guided. The guide wall may be formed as a mounting plate according to the first aspect disclosure. Alternatively, or additionally, the side of the guide wall facing the convergence channel in the starting material thickness direction may be formed as the guide side described above. The forming station further has a wave limiter spaced apart from the guide wall transversely to the conveying direction, in particular in the starting material thickness direction, by at least 0.1 mm and at most 20 mm in order to delimit the extension of upset, in particular corrugated, starting material transversely to the conveying direction, in particular in the starting material thickness direction, between the wave limiter and the guide wall.

Surprisingly, it has been found that for forming the smallest possible packaging products, it is advantageous to compress the starting material or the transversely compressed starting material in the conveying direction. Thereby, the resulting packaging product exhibits an increased damping property in the starting material longitudinal direction. To achieve this, the apparatus according to the first, second and/or third aspects of the disclosure may preferably comprise two conveying devices. In an exemplary embodiment, one conveying device is a conveying device of the forming station, in particular the conveying device described in connection with the first aspect of the disclosure. In an exemplary embodiment, the second conveying device is a conveying device downstream of the forming station in the conveying direction, in particular an embossing and/or perforating station. In an exemplary embodiment, the two conveying devices are formed such that the starting material can be compressed between the two conveying devices. For this purpose, one of the conveying devices, for example the conveying device of the forming station, can be arranged in such a way that it can communicate a higher conveying speed to the starting material than the other conveying device, for example the embossing and/or perforating station. At a sufficiently high speed difference, for example at a conveying speed at least 10%, 15%, 20% or 30% higher, between the two conveying devices, the starting material is compressed to such an extent that it makes waves. In particular, wave mountains and wave valleys are formed spaced apart from one another in the starting material thickness direction.

While this corrugation has been shown to be beneficial to the damping properties of the packaging product, it has been shown that corrugation creates an increased risk of material jamming. This is because the corrugations formed represent a resistance in the forming process and must be continuously buckled away during the forming process. The greater the amplitude of the corrugations, the greater the resistance in the forming process. In particular, the wave limiter according to the disclosure can delimit the amplitude of a wave to the distance between the wave limiter and the guide wall. Surprisingly, it has been found that this can reduce the increased risk of jamming while maintaining the increased damping properties due to corrugation. In particular, this appears to be due to the fact that the wave mountains are folded over by the wave limiter in the direction of the wave valleys, which surprisingly both maintains the damping properties and reduces the extension in the starting material thickness direction, which in turn reduces the jamming risk. The folding over of the wave mountains is to be understood in particular as a breaking of the wave mountains, as can be observed in the case of a wave flowing toward a flat shore.

The apparatus according to the second aspect of the disclosure may be formed according to the apparatus of the first aspect of the disclosure and vice versa. Further, exemplary embodiments of individual components of the apparatus described in connection with the first aspect of the disclosure may advantageously also be formed in the apparats according to the second aspect of the disclosure, and vice versa.

In an exemplary embodiment, the distance between the guide wall and the wave limiter transversely to the conveying direction, in particular in the starting material thickness direction, is at least 0.2 mm, 0.3 mm, 0.5 mm, 0.7 mm or 1.0 mm and/or at most 20 mm, 15 mm, 10 mm, 8 mm, 5 mm, 3 mm or 2 mm.

In particular, a distance between 1 mm and 2 mm has proven to be particularly preferred in order to provide the greatest possible damping property in the starting material longitudinal direction and at the same time keep the risk of material jams as low as possible.

The length of the convergence channel in conveying direction may be defined by a channel input, via which the starting material is drawn into the convergence channel, and a channel output, via which the transversely compressed starting material leaves the convergence channel. Thereby, the wave limiter preferably extends in conveying direction over at least 10%, 20%, 30%, 40%, 50% or 60% and/or at most 70%, 80%, 90% or 100% of the convergence channel length. In particular, an output region of the convergence channel, which extends in particular starting from the channel output by at least 10%, 20% or 25% and/or at most by 30%, 40% or 50% of the convergence channel length in the direction opposite to the conveying direction, is free of the wave limiter.

It has been found that the wave limiter can be used advantageously to reduce the risk of dust formation by upsetting the starting material in the starting material thickness direction. However, it has also been found that the wave limiter, on the other hand, carries the risk of the starting material becoming entangled with the wave limiter during transversely compressing. Surprisingly, it has been found that a positioning of the wave limiter in the previously defined region largely exploits the potential of the wave limiter for preventing material jamming due to compression and, on the other hand, there is no or at least little risk of jamming due to transverse compression in this region.

In an exemplary embodiment, the wave limiter extends parallel to the guide wall. In particular, a limiting channel is formed between the wave limiter and the guide wall. The wave limiter may extend in a plate shape. Alternatively, the wave limiter can be formed grid-shaped or rod-shaped. In particular, the wave limiter is formed in a funnel shape. In particular, the wave limiter tapers in a funnel shape in the conveying direction. In particular, the wave limiter tapers at the same taper angle as the convergence channel. In particular, the wave limiter and the guide wall delimit a limiting channel that tapers in the conveying direction. In particular, the previously described side walls are spaced apart from the wave limiter in the starting material width direction. In particular, the longitudinal edge strips of the starting material can thereby be turned-in between the wave limiter and the side walls in the starting material thickness direction. In particular, the side walls run towards each other at the same angle at which the wave limiter tapers. The turn-over checks may be attached to the wave limiter and run towards each other in the conveying direction, in particular run towards each other at the same angle as the wave limiter tapers in the conveying direction. The turn-over cheeks may extend beyond the wave limiter in the conveying direction. This ensures in particular that the rolling-in of the longitudinal edge strips is completed upstream of the wave limiter in the conveying direction.

Alternatively, or additionally, the plate-shaped design of the wave limiter described above, it can have a rod extending in the conveying direction which is spaced apart from the guide wall by the distance of at least 0.1 mm and at most 20 mm according to the disclosure, transversely to the conveying direction, in particular in the starting material thickness direction. The wave limiter may have two such rods spaced apart from one another in the starting material width direction. In an embodiment with two drive means mounted on the mounting plate, the two rods of the wave limiter are preferably positioned in the starting material width direction between the drive means.

In an exemplary embodiment, the wave limiter is attached to a limiting wall of the convergence channel, which is adjustable, in particular pivotable, from an operating position, in which the starting material is transversely compressed as it is conveyed through, and a releasing position, in which access into the convergence channel is released. In an embodiment in which the wave limiter is formed by one or two rods as described above, these can be formed U-shaped and in particular be attached, in particular welded or screwed, via their legs to the adjustable limiting wall.

As described above, the device preferably has at least one pair of rotatably mounted drive means, one of which is mounted on the guide wall, in particular mounting plate, and the other of which is mounted on the limiting wall, in particular cover, opposite the guide wall in the starting material thickness direction. The axis of rotation of the drive means mounted on the cover in the starting material thickness direction is preferably arranged between the cover and the wave limiter. In the exemplary embodiment described above, in which the wave limiter is formed in the plate shape, the wave limiter preferably has a recess through which the drive means projects into the limiting channel defined by the wave limiter and the guide wall. In an exemplary embodiment, the recess is formed as the recess previously described with respect to the mounting plate. In particular, the cover, the plate-shaped wave limiter and the at least one drive means rotatably mounted on the cover are aligned with respect to each other such that the drive means projects beyond the wave limiter into the limiting channel by at least 1%, 3%, 5%, 10% or 15% and/or at most 20%, 25%, 30%, 40% or 45% of the radial extension of the at least one drive means.

The at least one drive may be attached to the cover by means of a bearing, which also serves to attach the wave limiter to the cover. In particular, the bearing of the drive means also serves as a spacer between the wave limiter and the cover. In an exemplary embodiment, the distance between the wave limiter and the cover is at least twice, three times, four times, five times or six times as great as the distance between the wave limiter and the guide wall. The bearing may be a spring mounting which simultaneously permits a movability of the at least one drive means in starting material thickness direction. In particular, such a movement causes a tensioning of a spring of the spring mounting so that the drive means is biased in the direction of the limiting channel.

The conveying device may have pairs of rotatably mounted drive means, one of which is configured as the at least one drive means described above. The respective other drive means of the pair of drive means may be rotatably mounted on the guide wall, in particular as previously described in connection with the mounting plate.

The information given above on the dimensioning positioning of the wave limiter, the drive means and/or the cover is in particular information in the operating position of the cover.

A third aspect of the disclosure also relates to an apparatus for mechanically producing a three-dimensional packaging product from a web-shaped starting material, in particular paper starting material. The apparatus comprises a forming station having a convergence channel for transversely compressing, in particular turning-in or rolling-in, the starting material. The forming station also has a guide wall, in particular a mounting plate, on which starting material entering the forming station is guided. Furthermore, the forming station has two side walls delimiting the convergence channel in the starting material width direction, which run towards each other in the conveying direction in order to turn-in longitudinal edge strips of the starting material passing through the apparatus over the side walls. The turn-over sides of the side walls facing the convergence channel are concavely curved with a radius of curvature of at least 5 mm and at most 60 mm.

It has been found that, by the concave curvature of the side walls according to the disclosure in addition to turning-in the longitudinal edge strips in the starting material thickness direction, inward rolling-in of the longitudinal edge strips in the starting material width direction, which overlaps this, can also be provided. In particular, this allows the longitudinal edge strips to be redirected by up to 180° via the side walls. In contrast to conventional convergence channels, the turned-over longitudinal edge strips can thus be turned over without having to push against the cover. This can reduce the risk of material blockages. Furthermore, the choice of the radius of curvature according to the disclosure allows the turning-over to take place in the smallest possible space without risking a screw-like rolling-in of the longitudinal edge strips due to a radius of curvature that is too small. Thus, by the third aspect of the disclosure, in particular the dimensioning of the apparatus, in particular of the forming station, can be reduced without increasing the risk of material blockages.

The curvature of the side walls may extend by at least 90°, such as by at least 120° or 150°. Alternatively, or additionally, the side walls project into the convergence channel in the starting material width direction in the operating position. In particular, the side walls extend inwardly in the starting material width direction beyond an outer edge of the cover extending in the starting material thickness direction. This prevents the turned-in or rolled-in longitudinal edge strips from getting caught in a gap between the cover and the side walls.

The apparatus according to the third aspect of the disclosure may be formed according to the apparatus of the first and/or second aspect of the disclosure, and vice versa. Furthermore, exemplary embodiments individual components of the apparatus described in connection with the first and/or second aspect of the disclosure may advantageously also be formed in the apparatus according to the third aspect of the disclosure and vice versa.

In an exemplary embodiment, the radius of curvature is at least 10 mm, 15 mm, 20 mm or 25 mm and/or at most 30 mm, 35 mm, 40 mm or 50 mm. Alternatively or additionally, the side walls are preferably formed in the shape of hollow-cylindrical sections. In an exemplary embodiment, the jackets of the hollow-cylindrical-section-shaped side walls project inwardly in the starting material width direction beyond the outer edge of the adjustable limiting wall into the convergence channel. In an exemplary embodiment, the jackets of the hollow cylindrically shaped side walls project at least 1 mm, 3 mm, 5 mm or 10 mm into the convergence channel. The radius of curvature can be constant or varies along the extension of the side walls in conveying direction.

In an exemplary embodiment, the side walls run towards each other at an angle of at least 60°, 70°, 80° or 90° and/or at most 170°, 150°, 130° or 110°. Alternatively, or additionally, the convergence channel tapers at such an angle in the conveying direction. Alternatively, or additionally, the guide wall, the mounting plate and/or the cover tapers in particular trapezoidally at such an angle in conveying direction.

The apparatus according to the first, second and/or third aspect of the disclosure preferably comprises an embossing and/or perforating station arranged downstream of the forming station in conveying direction. Alternatively, or additionally, the apparatus comprises a separating station downstream of the forming station in the conveying direction, in particular comprising a translationally guided blade for separating a packaging product of a desired length from the starting material. The apparatus may have both an embossing and/or perforating station and a separating device, wherein the separating device is arranged downstream of the embossing and/or perforating station in the conveying direction. Furthermore, the apparatus preferably comprises an output device for discharging the separated packaging product.

Furthermore, the disclosure relates to a system comprising an apparatus according to one or more of the previously described aspects of the disclosure and a starting material supply, in particular a starting material roll, in particular in the form of a coreless roll, or a leporello-stack, arranged in particular upstream of the apparatus in the conveying direction, wherein preferably a web-shaped starting material extends from the starting material supply, in particular from the outer circumference of the starting material roll, into the preforming station.

Furthermore, the disclosure relates to the use of an apparatus according to one or more of the aspects described above for producing a three-dimensional packaging product from a web-shaped starting material, in particular paper starting material, wherein the web-shaped starting material is drawn off from the outer circumference of the starting material roll, in particular in the form of a coreless roll.

Furthermore, the disclosure relates to a packaging product which is produced from a web-shaped starting material, in particular paper starting material, by means of an apparatus according to one or more of the aspects described above or in the system described above and/or whose width dimensioned transversely to the longitudinal web direction is less than 12 cm and/or whose length in the longitudinal web direction is less than 30 cm. It has been found in the prior art that there is a great need for miniature packaging products, which can be satisfied by the packaging products according to the disclosure.

According to a further aspect of the present disclosure, which can be combined with the preceding aspects and exemplary embodiments, there is provided an apparatus for producing a three-dimensional packaging product, such as a cushioning product, from a web-shaped starting material, such as a single- or multi-layered paper web, in particular paper. Producing a three-dimensional packaging product is to be understood in particular as the conversion of a web-shaped starting material into a state having a greater extension in the starting material thickness direction compared to the starting material. Waste paper is increasingly being used for the paper material, mainly for ecological reasons, which, however, due to its inhomogeneity it is difficult to form, especially if the three-dimensional packaging product is always to be produced uniformly and as simply and economically as possible. The starting material web can be made of paper, such as recycled paper, in particular waste paper and/or 100% recyclable paper, which can be produced without chemical ingredients. Recycled paper may include paper materials with a low percentage (less than 50%) of fresh fiber-containing paper material. For example, paper materials containing 70% to 100% recycled paper are used. The recycled paper in the sense of the present disclosure can be paper material that can have a tensile strength index along the machine direction of at most 90 Nm/g, preferably a tensile strength of 15 Nm/g to 60 Nm/g, and a tensile strength index along the machine direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. Additionally, or alternatively, a recycled paper property or waste paper property can be characterized by the so-called burst resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a basis weight of, in particular, 40 g/m2 to max. 140 g/m2. The starting material can be in the form of a material web roll or a zigzag-folded packaging material stack, also known as a leporello-stack.

The apparatus can basically be dimensioned and arranged in such a way that it is miniaturized, i.e. significantly smaller in size than corresponding apparatuses in the prior art and/or capable of producing significantly smaller packaging products. Thus, the need for small packaging products can be satisfied. On the other hand, apparatuses according to the disclosure meet the demand for increasingly smaller available storage areas for such apparatuses. For example, as a rule of thumb for the overall dimension of apparatuses according to the disclosure, it has been required that they not exceed the outer dimension of a standard industrial pallet. For example, apparatuses according to the disclosure have an overall dimension of less than 650 mm length in the conveying direction, of less than 450 mm width transversely to the conveying direction, and of less than 300 mm height transversely to the conveying and width directions. The apparatus according to the disclosure may be arranged to produce small or miniature packaging products or cushions. Such small or miniature packaging products may have a length in conveying direction of less than 30 mm, a width of less than 120 mm, particularly in the range of 80 to 90 mm, and a height of less than 40 mm, particularly in the range of 20 to 30 mm.

Producing a three-dimensional packaging product is to be understood in particular as the conversion of a web-shaped starting material into a state with a greater extension in the starting material thickness direction compared to the starting material. This can be achieved, for example, by transversely compressing as described below. The compression may be followed by the attachment of longitudinal strips that have been turned-in or rolled-in during transversely compressing. For this purpose, the apparatus has in particular an embossing and/or perforating station arranged downstream of the forming station.

By the conveying direction in particular the direction is to be understood in which the starting material is drawn off during operation from the starting material supply, such as a starting material roll, in particular in the form of a coreless roll, or a leporello-stack, and conveyed through the apparatus. This direction may also be referred to as the starting material longitudinal direction.

The starting material width direction means in particular the direction in which the starting material extends between longitudinal edges of the web-shaped starting material. In particular, the longitudinal edges extend in the conveying direction. In particular, the starting material width direction is the direction in which the starting material is transversely compressed as it is conveyed through the forming station.

A web-shaped starting material is to be understood in particular as a starting material which extends in particular planarly along the starting material longitudinal direction (conveying direction) and the starting material width direction. In particular, orthogonally to an area defined by the starting material longitudinal direction and the starting material width direction, the web-shaped starting material extends in a starting material thickness direction. In particular, the extension, in particular strength or thickness, of the web-shaped starting material in the starting material thickness direction is significantly smaller than the extension, in particular width, of the web-shaped starting material in the starting material width direction. By significantly smaller it is to be understood in particular an extension in the starting material thickness direction of at most 20%, 10%, 5%, 3%, 2%, 1% or 0.5% of the extension of the starting material in the starting material width direction.

In particular, the starting material longitudinal direction, the starting material width direction and the starting material thickness direction define a coordinate system with three mutually orthogonal directions, also known as a Cartesian coordinate system. In particular, in embodiments in which the starting material is redirected, the coordinate system travels with the starting material. For example, in one embodiment, the starting material may be conveyed in a horizontal direction from the starting material supply to the apparatus. At the apparatus, the starting material may then be redirected in a horizontal direction in which it passes through the apparatus. In this case, prior to entering the forming station, the conveying direction corresponds to a vertical direction and the starting material thickness and width direction correspond to horizontal directions, respectively. Within the apparatus, the conveying direction and the starting material width direction each correspond to a horizontal direction, and the starting material thickness direction corresponds to a vertical direction.

Information on features of the apparatus and its components, such as the forming station, made with respect to conveying direction, starting material thickness direction and/or starting material width direction therefore always refers to the coordinate system as it is aligned at conveying direction height of the corresponding component or a section of the component.

Since the directions in which the starting material extends in width and thickness can change and partially overlap during and after transversely compressing, the traveling coordinate system is determined in the state of the starting material before its transversely compressed, in particular in the starting material supply, between the starting material supply and the apparatus or immediately before the first transverse compression. In particular, the coordinate system is determined upon entering the forming station. In an example where the starting material enters the apparatus horizontally, the conveying direction and the starting material width direction correspond to respective horizontal directions extending orthogonal to each other, and the starting material thickness direction corresponds to a vertical direction. In this example, if the starting material were to be subsequently redirected in the vertical direction, the coordinate system would correspondingly move with the starting material or the transversely compressed material, so that subsequently the starting material thickness direction and the starting material width direction would each correspond to respective horizontal directions extending orthogonal to each other, and the conveying direction would correspond to a vertical direction.)

In particular, within the forming station, the starting material width direction can alternatively be referred to as the convergence direction. The convergence direction extends in particular orthogonally to the conveying direction and describes the direction in which the extension of the convergence channel decreases in the conveying direction, in particular due to the channel tapering in the conveying direction. Alternatively, or additionally, the starting material thickness direction can be referred to as the normal direction, particularly within the forming station. The normal direction is the direction describing a normal to a plane defined by the conveying direction and the convergence direction. It should be understood that all indications made before and below about the starting material width direction and the starting material thickness direction within the apparatus, in particular forming station, can also be made on the basis of the convergence direction and the normal direction.

The apparatus has a forming station with a convergence channel for transversely compressing, in particular turning-in or rolling-in, the starting material.

The convergence channel is to be understood, in particular, as a channel that tapers in the conveying direction. In particular, the convergence channel tapers in a funnel shape in the conveying direction. In particular, the convergence channel is delimited in the starting material thickness direction at least from one side by at least one, limiting wall. In particular, the at least one limiting wall is formed in a funnel shape and/or tapers in a funnel shape, in particular in conveying direction. In particular, the at least one limiting wall extends in a planar manner in the conveying direction and starting material thickness direction, in particular in the operating state.

The at least one limiting wall can be formed adjustable, in particular pivotable, between an operating position, in which the starting material is transversely compressed as it is conveyed through, and a releasing position, in which access into the convergence channel is released. Alternatively, the at least one limiting wall can be formed as a guide wall. A guide wall is to be understood in particular as a limiting wall on which starting material entering the forming station is guided, in particular is supported in the starting material thickness direction during transverse compression. The guide wall may be formed as a mounting plate, on a guide side thereof, which is facing the convergence channel, starting material entering the forming station is guided and on which at least one drive means of the conveying device is rotatably mounted and a motor driving the at least one drive means is attached.

In an exemplary embodiment, the at least one limiting wall has two limiting walls which, in particular in the operating state, lie opposite each other in the starting material thickness direction and extend in particular parallel to each other. In particular, both limiting walls are formed trapezoidally and/or taper trapezoidally in conveying direction. In particular, the convergence channel is delimited on both sides by the two limiting walls in the starting material thickness direction, in particular in the operating state. In an exemplary embodiment, one of the two limiting walls is formed like the previously described guide wall, in particular mounting plate, and the other of the two guide walls is formed like the previously described adjustable, in particular pivotable, limiting wall.

Alternatively, or additionally, the forming station has at least two side walls delimiting the convergence channel in the starting material width direction. In particular, the at least one side wall has two side walls which run toward each other in conveying direction. In an exemplary embodiment, the side walls run towards each other at an angle of at least 60°, 70°, 80° or 90° and/or at most 170°, 150°, 130° or 110°. Alternatively, or additionally, the convergence channel tapers at such an angle in the conveying direction. Alternatively, or additionally, the limiting walls, in particular the guide wall, in particular mounting plate, and/or the adjustable limiting wall, in particular trapezoidally taper at such an angle in conveying direction.

In particular, the two side walls delimit the convergence channel on both sides in the starting material width direction. In particular, the convergence channel tapers as a result of the side walls running towards each other in the conveying direction, so that the extension of the convergence channel in the starting material width direction is greater, in particular at least 100%, 150%, 200%, 300%, 400%, 500%, 600%, 700%, 800% or 900% or 950% greater, at the upstream end of the forming station than at the downstream end of the forming station.

In an exemplary embodiment, the forming station has a starting material inlet via which the starting material can be drawn into the forming station, and a starting material outlet via which the transversely compressed starting material can be discharged from the forming station. In particular, the forming station is delimited between the starting material inlet and the starting material outlet by one or more of the previously described limiting walls and/or side walls in the starting material width direction and/or in the starting material thickness direction. In particular, the at least two side walls together with the trapezoidal limiting walls circumferentially delimit the convergence channel in the operating position between the starting material inlet and the starting material outlet.

As described above and below, the starting material is preferably transversely compressed when passing through the convergence channel. In an exemplary embodiment, transversely compressing is to be understood as turning-in or rolling-in longitudinal strips of the starting material web, in particular for forming external crumpled cavities in the starting material width direction.

For this purpose, the starting material is preferably received and guided in the operating position via a limiting wall, in particular one of the trapezoidal limiting walls described above, and is supported in particular in the starting material thickness direction. In an exemplary embodiment, this limiting wall is the previously described guide wall, such as a mounting plate. In an exemplary embodiment, as the starting material is conveyed further through the convergence channel in the conveying direction, the longitudinal edge strips of the starting material which lie on the outside in the starting material width direction push against the side walls and are redirected by them in the starting material thickness direction, in particular turned-in. By means of the side walls running towards each other in conveying direction, the longitudinal edge strips are further redirected in starting material thickness direction as it is conveyed through the convergence channel, until they are preferably transferred to turn-over cheeks, at which the redirected longitudinal edge strips are directed back in starting material thickness direction as it is conveyed through. Alternatively, or additionally, rolling-in can occur in that the longitudinal edge strips push against a further limiting wall, in particular the second trapezoidal limiting wall described above, against which the redirected longitudinal edge strips are directed back, in particular rolled-in, as it is conveyed through in the starting material thickness direction.

In an exemplary embodiment, the limiting wall directing back the longitudinal edge strips and/or the limiting wall supporting the turn-over cheeks form the adjustable limiting wall described above. When the adjustable limiting wall is displaced to the releasing position, the region of the convergence channel previously covered by the adjustable limiting wall is released, allowing engagement with the convergence channel.

Alternatively, or additionally, transversely compressing can also be understood as a simple compression, in particular accordion-like compression, of the starting material in the starting material width direction and/or in the starting material longitudinal direction.

Furthermore, the forming station comprises a conveying device for drawing off the starting material from a starting material supply which is arrangeable upstream of the forming station in the conveying direction. In the independent aspects of the disclosure described below, the conveying device may in particular comprise at least one, at least two or at least three rotatably mounted drive means. In this context, a rotatably mounted drive means is particularly to be understood as a drive means rotatable about an axis of rotation. The axis of rotation is preferably the axis of rotational symmetry of the drive means. In an exemplary embodiment, the axis of rotation extends transversely to the conveying direction, in particular in the starting material width direction. In an exemplary embodiment, the rotatability of a drive means in the sense of the present disclosure is ensured by rotatable mounting of the drive means. For this purpose, the respective drive means described below are preferably each attached via at least one rotary bearing to one of the limiting walls of the convergence channel described above. In an exemplary embodiment, the rotatable mounting of the drive means can simultaneously be a spring mounting of the drive means, in particular in the starting material thickness direction. In particular, the drive means described below can be spring-mounted, in particular with respect to one of the limiting walls, particularly preferably with respect to the adjustable limiting wall.

In an exemplary embodiment, the at least one drive means is movable relative to the adjustable limiting wall in the operating position. This can be ensured, for example, by translatory mounting of the rotatably mounted drive means transversely to the conveying direction, in particular in the starting material thickness direction. In an exemplary embodiment, the translatory mounting is formed as a spring mounting. For this purpose, the translatory mounting preferably has a spring, in particular a compression spring and/or a coil spring. The spring is preferably compressible and/or stretchable transversely to the conveying direction, in particular in the starting material thickness direction. In particular, the spring is arranged transversely to the conveying direction, in particular in the starting material thickness direction, between two support points. In particular, the spring is guided between the support points by a spring guide. In the case of a coil spring, the spring guide can be a guide rod which guides the inner side of the coil spring. One support point can be formed by a limiting wall, in particular the adjustable limiting wall, or by a web of the translatory mounting, for example of a U-shaped bearing. The other support point can be a shaft, in particular a wheel shaft, carrying the at least one rotary means.

In embodiments with at least two or more drive means, these can be movably mounted transversely to the conveying direction, in particular in the starting material thickness direction, in particular via the previously described bearing or spring mounting, to one, in particular the adjustable, limiting wall. The at least two drive means may be coupled to each other via a common rotary shaft. In an exemplary embodiment, the two drive means are spaced apart from one another along the rotary shaft in the starting material width direction. In an exemplary embodiment, a respective spring, in particular a compression spring and/or coil spring, is attached, in particular supported, to an end of the rotary shaft facing the respective drive means. In this case, the rotary shaft forms in particular one of the support points described above. This ensures in particular that thicknesses of the starting material that fluctuate in the starting material width direction are compensated for by individual compensating movements of the individual drive means.

Furthermore, rotatably mounted drive means is to be understood, in particular, as a drive means comprising a jacket that is in engagement with the starting material during drawing off. The engagement between the starting material and the jacket is to be understood in particular as a contact, in particular a force transmission contact. In particular, the jacket extends circumferentially about the axis of rotation of the drive means and axially along the axis of rotation. The extension of the jacket along the axis of rotation can also be referred to as the axial extension of the jacket. In an exemplary embodiment in which the axis of rotation extends in the starting material width direction, the axial extension of the jacket may be the extension of the jacket in the starting material width direction and/or may be referred to as the width extension. In particular, the radial distance between the axis of rotation and the jacket may be referred to as the radius of the drive means. In an exemplary embodiment, the drive means has a constant radius along its axis of rotation. In such embodiments, the radial extension of the drive means corresponds to its diameter, i.e. twice the radius. In embodiments in which the radius varies along the axis of rotation, the radial extension corresponds to the averaged diameter, i.e. twice the averaged radius, of the drive means.

In the following, the axial extension of drive means is described in particular with reference to the convergence channel width at conveying direction height of the respective drive means. The conveying direction height of the respective drive means is to be understood in particular as the position of the drive means in conveying direction. To determine the exact position of the drive means, its axis of rotation can be used as a reference. Thus, the conveying direction height of a drive means is to be understood in particular as the conveying direction height of the axis of rotation of the corresponding drive means or also the position of the axis of rotation of the at least one drive means in conveying direction. As previously described, the axis of rotation of the at least one drive means preferably extends in the starting material width direction. In other embodiments, in which the axis of rotation is offset with respect to the starting material width direction, the conveying direction height of the axis of rotation is to be understood in particular as the averaged position of the axis of rotation in the conveying direction. The same applies to embodiments in which the at least one drive means has several drive means that are not arranged at the same conveying direction height. In this case, too, an averaged conveying direction height must be determined in particular to determine the conveying direction height of the drive means.

The convergence channel width is in particular the extension of the convergence channel in the starting material width direction. In particular, the convergence channel width is measured by the distance in starting material width direction between two side walls delimiting the convergence channel in starting material width direction. As described before, the convergence channel preferably tapers in conveying direction, so that the convergence channel width also reduces in conveying direction. Accordingly, the convergence channel width is to be determined in particular on the conveying direction height of the respective drive means, the axial extension of which is indicated in relation to the convergence channel width. In the case of different convergence channel widths in the starting material thickness direction, for example due to curved side walls, the largest distance between the two side walls must be determined at the corresponding conveying direction height.

In exemplary embodiments, the jacket has the shape of a cylinder and may be referred to, in particular, as a cylinder jacket or as having the shape of a cylinder jacket. Exemplary embodiments of a drive means within the meaning of the present disclosure may include a conveying wheel or a conveying roller. A conveying roller is to be understood in particular as a rotatable drive means whose axial extension is greater, preferably at least 10%, 30%, 50%, 70%, 100%, 150%, 200%, 300%, 350%, 400%, 500%, 600%, 700%, 800%, 900% or 1000% greater, than its radial extension (or diameter). A conveying wheel is to be understood in particular as a rotatable drive means whose radial extension (or diameter) is greater, preferably at least 10%, 30%, 50%, 70%, 100%, 150%, 200% or 300% greater, than its axial extension.

In accordance with a first aspect of the disclosure, the conveying devices comprises at least one rotatably mounted drive means with a jacket which is in engagement with the starting material during drawing off, wherein the axial extension of the jacket is at least 20% of the convergence channel width at the conveying direction height of the at least one drive means. The at least one drive means may be least one conveying roller.

Surprisingly, it has been found that the axial extension of the jacket of the at least one drive means according to the disclosure can increase the reliability of the feed. Whereas attempts to increase the reliability of the feed prior to the present disclosure either failed or were accompanied by greater installation space requirements, the present disclosure has made it possible to use the space already available in the convergence channel in the starting material width direction to increase the reliability of the feed, so that the more reliable feed could be achieved without increasing the installation space. Furthermore, it has been found that the use of a conveying roller is of particular advantage because its greater extension in the axial direction than in the radial direction makes better use of the space available in the starting material width direction of the convergence channel than conveying rollers. In addition, it was found that the axial extension of the jacket according to the disclosure helps to smooth the starting material drawn into it, thereby reducing the risk of material jams as a result of material being too upset in the conveying direction by smoothing it out.

In an exemplary embodiment, the axial extension of the jacket is at least 25%, 30%, 40%, 50%, 60%, 70% or 75% and/or at most 80%, 85% or 90% of the convergence channel width at conveying direction height of the at least one drive means. It has been found that, in particular, utilization of the convergence channel width at conveying direction height of the respective drive means in such a region is advantageous in that the largest possible proportion of the convergence channel width is used for the axial extension of the jacket without impairing the complexity of the forming station in terms of production, assembly, maintenance and material jam risk due to an insufficient distance in the starting material width direction between the side walls and the drive means.

The axial extension of the jacket can also be greater than the convergence channel width at conveying direction height of the at least one drive means. In particular, the axial extension of the jacket can be at least or at most 95%, 100%, 105%, 110%, 115%, 120%, 130%, 140% or 150% of the convergence channel width at conveying direction height of the at least one drive means. For this purpose, for example, at least one recess can be provided in one, in particular in two, side walls delimiting the convergence channel in the starting material width direction, over which recess the at least one drive means can extend beyond the convergence channel, in particular can project out of it. It has been found that this can further reduce the dimensions of the forming station, in particular shorten the extension of the convergence channel in the conveying direction. In an exemplary embodiment, the convergence channel length in conveying direction is defined by a channel input, via which the starting material is drawn into the convergence channel, and a channel output, via which the transversely compressed starting material leaves the convergence channel. In other words, the convergence channel length corresponds in particular to the distance in conveying direction between the channel input and the channel output.

Thereby, the channel input corresponds in particular to the conveying direction height of the forming station at which the convergence channel starts to taper in the conveying direction. The channel output corresponds in particular to the position of the convergence channel at which it stops tapering. In other words, the channel input can be defined in particular by the upstream end of the side walls in conveying direction running towards each other in conveying direction and the channel output by the downstream end of the side walls in conveying direction running towards each other in conveying direction.

In an exemplary embodiment, the at least one drive means is arranged in conveying direction at least 50%, 60%, 70%, 80%, 90% or 95% of the convergence channel length upstream of the channel output and/or at least 50%, 40%, 30%, 20%, 10% or 5% downstream the channel input. In particular, this ensures that the at least one drive means is arranged at a conveying direction height of the convergence channel at which it has not yet been tapered too much and thus there is still sufficient space available in the starting material width direction to be able to use drive means with the greatest possible axial extension. In particular, the at least one drive means is arranged completely within the convergence channel, in particular in the starting material thickness direction, or sectionally projects into it. In particular, the jacket of the at least one drive means can be arranged completely between two limiting walls that delimit the convergence channel in the starting material thickness direction. Alternatively, the jacket of the at least one drive means may protrude into the convergence channel only sectionally, in particular via a recess in a limiting wall delimiting the convergence channel. In embodiments in which the at least one drive means has a pair of drive means opposite each another in the starting material thickness direction and between which the starting material is conveyed during drawing off, in particular one or both drive means can be arranged completely within the convergence channel or project sectionally into the latter, in particular one can sectionally project into the convergence channel and one can be arranged completely within the convergence channel.

In an exemplary embodiment, the convergence channel width at the channel input is at least 200 mm, 250 mm, 300 mm, 350 mm or 375 mm and/or at most 450 mm, 425 mm or 400 mm. It has been found that such dimensioning represents a good compromise between miniaturization of the apparatus on the one hand and the provision of the largest possible assembly space for positioning drive means with an axial extension according to the disclosure to achieve the advantages described above on the other.

With regard to the at least one drive means, an axial extension of the jacket of at least 40 mm, 50 mm, 100 mm, 150 mm, 200 mm, 250 mm or 300 mm and/or at most 325 mm, 350 mm, 375 mm or 400 mm has been found to be advantageous.

In the second aspect of the disclosure described further below, with at least two or more drive means extending in particular at the same conveying direction height and/or spaced apart from one another in the starting material width direction, the minimum and maximum percentage and absolute indications of the axial extension of the jacket described above are preferably distributed over the corresponding number of drive means. For example, with an advantageous axial extension of a drive means of 320 mm, the advantageous axial extension of each individual drive means corresponds to 160 mm for each two drive means and 80 mm for each at least four drive means. In other words, the preferred indications of axial extension given previously can also refer to the summed-up axial extension of several jackets.

In the third and/or fourth aspect of the disclosure described further below, the axial extension may also be realized according to the first and/or second aspect of the disclosure. Alternatively, or additionally, the axial extension of the individual drive means may also be at least 5 mm 8 mm or 10 mm and at most 15 mm, 20 mm, 30 mm, 40 mm, 60 mm, 80 mm or 100 mm.

In an exemplary embodiment, the at least one drive means has a pair of drive means opposite each other in the starting material thickness direction, in particular between which the starting material is conveyed during drawing off. In an exemplary embodiment, the two drive means of the pair of drive means are arranged at the same conveying direction height. The same conveying direction height within the meaning of the present disclosure is to be understood in particular as meaning that the axes of rotation of the respective drive means are spaced apart from one another in the conveying direction by a maximum of 3%, 5%, 10%, 20%, 30%, 40% or 50% of the radial extension of at least one of the drive means. In the case of drive means with different radial extensions, in particular the drive means with the greater radial extension is to be taken as the basis. In particular, the axes of rotation of the two drive means extend substantially parallel to one another. By substantially it is to be understood in particular as an angle between the two axes of rotation of at most 30°, 20°, 10°, 5°, 3° or 1°, in particular in a plane extending in the conveying direction of the starting material width direction.

In an exemplary embodiment, both drive means of the pair of drive means each have the axial extension of the jacket described above. Both drive means may be conveying rollers with the axial extension of the jacket described above.

In an exemplary embodiment, the drive means of a pair of drive means are rotatably attached to limiting walls of the forming station opposite each other in the starting material thickness direction, in particular rotatably mounted. One drive means may be rotatably attached to the adjustable, in particular pivotable, limiting wall described above. Alternatively, or additionally, the other drive means is rotatably attached to the previously described guide wall, in particular mounting plate. In embodiments with several pairs of drive means, the drive means of a respective, in particular each, pair of drive means are accordingly rotatably attached, in particular rotatably mounted, to limiting walls of the forming station opposite each other in the starting material thickness direction.

In an exemplary embodiment, the drive means of a pair of drive means are braced against one another while forming a force transmission contact, in particular with the starting material, in the operating position and are spaced apart from each other, preferably in the releasing position. In an exemplary embodiment, the force transmission contact is provided by a spring force acting on the starting material from the at least one drive means, in particular of at least 50 newtons, 75 newtons, 100 newtons or 125 newtons and/or at most 175 newtons, 200 newtons, 250 newtons or 300 newtons.

In particular, the spring force is provided via at least one spring, in particular spring mounting, biased in the operating position. In an exemplary embodiment, the spring mounting is provided by the spring mounting described above. In particular, the at least one spring mounting may comprise at least one spring biasing the rotatable drive means against the starting material in the operating position. The at least one spring may be formed as a coil spring and/or a compression spring. The at least one spring can be spring-mounted transversely to the conveying direction, in particular in the starting material thickness direction, so that it is compressed and/or stretched transversely to the conveying direction, in particular orthogonally to the conveying direction, when the adjustable limiting wall is displaced into the operating position. In embodiments with two drive means mounted at the same conveying direction height on a limiting wall, these are preferably each acted upon in the operating position by a spring with a corresponding spring force. In the case of a drive roller, this is preferably flanked by two springs in the starting material width direction. For the springs, it has proved advantageous to have springs which provide an average spring force of between 2 and 6 N/mm during compression or extension, and/or are biased and/or stretched between 10 mm and 30 mm in the operating position. The at least two springs may be supported on one side on the adjustable limiting wall, or a support point attached thereto, and on the other side on drive means shaft, in particular wheel shaft or roller shaft, bearing the at least one rotatable drive means.

The tensioning of the springs may be provided by tensioning the adjustable limiting wall, to which the at least one spring-mounted drive means is attached, with respect to a further limiting wall of the convergence channel, in particular by means of connecting elements such as clamps, screws or a guide link. Clamps can be implemented in particular by means of at least one tab which, in the operating position, engages around a lug. A guide link can be implemented in particular by means of a link recess in which a pin is guided. The spring force can be built up by compressing the previously described spring by tensioning, thereby providing a spring force.

In an exemplary embodiment, the spring force in the operating position acts substantially in the starting material thickness direction. In this context, "substantially" should be understood to mean a deviation of no more than 45°, 30°, 15°, 10°, 5°, 3° or 1° from the starting material thickness direction.

Alternatively, the spring force can also be realized by the at least one drive means having an elastically definable rolling-off region which, while tensioning the adjustable limiting wall with respect to a further limiting wall, in particular the guide wall, deforms, while forming an elastic restoring force which acts as a spring force from the drive means on the starting material. The at least one rotatably mounted drive means may be a drive means of a pair of drive means, of which both drive means each have an elastically definable rolling-off region, which are pressed against one another in the operating position while forming an elastic deformation restoring force. In the second aspect of the disclosure described below, preferably the at least two rotatably mounted drive means are each drive means of a corresponding pair of drive means.

In an exemplary embodiment, one drive means of the at least one pair of drive means is coupled to a motor, in particular via a gear, in particular a gear train, and the other drive means of the at least one pair of drive means is freely rotatably mounted. In an exemplary embodiment, the at least one drive means mounted on the guide wall is the drive means coupled to the motor. Alternatively, or additionally, the freely rotatably mounted drive means is mounted on a limiting wall opposite the guide wall in the starting material thickness direction, in particular on the adjustable limiting wall.

In an exemplary embodiment, the two drive means have diameters of different sizes. In an exemplary embodiment, the larger diameter is at least 10%, 20%, 30%, 40% or 50% larger than the smaller diameter. In particular, the drive means with the larger diameter is motor-driven. Alternatively, or additionally, the drive means with the smaller diameter is freely rotatably mounted. Furthermore, the drive means with the smaller diameter is preferably mounted on the adjustable limiting wall described above. Alternatively, the drive means with the larger diameter can also be freely rotatably mounted and/or the drive means with the smaller diameter can be motor-driven. Alternatively, both drive means may be motor-driven. Furthermore, both drive means can alternatively have diameters of the same size, in particular wherein one is motor-driven and one is freely rotatably mounted or both are motor-driven.

It has been found that the use of diameters of different sizes for the drive means of a pair of drive means opposite each other in the starting material thickness direction can increase the reliability of the feed of starting material. In particular, in embodiments with adjustable, in particular pivotable, limiting walls, it has been shown that the smaller drive means, in the event of misplacements, for example due to a certain amount of play in the adjustable bearing of the limiting wall, can compensate the misplacements by assuming an adjusted position relative to the opposing drive means. It has been shown that this effect can be exploited particularly well if the drive means in the smaller diameter is movably mounted and/or spring biased, in particular movably mounted and/or spring biased against the drive means with the larger diameter. In this case, the movable bearing or spring tensioning is preferably implemented as described above.

According to a second aspect of the disclosure, the conveying devices comprises at least two rotatably mounted drive means each having a jacket which is in engagement with the starting material during drawing off, wherein the at least two drive means are disposed at the same conveying direction height and spaced apart from one another in the starting material width direction. In accordance with the second aspect of the disclosure, the summed-up axial extension of the jackets of the at least two drive means is at least 20% of the convergence channel width at conveying direction height of the at least two drive means. In an exemplary embodiment, the summed-up axial extension of the at least two jackets is at least 25%, 30%, 40%, 50%, 60%, 70% or 75% and/or at most 80%, 85% or 90%, 100% or 105% of the convergence channel width at conveying direction height of the at least two drive means.

By the spacing apart of the at least two drive means from one another in the starting material width direction it is to be understood in particular that the two drive means are not opposite drive means in the starting material thickness direction, between which the starting material is conveyed during drawing off. In other words, the at least two drive means are arranged next to each other in starting material width direction and/or are arranged at the same height in starting material thickness direction. A same height in the starting material thickness direction is to be understood in particular as a distance between the axes of rotation of the respective drive means in the starting material thickness direction of at most 30%, 20%, 15%, 10% or 5% of the radius of the two drive means, in the case of drive means of different radius of the drive means with the smaller radius, spaced apart from one another. In an exemplary embodiment, the axes of rotation of the two drive means extend substantially parallel to each other. The two drive means may have a common axis of rotation. In particular, the at least two drive means are mounted on a common shaft, in particular wheel shaft or roller shaft. Furthermore, the distance between the at least two drive means in the starting material width direction is preferably at least 1%, 3%, 5% or 10% and/or at most 15%, 20%, 30% 40% of the convergence channel width at the conveying direction height of the at least two drive means.

In an exemplary embodiment, the axial extension of each jacket of a drive means is at least 10%, preferably at least 12.5%, 15%, 20%, 25%, 30%, 35% or 37.5% of the convergence channel width at conveying direction height of the respective drive means. In embodiments having, for example, four drive means arranged at the same conveying direction height and spaced apart from one another in the starting material width direction, the axial extension would each preferably be one-half of these percentage amounts. In particular, embodiments are contemplated in which the at least two drive means have at least three, four, five or six drive means at the same conveying direction height, respectively spaced apart from one another in the starting material width direction. In an exemplary embodiment, the at least two drive means are at least two conveying rollers.

In an exemplary embodiment, the conveying devices according to the second aspect of the disclosure comprise at least two pairs of drive means opposite each other in the starting material thickness direction. Thereby, in particular, each of the at least two drive means spaced apart from each other in the starting material width direction forms one respective drive means of a pair of drive means with which at least one further rotatably mounted drive means opposite in the starting material thickness direction is associated. The at least one further rotatably mounted drive means can be a single drive means, in particular a drive roller, which forms a drive means pair with each of the at least two drive means spaced apart from one another in the starting material width direction. For example, for this purpose, a drive means according to the first aspect of the disclosure may form two drive means pairs at a limiting wall with the at least two drive means according to the second aspect of the disclosure, which are attached, in particular rotatably mounted, to the opposite limiting wall. In an exemplary embodiment, however, each of the at least two drive means spaced apart from one another in the starting material width direction is associated with its own further drive means opposite one another in the starting material thickness direction, with which it forms a pair of drive means. These opposing drive means may also be drive means which are arranged at the same conveying direction height and spaced apart from one another in the starting material width direction. In particular, the summed-up axial extension of the jackets of the opposing drive means is also at least 20%, preferably at least 25%, 30%, 40%, 50%, 60%, 70% or 75% and/or at most 80%, 85% or 90%, of the convergence channel width at conveying direction height of the opposing drive means.

At least one, at least two, or each, of the at least two pairs of drive means according to the second aspect of the disclosure may be formed as the pair of drive means described in connection with the first aspect of the disclosure, in particular with respect to positioning, bearing and bias.

In particular, the second aspect of the present disclosure differs from the first aspect of the disclosure in that the axial extension of the jacket according to the first aspect of the disclosure is distributed over the jackets of at least two drive means. It has been found that the more reliable feed can also be achieved with the second aspect of the disclosure, utilizing the available installation space anyway. In this respect, the second aspect of the disclosure provides an alternative solution to the first aspect of the disclosure. Reduction of the risk of material jamming as a result of starting material upset in the conveying direction has also been observed with apparatuses according to the second aspect of the disclosure. However, this effect was less strongly pronounced than in the first aspect of the disclosure, which may be related to the fact that no smoothing occurs along the distance between the drive means. In contrast thereto, however, it was observed that the risk of material jamming as a result of uneven or excessive transverse compression of the starting material was reduced more with the second aspect of the disclosure than with the first aspect of the disclosure. This could be related to the distance between the drive means forming an escape space, similar to a by-pass, for too excessively transversely compressed starting material.

In accordance with the third aspect of the present disclosure, the conveying device has at least three drive means extending at the same conveying direction height and spaced apart from one another in the starting material width direction. In contrast to the prior art use of two drive means positioned at the same conveying direction height and spaced apart from one another in the starting material width direction, the use of three correspondingly positioned drive means has been found to lead to a reduction in the risk of material jamming as a result of uneven or excessive transverse compression of the starting material. This appears to be related to the fact that in known embodiments with two narrow drive wheels, the escape space for the transversely compressed material between the two drive wheels becomes so large that it itself becomes a risk factor for material jamming, since starting material located in the correspondingly large escape space can easily become entangled with rotating parts of the drive means. It has been shown that by using at least three drive means instead of two narrow drive means, more and, in each case, respectively smaller escape spaces can be provided and thus the risk of material jamming can be reduced. In this respect, the third aspect of the disclosure represents an alternative to the first and second aspects of the disclosure, which solve the problem of excessively large escape spaces by means of a large axial extension of the drive means, which reduces the space available for the escape spaces and thus also their axial extension. In this respect, the third aspect of the disclosure represents an alternative solution which solves the problem of too large escape spaces without necessarily having to increase the axial extension of the jackets in accordance with the first and second aspects of the disclosure.

The apparatus according to the third aspect of the disclosure may be formed according to the apparatus of the first and/or second aspect of the disclosure, or vice versa. For example, the at least two drive means according to the second aspect of the disclosure may comprise the at least three drive means according to the third aspect of the disclosure. Alternatively, the at least one drive means according to the first aspect of the disclosure or the at least two drive means according to the second aspect of the disclosure may be attached to a limiting wall and from at least three drive means pairs with the at least three drive means according to the third aspect of the disclosure, which are attached to an opposite limiting wall. Further, exemplary embodiments of individual components of the apparatus described in connection with the first and/or second aspect of the disclosure may advantageously also be formed in the apparatus according to the third aspect of the disclosure, or vice versa.

In an exemplary embodiment, at least one of the at least three drive means is arranged substantially in the center of the convergence channel in the starting material width direction. By substantially in the center is to be understood in particular that the centrally arranged drive means is spaced apart from the center of the convergence channel in starting material width direction by a maximum of 1%, 3%, 5%, 10%, 15% or 20% of the convergence channel width at the height of the centrally arranged drive means. In this context, the center of the convergence channel is to be understood in particular as the center of the convergence channel in the starting material width direction at the conveying direction height of the central drive means. The centrally arranged drive means can in particular ensure that the convergence channel width available for escape spaces is evenly distributed.

Alternatively, or additionally, the at least three drive means are arranged at substantially equal or different distances from each other in the starting material width direction. By substantially equal distances is to be understood in particular that the distances differ from each other by at most 15%, 10%, 5%, 3% or 1 percent of the convergence channel width at conveying direction height of the at least three drive means. The two drive means of the at least three drive means lying on the outside in the starting material width direction may each have substantially the same distance from the respective side wall delimiting the convergence channel as the drive means have from one another. In this way, it can be ensured in particular that the escape spaces formed between the drive means in the starting material width direction have as equal a size as possible or are reduced as uniformly as possible. Alternatively, or additionally, two of the at least three drive means are arranged at substantially equal distances from the side walls delimiting the convergence channel in the starting material width direction.

In an exemplary embodiment, each of the at least three drive means forms a drive means pair with a further drive means arranged opposite in the starting material thickness direction. The at least three drive means pairs may be formed like the drive means pairs described above.

In one embodiment, the at least three drive means have at least 4, 5, 6, 7 or 8 drive means, in particular wherein the drive means are arranged at substantially equal or different distances from each other in the starting material width direction. In an exemplary embodiment, each of these drive means is associated with a drive means in the starting material thickness direction, with which it forms a drive means pair.

In an exemplary embodiment, the at least three drive means have at least four conveying wheels, forming at least two conveying double wheels, whose distance from each other in the starting material width direction is greater than the distance in the starting material width direction between the conveying wheels of a respective conveying double wheel. Alternatively, the at least three drive means have at least four conveying rollers, which are correspondingly formed as conveying double rollers. In an exemplary embodiment, the distance between two conveying double wheels/conveying double rollers in starting material width direction to each other is at least 10%, 15%, 20% or 25% of the convergence channel width at conveying direction height of the corresponding conveying double wheels/conveying double rollers. Alternatively, or additionally, the distance between two conveying wheels/conveying rollers of one conveying double wheel/conveying double roller respectively in the starting material width direction is at most 10%, 8%, 5% or 3% of the convergence channel width at conveying direction height of the corresponding conveying double wheels/conveying double rollers. It has been found advantageous to transfer the previously described arrangement of the drive means at substantially equal distances from each other to embodiments with conveying double wheels/conveying double rollers in that the conveying double wheels/conveying double rollers are arranged at substantially equal distances from each other, but these distances are greater than the distance between two conveying wheels/conveying rollers of a conveying double wheel/conveying double roller. The use of conveying double wheels and/or conveying double rollers has proven to be advantageous in that the relatively small distance between the conveying wheels/conveying rollers of a conveying double wheel/conveying double roller better permits compensation of fluctuations in the thickness of the starting material within a conveying double wheel/conveying double roller than with a single drive means extending over the same axial extension.

According to a fourth aspect of the disclosure, the conveying devices has at least two rotatably mounted drive means which are aligned with one another in the conveying direction. By aligned with one another is to be understood in particular that the at least two drive means are spaced apart from one another in conveying direction and have substantially the same position in starting material width direction. By substantially the same position in the starting material width direction is to be understood in particular that the center points of the two drive means are spaced apart from one another in the starting material width direction by a maximum of 20%, 15%, 10%, 5%, 3% or 1% of the convergence channel width at the conveying direction height of the drive means upstream of the conveying direction or downstream of the conveying direction. By the center point it is to be understood in particular respectively the center point of a drive means in the starting material width direction.

In an exemplary embodiment, the axis of rotation of the drive means upstream of the conveying direction is arranged in the conveying direction at least 5% 10%, 15%, 20% or 25% and/or at most 30%, 35%, 40% or 45% of convergence channel length downstream the channel input. Alternatively, or additionally, the drive means downstream of the conveying direction is preferably arranged in the conveying direction at least 5% 10%, 15%, 20% or 25% and/or at most 30%, 35%, 40% or 45% of the convergence channel length upstream of the channel output. Alternatively, or additionally, the at least two drive means are preferably arranged at substantially the same distances in conveying direction to each other and to the channel input or channel output. By substantially it is to be understood in particular as a deviation of the distances from one another of at most 15%, 10%, 5% or 3% of the convergence channel length. Furthermore, the at least two drive means aligned with each other in the starting material width direction are preferably arranged substantially in the center of the convergence channel. Alternatively, or additionally, a drive means is associated with one, preferably each, of the two aligned drive means opposite one another in the starting material thickness direction, with which it forms a drive means pair. The pairs of drive means of the two aligned drive means can be embodied in particular as described above.

It has been found that by using drive means that are aligned with each other in the conveying direction, the risk of material jamming as a result of excessive compression of starting material in the conveying direction can be reduced. This appears to be related to the fact that the aligned arrangement can ensure that the smoothing achieved by the drive means upstream in the conveying direction is consolidated via the aligned drive means downstream in the conveying direction. In other words, in particular, it is avoided that starting material which has already been smoothed out will again be upset in the conveying direction.

The apparatus according to the fourth aspect of the disclosure may be formed according to the apparatus of the first, second and/or third aspect of the disclosure, or vice versa. For example, in the conveying device, the third and fourth aspects of the disclosure may be realized, wherein particularly preferably the drive means upstream in the conveying direction according to the fourth aspect of the disclosure forms the aforementioned central drive means of the at least three drive means according to the third aspect of the disclosure. Alternatively, or additionally, at least one, preferably each, of the aligned drive means is configured as a drive means having the axial extension according to the first aspect of the disclosure. Alternatively, or additionally, at least one, preferably each, of the aligned drive means may comprise at least two drive means having a summed-up axial extension according to the second aspect of the disclosure. Furthermore, exemplary embodiments of individual components of the apparatus described in connection with the first, second and/or third aspects of the disclosure may advantageously also be formed in the device according to the third aspect of the disclosure, and vice versa.

In an exemplary embodiment, the axis of rotation of the at least one drive means according to the first aspect of the disclosure and/or at least one, preferably each, axis of rotation of the drive means according to the second, third and/or fourth aspect of the disclosure is arranged outside the convergence channel. In an exemplary embodiment, the respective drive means project into the convergence channel via recesses formed in a limiting wall, in particular the guide wall, in particular projects into by at least 1%, 3%, 5%, 10% or 15% and/or at most 20%, 25%, 30%, 40% or 45% of the radial extension of the at least one drive means into the convergence channel. In an exemplary embodiment, the respective recess is adapted to the dimension of the respective drive means in such a way that between drive means and recess in conveying direction and/or in starting material width direction there is in each case a distance of at least 1 mm, 3 mm, 5 mm or 10 mm and/or at most 15 mm, 20 mm, 25 mm or 30 mm. In particular, in apparatuses according to the second, third and fourth aspects of the disclosure, the limiting wall preferably has a plurality of such recesses, in particular at least two in the second and fourth aspects of the disclosure and at least three in the third aspect of the disclosure.

As described above, the drive means according to the first to fourth aspects of the disclosure are preferably respectively associated with a further drive means opposite in the starting material thickness direction, with which the respective drive means forms a drive means pair. In an exemplary embodiment, one drive means of the pair of drive means is attached to the guide wall, in particular with recesses, as described above. The respective other drive means of a pair of drive means is preferably mounted on the limiting wall, in particular adjustable limiting wall, opposite in the starting material thickness direction. The axis of rotation of the drive means mounted on the adjustable limiting wall is preferably arranged in the starting material thickness direction between the adjustable limiting wall and an intermediate wall. The intermediate wall can in particular be formed in the shape of a plate and extend in particular parallel to the adjustable limiting wall. In particular, the intermediate wall can taper in a funnel shape in the conveying direction. In an exemplary embodiment, the intermediate wall has at least one recess, preferably a respective one for each drive means rotatably mounted thereon, through which the respective drive means projects into a limiting channel defined by the intermediate wall and the guide wall. In an exemplary embodiment, the recess is formed like the recess described above with respect to the guide wall. In particular, the adjustable limiting wall, the intermediate wall, the guide wall, and the respective drive means rotatably mounted on the adjustable limiting wall are aligned with respect to one another in such a way that, in particular in the operating position, the drive means projects into by at least 1%, 3%, 5%, 10% or 15% and/or at most 20%, 25%, 30%, 40% or 45% of the radial extension of the at least one drive means beyond the intermediate wall into the limiting channel.

In an exemplary embodiment, in apparatuses according to the second and third aspects of the disclosure, the drive means and recesses are spaced apart from one another in the starting material width direction. In this embodiment, the motor is preferably arranged in starting material width direction between the two drive means. Alternatively, or additionally, a gear is arranged in starting material width direction between the drive means. In an exemplary embodiment, the gear is attached to the guide wall, in particular to the side of the guide wall facing away from the convergence channel (mounting side). Both the gear and the motor may be arranged in the starting material width direction between the drive means. In an exemplary embodiment, the gear is arranged at the same conveying direction height of the drive means. In an exemplary embodiment, the motor is arranged downstream of the drive means and/or the gear in the conveying direction. The motor output shaft of the motor may extend from the motor upstream to the gear in the conveying direction, in particular is coupled upstream to the gear in the conveying direction.

Surprisingly, it has been found that for forming the smallest possible packaging products, it is advantageous to compress the starting material or the transversely compressed starting material in the conveying direction. Thereby, the resulting packaging product exhibits an increased damping property in the starting material longitudinal direction. To achieve this, the apparatus according to the first, second, third and/or fourth aspects of the disclosure may preferably comprise two conveying devices. In this regard, one of the two conveying devices is preferably the previously described conveying device of the forming station according to one of the previously described aspects of the disclosure. The second conveying device is preferably conveying device downstream of the forming station in the conveying direction, in particular an embossing and/or perforating station. In an exemplary embodiment, the two conveying devices are formed such that the starting material can be compressed between the two conveying devices. For this purpose, one of the conveying devices, for example the conveying device of the forming station, can be designed in such a way that it can communicate a higher conveying speed to the starting material than the other conveying device, for example the embossing and/or perforating station. At a sufficiently high speed difference, for example at a conveying speed that is at least 10%, 15%, 20% or 30% higher, between the two conveying devices, the starting material is compressed to such an extent that it makes waves. In particular, wave mountains and wave valleys are formed spaced apart from one another in the starting material thickness direction.

While this corrugation has been shown to be beneficial to the damping properties of the packaging product, it has been shown that excessive corrugation (compression) creates an increased risk of material jamming. As previously described, this very risk can be minimized by the apparatuses according to the disclosure, in which the starting material is smoothed. This seems to be in particular due to the fact that the wave mountains are folded over in the direction of the wave valleys by the drive means according to the disclosure, which surprisingly on the one hand maintains the damping properties and on the other hand reduces the extension in the starting material thickness direction, which in turn reduces the jamming risk. The folding over of the wave mountains is to be understood in particular as a breaking of the wave mountains, as can be observed in the case of a wave flowing toward a flat shore.

Furthermore, the disclosure relates to a system comprising an apparatus according to one or more of the previously described aspects of the disclosure and a starting material supply, in particular a starting material roll, in particular in the form of a coreless roll, or a leporello-stack, arranged in particular upstream of the apparatus in the conveying direction, wherein preferably a web-shaped starting material extends from the starting material supply, in particular from the outer circumference of the starting material roll, into the preforming station.

Furthermore, the disclosure relates to the use of an apparatus according to one or more of the aspects described above for producing a three-dimensional packaging product from a web-shaped starting material, in particular paper starting material, wherein the web-shaped starting material is drawn off from the outer circumference of the starting material roll, in particular in the form of a coreless roll.

Furthermore, the disclosure relates to a packaging product which is produced from a web-shaped starting material, in particular paper starting material, by means of an apparatus according to one or more of the aspects described above or in the system described above and/or whose width dimensioned transversely to the longitudinal web direction is less than 12 cm and/or whose length in the longitudinal web direction is less than 30 cm. It has been found in the prior art that there is a great need for miniature packaging products, which can be satisfied by the packaging products according to the disclosure.

According to a further aspect of the present disclosure, which can be combined with the preceding aspects and exemplary embodiments, there is provided an apparatus for producing a three-dimensional packaging product, such as a cushioning product, from a web-shaped starting material, such as a single- or multi-layered paper web, in particular paper. Producing a three-dimensional packaging product is to be understood in particular as the conversion of a web-shaped starting material into a state having a greater extension in the starting material thickness direction compared to the starting material. Waste paper is increasingly being used for the paper material, mainly for ecological reasons, which, however, due to its inhomogeneity it is difficult to form, especially if the three-dimensional packaging product is always to be produced uniformly and as simply and economically as possible. The starting material web can be made of paper, such as recycled paper, in particular waste paper and/or 100% recyclable paper, which can be produced without chemical ingredients. Recycled paper may include paper materials with a low percentage (less than 50%) of fresh fiber-containing paper material. For example, paper materials containing 70% to 100% recycled paper are used. The recycled paper in the sense of the present disclosure can be paper material that can have a tensile strength index along the machine direction of at most 90 Nm/g, preferably a tensile strength of 15 Nm/g to 60 Nm/g, and a tensile strength index transversely to the machine direction of at most 60 Nm/g, preferably a tensile strength of 5 Nm/g to 40 Nm/g. A DIN EN ISO 1924-2 or DIN EN ISO 1924-3 standard can be used to determine the tensile strength or tensile strength index. Additionally, or alternatively, a recycled paper property or waste paper property can be characterized by the so-called burst resistance. A material in this sense is recycled paper with a burst index of at most 3.0 kPa*m^2/g, preferably with a burst index of 0.8 kPa*m^2/g to 2.5 kPa*m^2/g. The DIN EN ISO 2758 standard is used to determine the burst index. Furthermore, the packaging material has a basis weight of, in particular, 40 g/m2 to max. 140 g/m2. The starting material can be in the form of a material web roll or a zigzag-folded packaging material stack, also known as a leporello-stack.

The apparatus can generally be dimensioned and arranged in such a way that it is miniaturized, i.e. significantly smaller in size than corresponding apparatuses in the prior art and/or capable of producing significantly smaller packaging products. Thus, the need for small packaging products can be satisfied. On the other hand, apparatuses according to the disclosure meet the demand for increasingly smaller available storage areas for such apparatuses. For example, as a rule of thumb for the overall dimension of apparatuses according to the disclosure, it has been required that they not exceed the outer dimension of a standard industrial pallet. For example, apparatuses according to the disclosure have an overall dimension of less than 650 mm length in conveying direction, of less than 450 mm width transversely to the conveying direction, and of less than 300 mm height transversely to the conveying- and width direction. The apparatus according to the disclosure may be arranged to produce small or miniature packaging products or cushions. Such small or miniature packaging products may have a length in conveying direction of less than 30 mm, a width of less than 120 mm, in particular in the range of 80 to 90 mm, and a height of less than 40 mm, in particular in the range of 20 to 30 mm.

A first aspect of the disclosure relates to an apparatus for mechanically producing a three-dimensional packaging product from a web-shaped starting material, in particular paper starting material. The apparatus comprises a forming station having a convergence channel for transversely compressing, in particular turning-in or rolling-in, of the starting material, wherein a limiting wall of the convergence channel is adjustable, in particular pivotable, between an operating position, in which the starting material is transversely compressed as it is conveyed through and a releasing position, in which access into the convergence channel is released, wherein the forming station has a conveying device for drawing off the starting material from a starting material supply which is arrangeable upstream of the forming station in the conveying direction. The conveying device has at least one drive means which is rotatably mounted on the adjustable limiting wall, and, in the operating position of the adjustable limiting wall, is movable transversely to the conveying direction, in particular in the starting material thickness direction. Insofar as previously and subsequently a movement, an extension or a direction is indicated as "transversely" to a reference direction, in this case the conveying direction, it is to be understood by this in particular that the corresponding movement, extension or direction does not run parallel to the reference direction, but runs inclined, in particular at an angle of at least 10°, 20°, 30°, 40%, 50°, 60°, 70° or 80°, preferably orthogonally, to the reference direction. For example, the movability of the drive means transversely to the conveying direction described above is to be understood in that the same is not movable parallel to the conveying direction but is movable, for example, orthogonally to the conveying direction, in particular in the starting material thickness direction.

By attaching the rotatably mounted drive means to the adjustable limiting wall, the at least one drive means in the releasing position can be moved with the limiting wall away from the convergence channel, facilitating both dust removal and threading-in of web-shaped starting material into the apparatus. However, attempts to attach rotatable drive means to adjustable limiting walls of conventional apparatuses have been found to increase material jams and/or decrease the reliability with which the web is drawn into the device. Without being bound to an explanation, this seems to be due to the fact that the adjustable, in particular movable, bearing of the limiting wall in generic apparatuses have too much play for reasons of cost and installation space efficiency, so that the movable drive means is no longer in the same position as before even after the adjustable limiting wall has been adjusted once from the operating position to the releasing position and from the releasing position back to the operating position. This appears to affect the reliability of the feed. Attempts to increase the reliability of the feed by increasing the force acting between the starting material and the drive means in the operating state (force transmission contact) have led to an increased occurrence of material jams. Reducing the force acting in the force transmission contact in turn lead to a deterioration of the feeding reliability. Selecting an adjustable bearing for the cover with smaller play proved to be uneconomical and detrimental to the weight of the apparatus. Surprisingly, it has been found that the fact causing the problem, namely the adjustability, in particular movability, of the limiting wall with the drive means between the operating position and the releasing position, can be compensated by an additional movability, namely the movability of the drive means in the operating position. It has been shown that the drive means thereby has a kind of floating bearing in the operating position, which surprisingly can compensate for both incorrect positioning due to play in the adjustable bearing of the limiting wall and fluctuations of the web-shaped starting material in the starting material thickness direction in such a way that the risk of material jams is reduced and the reliability of the feed is increased.

In an exemplary embodiment, the adjustable limiting wall is formed trapezoidally. In particular, the adjustable limiting wall tapers in the conveying direction, in particular trapezoidally. The adjustable limiting wall may be a limiting wall that delimits the convergence channel upward in the direction of gravity. In particular, this can ensure that the weight force of the adjustable limiting wall is used to amplify a force acting between the starting material and the rotatably mounted drive means in the force transmission contact. This can increase the reliability of the feed of starting material. In particular, the limiting wall is pivotable between the operating position and the releasing position, in particular pivotable via a pivot axis extending transversely to the conveying direction, in particular in the starting material width direction.

Producing a three-dimensional packaging product is to be understood in particular as the conversion of a web-shaped starting material into a state with a greater extension in the starting material thickness direction compared to the starting material. This can be achieved, for example, by transversely compressing as described above and below. The compression may be followed by the attachment of longitudinal strips that have been turned-in or rolled-in during transversely compressing. For this purpose, the apparatus has in particular an embossing and/or perforating station arranged downstream of the forming station.

By the conveying direction in particular the direction is to be understood in which the starting material is drawn off during operation from the starting material supply, such as a starting material roll, in particular in the form of a coreless roll, or a leporello-stack, and conveyed through the apparatus. This direction may also be referred to as the starting material longitudinal direction.

The starting material width direction means in particular the direction in which the starting material extends between longitudinal edges of the web-shaped starting material. In particular, the longitudinal edges extend in the conveying direction. In particular, the starting material width direction is the direction in which the starting material is transversely compressed as it is conveyed through the forming station.

A web-shaped starting material is to be understood in particular as a starting material which extends in particular planarly along the starting material longitudinal direction (conveying direction) and the starting material width direction. In particular, orthogonally to an area defined by the starting material longitudinal direction and the starting material width direction, the web-shaped starting material extends in a starting material thickness direction. In particular, the extension, in particular strength or thickness, of the web-shaped starting material in the starting material thickness direction is significantly smaller than the extension, in particular width, of the web-shaped starting material in the starting material width direction. By significantly smaller it is to be understood in particular an extension in the starting material thickness direction of at most 20%, 10%, 5%, 3%, 2%, 1% or 0.5% of the extension of the starting material in the starting material width direction.

In particular, the starting material longitudinal direction, the starting material width direction and the starting material thickness direction define a coordinate system with three mutually orthogonal directions, also known as a Cartesian coordinate system. In particular, in embodiments in which the starting material is redirected, the coordinate system travels with the starting material. For example, in one embodiment, the starting material may be conveyed in a horizontal direction from the starting material supply to the apparatus. At the apparatus, the starting material may then be redirected in a horizontal direction in which it passes through the apparatus. In this case, prior to entering the forming station, the conveying direction corresponds to a vertical direction and the starting material thickness- and width direction correspond to horizontal directions, respectively. Within the apparatus, the conveying direction and the starting material width direction each correspond to a horizontal direction, and the starting material thickness direction corresponds to a vertical direction.

Information on features of the apparatus and its components, such as the forming station, made with respect to conveying direction, starting material thickness direction and/or starting material width direction therefore always refers to the coordinate system as it is aligned at conveying direction height of the corresponding component or a section of the component.

Since the directions in which the starting material extends in width and thickness can change and partially overlap during and after transversely compressing, the traveling coordinate system is determined in the state of the starting material before its transversely compressing, in particular in the starting material supply, between the starting material supply and the apparatus or immediately before the first transverse compression. In particular, the coordinate system is determined upon entering the forming station. In an example where the starting material enters the apparatus horizontally, the conveying direction and the starting material width direction correspond to respective horizontal directions extending orthogonal to each other, and the starting material thickness direction corresponds to a vertical direction. In this example, if the starting material were to be subsequently redirected in the vertical direction, the coordinate system would correspondingly move with the starting material or the transversely compressed material, so that subsequently the starting material thickness direction and the starting material width direction would each correspond to horizontal directions extending orthogonal to each other, and the conveying direction would correspond to a vertical direction.

In particular, within the forming station, the starting material width direction can alternatively be referred to as the convergence direction. The convergence direction extends in particular orthogonally to the conveying direction and describes the direction in which the extension of the convergence channel decreases in the conveying direction, in particular due to the channel tapering in the conveying direction. Alternatively, or additionally, the starting material thickness direction can be referred to as the normal direction, particularly within the forming station. The normal direction is the direction describing a normal to a plane defined by the conveying direction and the convergence direction. It should be understood that all indications made before and below about the starting material width direction and the starting material thickness direction within the apparatus, in particular forming station, can also be made on the basis of the convergence direction and the normal direction.

The convergence channel is to be understood, in particular, as a channel that tapers in the conveying direction. In particular, the convergence channel tapers in a funnel shape in the conveying direction. In particular, the convergence channel is delimited in the starting material thickness direction at least from one side by at least one, limiting wall. In particular, the at least one limiting wall is formed in a funnel shape and/or tapers in a funnel shape, in particular in conveying direction. In particular, the at least one limiting wall extends in a planar manner in the conveying direction and starting material thickness direction, in particular in the operating state. In an exemplary embodiment, the at least one limiting wall is formed as an adjustable limiting wall according to the first aspect of the disclosure and/or as a pivotable limiting wall according to the second aspect of the disclosure.

In particular, the at least one limiting wall has two limiting walls which, in particular in the operating state, lie opposite each other in the starting material thickness direction and extend in particular parallel to each other. In particular, both limiting walls are formed trapezoidally and/or taper trapezoidally in conveying direction. In particular, the convergence channel is delimited on both sides by the two limiting walls in the starting material thickness direction, in particular in the operating state. In an exemplary embodiment, one of the two limiting walls is formed as an adjustable limiting wall according to the first aspect of the disclosure and/or as a pivotable limiting wall according to the second aspect of the disclosure. The second limiting wall is preferably formed as a guide wall. A guide wall it is to be understood in particular as a limiting wall against which starting material entering the forming station is guided, in particular is supported in the starting material thickness direction during transverse compression. The guide wall may be designed as a mounting plate, on the guide side thereof, which is facing the convergence channel, starting material entering the forming station is guided and on which at least one drive means of the conveying device is rotatably mounted and a motor driving the at least one drive means is attached. The adjustable limiting wall is also referred to hereinafter as the cover for simplified readability. The guide wall is also referred to hereinafter as the bottom for simplified readability. However, it should be made clear that these terms (cover and bottom) are for simplified readability only and are not intended to impose any mandatory restrictions.

Alternatively, or additionally, the forming station has at least two side walls delimiting the convergence channel in the starting material width direction. In particular, the at least one side wall has two side walls that run toward each other in conveying direction. In particular, the two side walls delimit the convergence channel on both sides in the starting material width direction. In particular, the convergence channel tapers as a result of the side walls running towards each other in the conveying direction, so that the extension of the convergence channel in the starting material width direction is greater, in particular at least 100%, 150%, 200% or 300% greater, at the upstream end of the forming station in the conveying direction than at the downstream end of the forming station in the conveying direction.

In an exemplary embodiment, the forming station has a starting material inlet via which the starting material can be drawn into the forming station, and a starting material outlet via which the transversely compressed starting material can be discharged from the forming station. In particular, the forming station is delimited between the starting material inlet and the starting material outlet by one or more of the previously described limiting walls and/or side walls in the starting material width direction and/or in the starting material thickness direction. In particular, the at least two side walls together with the trapezoidal limiting walls circumferentially delimit the convergence channel in the operating position between the starting material inlet and the starting material outlet. In an exemplary embodiment, the side walls, the adjustable limiting wall and/or the guide wall delimits the convergence channel up to the channel output. In an exemplary embodiment, the channel output is spaced apart by a maximum of 200 mm, 150 mm, 100 mm, 75 mm, 50 mm, 30 mm, 15 mm or 5 mm from an embossing and/or perforating zone of an embossing and/or perforating station adjoining the forming station in the conveying direction. In particular, this allows the transversely compressed starting material to be kept straight up to the embossing and/or perforation zone, which in particular prevents tearing of laterally turned-in longitudinal edge strips and thus the occurrence of tears and paper jams.

As described above and below, the starting material is preferably transversely compressed when passing through the convergence channel. In an exemplary embodiment, transversely compressing is to be understood as turning-in or rolling-in longitudinal edge strips of the starting material web, in particular for forming outer crumpled cavities in the starting material width direction.

For this purpose, the starting material is preferably received and guided in the operating position via a limiting wall, in particular one of the trapezoidal limiting walls described above, and in particular is supported in the starting material thickness direction. In an exemplary embodiment, this limiting wall is the previously described guide wall, such as a mounting plate. In an exemplary embodiment, as the starting material is conveyed further through the convergence channel in the conveying direction, the longitudinal edge strips of the starting material which lie on the outside in the starting material width direction push against the side walls and are redirected by them in the starting material thickness direction, in particular turned-in. By means of the side walls running towards each other in conveying direction, the longitudinal edge strips are further redirected in starting material thickness direction as it is conveyed through the convergence channel until they are preferably transferred to turn-over cheeks, at which the redirected longitudinal edge strips are directed back in starting material thickness direction as it is conveyed through. Alternatively, or additionally, rolling-in can occur in that the longitudinal edge strips push against a further limiting wall, in particular the second trapezoidal limiting wall described above, against which the redirected longitudinal edge strips are directed back, in particular rolled-in, as it is conveyed through in the starting material thickness direction.

In an exemplary embodiment, the limiting wall directing back the longitudinal edge strips and/or the limiting wall supporting the turn-over cheeks form the adjustable limiting wall described above. When the adjustable limiting wall is displaced to the releasing position, the portion of the convergence channel previously covered by the adjustable limiting wall is released, allowing engagement with the convergence channel.

Alternatively, or additionally, transversely compressing can also be understood as a simple compression, in particular accordion-like compression, of the starting material in the starting material width direction.

In an exemplary embodiment, the at least one drive means is movable relative to the adjustable limiting wall in the operating position. This can be ensured, for example, by translatory mounting of the rotatably mounted drive means transversely to the conveying direction, in particular in the starting material thickness direction. In an exemplary embodiment, the translatory mounting is formed as a spring mounting. For this purpose, the translatory mounting preferably has a spring, in particular a compression spring and/or a coil spring. The spring is preferably compressible and/or stretchable transversely to the conveying direction, in particular in the starting material thickness direction. In particular, the spring is arranged transversely to the conveying direction, in particular in the starting material thickness direction, between two support points. In particular, the spring is guided between the support points by a spring guide. In the case of a coil spring, the spring guide can be a guide rod that guides the inner side of the coil spring. One support point may be formed by the adjustable limiting wall itself or by a web of the translatory mounting, for example of a U-shaped bearing. The other support point can be a shaft, in particular a wheel shaft, carrying the at least one rotary means.

In an exemplary embodiment, the at least one drive means rotatably mounted on the adjustable limiting wall has at least two drive means, both of which are movably mounted transversely to the conveying direction, in particular in the starting material thickness direction, in particular via the bearing or spring mounting described above, to the adjustable limiting wall. The two drive means may be coupled to each other via a common rotary shaft. In an exemplary embodiment, the two drive means are spaced apart from one another along the rotary shaft in the starting material width direction. In an exemplary embodiment, a respective spring, in particular a compression spring and/or coil spring, is attached, in particular supported, to an end of the rotary shaft facing the respective drive means. In this case, the rotary shaft forms in particular one of the support points described above. In this way, it can be ensured in particular that thicknesses of the starting material that fluctuate in the starting material width direction are compensated for by individual compensating movements of the individual drive means. In an exemplary embodiment, the at least one spring is biased, in particular compressed or stretched, in the operating position between the at least one drive means and the adjustable limiting wall.

In particular, this bias of the at least one spring is brought about by a relative movement between the at least one drive means and the limiting wall transversely to the conveying direction. The relative movement between the at least one drive means and the adjustable limiting wall may be affected by displacing the limiting wall into the operating position, in particular by the at least one drive means deflecting towards the adjustable limiting wall along its movability transversely to the conveying direction, in particular in the starting material thickness direction, when encountering a resistance, such as a corresponding drive means or a limiting wall.

Alternatively, or additionally, the limiting wall and the at least one drive means, in addition to adjustability, in particular pivotability, between the operating position and the releasing position, have a further degree of freedom of movement within the operating position, and are in particular additionally movable purely translationally within the operating position. The additional movability in the operating position may be realized via a guide link of the adjustable limiting wall. In particular, the guide link allows a movement, in particular a pivotable movement, of the limiting wall from the releasing position into the operating position and vice versa and, in the operating position, a translational movement transversely to the conveying direction, in particular in the starting material thickness direction.

In an exemplary embodiment, the guide link is formed by at least one pin on one wall of the forming station and a link recess on another wall of the forming station. In an exemplary embodiment, the at least one pin is attached to the cover, in particular to a section of the cover extending in the starting material thickness direction, and/or the link recess is attached to the bottom, in particular to a section of the bottom extending in the starting material thickness direction, or vice versa. In an exemplary embodiment, the link recess is formed as a curved link, in particular as a U-shaped or J-shaped link recess. A U-shaped or J-shaped link recess is to be understood, for example, as a recess in a wall which extends first in a starting material thickness direction, for example in the direction of gravity, then in the conveying direction and finally in the opposite starting material thickness direction, for example opposite to the direction of gravity.

In embodiments in which the cover is movable within the operating position in addition to the adjustability between the operating position and the releasing position, the at least one drive means may be immovable relative to the cover except for its rotatable bearing.

In an exemplary embodiment, the forming station has a pressing device which presses the at least one rotatably mounted drive means against the starting material in the operating position of the adjustable limiting wall for forming a force transmission contact between the drive means and the starting material. In embodiments in which the movability of the at least one drive means in the operating position is affected via a spring, in particular spring mounting, this spring may simultaneously act as a pressing device. In embodiments in which the movability of the at least one drive means in the operating position is realized via an additional movability of the cover within the operating position, the pressing device can be realized, for example, via a drive which presses the drive means against the starting material.

It should be made clear that a pressing device is to be understood as an active element, such as a spring or a drive. Passive elements, such as an adjustable cover, which merely transmit their weight force to the drive means, are not to be understood as pressing devices. In particular in the miniaturization of the apparatus, it has become apparent that the inherent weight of components such as the cover is no longer sufficient to provide a particularly reliable force transmission contact. In this respect, it is advantageous to use a pressing device, in particular for miniaturized apparatuses. Nevertheless, it has proven advantageous to attach at least one drive means to a limiting wall delimiting the convergence channel at the top in the direction of gravity and/or being adjustable towards the top in the direction of gravity in order to use the weight force of the limiting wall for the force transmission contact.

In an exemplary embodiment, the force transmission contact is provided by a spring force acting on the starting material from the at least one drive means, in particular of at least 50 newtons, 75 newtons, 100 newtons or 125 newtons and/or at most 175 newtons, 200 newtons, 250 newtons or 300 newtons.

In particular, the spring force is provided by at least one spring, in particular spring mounting, biased in the operating position. In an exemplary embodiment, the spring mounting is provided by the spring mounting described above. In particular, the at least one spring mounting may comprise at least one spring biasing the rotatable drive means against the starting material in the operating position. The at least one spring may be formed as a coil spring and/or a compression spring. The at least one spring can be spring-mounted transversely to the conveying direction, in particular in the starting material thickness direction, so that it is compressed and/or stretched transversely to the conveying direction, in particular orthogonally to the conveying direction, when the adjustable limiting wall is displaced into the operating position. As described below, the at least one drive means preferably has two drive means rotatably mounted on the adjustable limiting wall or a drive roller. In the case of at least two drive means, these are preferably respectively acted upon in the operating position by a spring force via a spring mounting. In the case of a drive roller, the same is preferably flanked by two springs in the starting material width direction. For the springs, it has proved advantageous to use springs which provide an average spring force of between 2 and 6 N/mm during compression or extension and/or are biased and/or stretched between 10 mm and 30 mm in the operating position. The at least two springs may be supported on one side on the adjustable limiting wall, or a support point attached thereto, and on the other side on a drive means shaft, in particular wheel shaft or roller shaft, bearing the at least one rotatable drive means.

Alternatively, or additionally, the spring force is provided by tensioning the adjustable limiting wall with respect to a further limiting wall of the convergence channel, in particular by means of connecting elements, such as clamps, screws or a guide link. Clamps can be implemented in particular by means of at least one tab which, in the operating position, engages around a lug. A guide link can be implemented in particular by means of a link recess in which a pin is guided. The spring force can be built up by compressing the previously described spring by tensioning, thereby providing a spring force.

In an exemplary embodiment, the spring force in the operating position acts substantially in the starting material thickness direction. In this context, "substantially" should be understood to mean a deviation of no more than 45°, 30°, 15°, 10°, 5°, 3° or 1° from the starting material thickness direction.

Alternatively, the spring force can also be realized by the at least one drive means having an elastically definable rolling-off region which, while tensioning the adjustable limiting wall with respect to a further limiting wall, deforms, while forming an elastic restoring force, which acts as a spring force from the drive means on the starting material. The at least one drive means rotatably mounted on the adjustable limiting wall may be a drive means of a pair of drive means, of which both drive means each have an elastically definable rolling-off region, which are pressed against one another in the operating position while forming an elastic deformation restoring force.

As an alternative to the embodiment with springs, the force transmission contact can be provided by an electrical, pneumatical or hydraulic drive. In particular, the drive is arranged not only for providing a force transmission contact but also for displacing the adjustable limiting wall from the operating position to the releasing position or vice versa.

In an exemplary embodiment, the at least one drive means rotatably mounted on the adjustable limiting wall is at least one conveying wheel and/or at least one conveying roller. In particular, a conveying roller is understood as a rotatably mounted drive means whose axial extension is greater, preferably at least 10%, 30%, 50%, 70%, 100%, 150%, 200%, 300%, 350%, 400%, 500%, 600%, 700%, 800%, 900% or 1000% greater, than its radial extension. In an exemplary embodiment, the axis of rotation at least one rotatably mounted drive means extends in the starting material width direction. In an exemplary embodiment, the at least one rotatably mounted drive means is in engagement with starting material drawn into the forming station in the operating state and/or is spaced apart from starting material drawn into the forming station in the releasing position.

In an exemplary embodiment, the at least one drive means rotatably mounted on the adjustable limiting wall comprises at least two drive means rotatably mounted on the adjustable limiting wall, which are preferably movable in the operating position of the adjustable limiting wall transversely to the conveying direction, in particular in the starting material thickness direction. As previously described, the movability of the drive means in the operating position transversely to the conveying direction has surprisingly been found to compensate for the problems caused by the movable bearing of the limiting wall. In this context, movability in the starting material thickness direction has been found to be particularly advantageous, as this helps in particular to compensate for fluctuations in the thickness of the starting material.

In an exemplary embodiment, the conveying device comprises at least one pair of rotatably mounted drive means, in particular at least one pair of conveying wheels or one pair of conveying rollers, which are braced against one another in the operating position while forming a force transmission contact with the starting material and are spaced apart from one another in the releasing position. In particular, the at least one drive means mounted on the adjustable limiting wall forms a drive means of the at least one pair of drive means, wherein preferably the other drive means of the at least one pair of drive means is rotatably mounted on a limiting wall opposite the adjustable limiting wall in the starting material thickness direction. The drive means attached to the adjustable limiting wall may be formed as a conveying wheel or conveying roller, the radius of which is smaller than the radius of the drive means mounted on the opposite limiting wall and formed as a conveying wheel or conveying roller.

The conveying devices may have at least two of the pairs of drive means described above, in particular pairs of conveying wheels, which are spaced apart from one another, in particular in the starting material width direction, and/or are arranged at the same conveying direction height.

Particularly in embodiments with at least one pair of rotatably mounted drive means, the movability of the at least one drive means mounted on the adjustable limiting wall has proven to be advantageous. It has been shown that incorrect positioning of the drive means of a pair relative to one another, caused for example by excessive play of the cover, to be compensated for by the movability of the drive means attached to the cover within the operating state. Further, in particular, this can provide simplified engagement with the convergence channel. Further, in the releasing position, insertion of starting material into the forming station can be simplified by spacing the drive means apart.

A second aspect of the disclosure also relates to an apparatus for mechanically producing a three-dimensional packaging product from a web-shaped starting material, in particular paper starting material. The apparatus comprises a forming station having a convergence channel for transversely compressing, in particular turning-in or rolling-in, the starting material, wherein a limiting wall of the convergence channel is pivotable between an operating position, in which the starting material is transversely compressed as it is conveyed through, and a releasing position, in which access into the convergence channel is released. The forming station comprises a conveying device with at least one rotatably mounted drive means for drawing off the starting material from a starting material supply which is arrangeable upstream of the forming station in the conveying direction. The pivot axis of the limiting wall extends transversely to the conveying direction, in particular in the starting material width direction, at an end section of the limiting wall downstream in the conveying direction.

In an exemplary embodiment, the pivotable limiting wall is shaped trapezoidally. In particular, the trapezoidal limiting wall tapers in the conveying direction. The end section of the limiting wall downstream in the conveying direction is to be understood in particular as a section of the adjustable limiting wall which, starting from the end of the limiting wall downstream in the conveying direction, extends upstream in the conveying direction by less than 30%, 20%, 10% or 5% of the extension of the limiting wall in the conveying direction. The pivot axis of the limiting wall may be arranged outside the convergence channel, in particular spaced apart in the starting material thickness direction from the side of the pivotable limiting wall facing the convergence channel. In particular, the pivot axis is positioned such that the weight of the pivotable limiting wall forces the same downward in the direction of gravity and, in particular, in the conveying direction.

By positioning the pivot axis at the end section of the limiting wall downstream in the conveying direction, the same is, in the releasing position, pivoted away from an upstream end of the forming station in the conveying direction, facilitating engagement with the convergence channel via the upstream end of the forming station in the conveying direction. Further, this facilitates insertion of the starting material into the forming station from the upstream end of the forming station in the conveying direction. As a result, the starting material supply can advantageously be positioned at an end of the forming station upstream in the conveying direction and, at the same time, the insertion of the starting material into the forming station is facilitated. Furthermore, the positioning of the pivot axis according to the disclosure makes it possible, in embodiments with pairs of drive means, for these to be arranged in an end region of the forming station upstream in the conveying direction and simultaneously distanced from one another by displacing the limiting wall into the releasing position. Thus, on the one hand, reliable drawing-in can be provided, in particular by positioning the drive means in the region of the forming station upstream in the conveying direction, and, on the other hand, simplified insertion of starting material as well as simplified dust removal can be provided by the possibility of moving the drive means of a pair of drive means away from each other in the releasing position.

It has proved particularly advantageous to attach at least the at least one rotatable drive means to the pivotable limiting wall, in particular to an end section of the limiting wall upstream in the conveying direction. The end section of the limiting wall upstream in the conveying direction is to be understood in particular as a section of the limiting wall which, starting from the end of the limiting wall upstream in the conveying direction, extends downstream in the conveying direction by at most 30%, 25%, 20%, 15%, 10% or 5% of the extension of the pivotable limiting wall in the conveying direction. Surprisingly, it has been found that in this way the influence of the weight force of the pivotable limiting wall as well as the drive means attached thereto can be used advantageously via the correspondingly long lever between the pivot axis and the force transmission contact to improve the reliability of the feed of starting material.

The apparatus according to the second aspect of the disclosure may be formed according to the apparatus of the first aspect of the disclosure and vice versa. Further, exemplary embodiments of individual components of the apparatus described in connection with the first aspect of the disclosure may advantageously also be formed in the apparatus according to the second aspect of the disclosure, and vice versa.

In an exemplary embodiment, the conveying device comprises a motor and at least one pair of rotatably mounted drive means, wherein one drive means of the at least one pair of drive means is coupled to the motor and the other drive means of the at least one pair of drive means is freely rotatably mounted. In particular, the at least one drive means mounted on the adjustable, in particular adjustable, limiting wall forms the freely rotatable drive means of the at least one pair of drive means. Alternatively, or additionally, the drive means of the at least one pair of drive means coupled to the motor is mounted on a limiting wall opposite the adjustable limiting wall in the starting material thickness direction.

By the bearing the motor on the guide wall, the weight of the adjustable limiting wall and thus the weight force acting on the rotatable drive means via the adjustable limiting wall can be better adjusted, which has a positive effect on the risk of material jams.

In an exemplary embodiment, the forming station has at least one guiding device, such as a sliding rod or a reversing roller, for aligned feeding of the starting material into the forming station. In an exemplary embodiment, the guiding device is attached to or decoupled from the adjustable, in particular pivotable, limiting wall of the convergence funnel. In particular, the forming station has a further guiding device for aligned feeding of the starting material into the forming station via a gap formed between the two guiding devices. This further guiding device is preferably decoupled from the adjustable, in particular pivotable, limiting wall. In particular, the further guiding device is attached to a limiting wall opposite the adjustable limiting wall in the starting material thickness direction.

In particular, in embodiments in which one of the guiding devices is attached to the adjustable limiting wall, the gap between the two guiding devices, which is small in the operating position, can be converted into a large engagement opening by displacing the limiting wall into the releasing position. This can facilitate the insertion of the starting material between the two guiding devices. It also makes it easier to eliminate a material jam occurring between the two guiding devices.

In an exemplary embodiment, the apparatus has a discharge device, in particular an embossing and/or perforating station, downstream of the forming station in the conveying direction for discharging the transversely compressed starting material from the forming station. The downstream discharge may be decoupled from the adjustable, in particular pivotable, limiting wall. This means in particular that the displacement of the adjustable limiting wall between the operating position and the releasing position has no influence on the downstream discharge device. In particular, in embodiments of the downstream conveying devices with a pair of wheels for embossing and/or perforating the previously transversely compressed starting material, the pairs of wheels are not moved relative to each other during the movement of the limiting wall between the releasing position and the operating position. This decoupling of the downstream conveying devices from the adjustable limiting wall of the forming station has proven to be particularly advantageous for dust removal, since the downstream conveying device is still ready for operation even in the releasing position of the forming station. Thus, for example, by driving the drive means of the downstream discharge device in the direction opposite to the conveying direction, material causing jams can be conveyed out of the conveying device, which at the same time can be manually gripped and pulled out by the releasing position of the limiting wall.

Alternatively, at least one drive means, in particular embossing and/or perforating wheel, of the downstream discharge device can be attached to the movable limiting wall. This allows the drive means to be moved away from another drive means of the downstream discharge device when the adjustable limiting wall is displaced into the releasing position, in particular to allow engagement in the contact area of a downstream discharge device designed as a pair of drive means, in particular a pair of embossing and/or perforating wheels. This makes it easier to access and remove material that has accumulated in the downstream discharge device.

A third aspect of the disclosure also relates to an apparatus for mechanically producing a three-dimensional packaging product from a web-shaped starting material, in particular paper starting material. The apparatus comprises a forming station with a convergence channel, which for transversely compressing, in particular turning-in or rolling-in, of the starting material, has two turn-over checks which run towards each other in conveying direction around which longitudinal edge strips of the starting material passing through the apparatus are turned-over. Furthermore, the apparatus comprises an embossing and/or perforating station downstream of the forming station in conveying direction with an embossing and/or perforation zone in which the turned-over longitudinal edge strips are connected to a central region of the starting material. The turn-over checks are aligned with one another in such a way that an imaginary intersection point of the two turn-over cheeks is distanced by a maximum of 30 mm from the embossing and/or perforation zone upstream of the conveying direction. In an exemplary embodiment, the intersection point is spaced a maximum of 25 mm, 20 mm, 15 mm, 10 mm or 5 mm upstream in the conveying direction and/or a maximum of 30 mm, 25 mm, 20 mm, 15 mm, 10 mm or 5 mm downstream in the conveying direction from the embossing and/or perforation zone.

The inventors of the present disclosure have recognized the following conflict of objectives in positioning the intersection point of the two turn-over checks. On the one hand, it should be ensured that the longitudinal edge strips are turned-over sufficiently far inwards before entering the embossing and/or perforating zone in order to be connected to the central region of the starting material in the embossing and/or perforating station. This is important to ensure that the turned-over longitudinal edge strips are actually connected and to prevent longitudinal edge strips that have not been completely turned-over from being pulled past the embossing and/or perforation zone and thus causing jamming. On the other hand, the dimensions of the apparatus should be kept as small as possible. If the intersection point is too far away from the embossing and/or perforation zone upstream in the conveying direction, this will lead to unnecessarily large dimensions of the apparatus. If, however, the intersection point is positioned too far away from the embossing and/or perforation zone downstream in the conveying direction, this can lead to an insufficient connection of the turned-over longitudinal edge strips in the central region. With the previously described positioning of the intersection point relative to the embossing and/or perforation zone, the inventors of the present disclosure have surprisingly found a compromise that considers both the requirements for reliable attachment of the turned-over longitudinal edge strips to the central region and the need for the smallest possible apparatus.

In an exemplary embodiment, the turn-over checks are formed as tubes. In an exemplary embodiment, the turn-over checks have a diameter of at least 10 mm and/or at most 24 mm, in particular of at least 12 mm and/or 20 mm, preferably of at least 14 and/or at most 18 mm. It has been found that the diameters of the turn-over checks influence the size of the crumpled cavities of the packaging product. In this respect, the above preferred diameter range has been found to be particularly preferred for the production of miniaturized packaging products. Turn-over cheeks are to be understood in particular as rods, in particular cylinders. In particular, the turn-over checks run towards each other in conveying direction. In particular, the turn-over checks run towards each other in conveying direction at substantially the same angle as the convergence channel tapers in conveying direction. Substantially is to be understood in particular as a deviation of at most 20°, 15°, 10°, 5°, 3° or 1°. In an exemplary embodiment, the turn-over cheeks are spaced apart in the starting material width direction from side walls which delimit the convergence channel in the starting material width direction, in particular in such a way that longitudinal edge strips of starting material conveyed through the convergence channel can be turned-in between the side walls and the turn-over cheeks. In particular, one turn-over check respectively extends parallel to the side wall adjacent to it. In an exemplary embodiment, the turn-over cheeks are spaced apart in the starting material thickness direction from at least one limiting wall which delimits the convergence channel in the starting material thickness direction, in particular spaced apart on both sides from a respective limiting wall which delimits the convergence channel in the starting material thickness direction. In particular, the turn-over checks extend within the convergence channel between the two limiting walls.

The embossing and/or perforating station can in particular have intermeshing deformation wheels, in particular deformation gears, for embossing and/or perforating the turned-over longitudinal edge strips with a central region of the starting material. The embossing and/or perforation zone is to be understood in particular as the region of the apparatus in which the longitudinal edge strips are embossed with the central region. In the case of an embossing and/or perforation zone comprising deformation wheels which mesh with one another, the embossing and/or perforation zone is in particular located in the region in which the wheels mesh with one another. Alternatively, the embossing and/or perforation zone may be defined by the conveying direction height at which the transversely compressed material traverses a deformation plane defined by the axes of rotation of the intermeshing embossing and/or deformation wheels.

The imaginary intersection point of the two turn-over cheeks means the intersection point of two lines which extend longitudinally through the turn-over checks. In an embodiment of the turn-over cheeks as tubes, the intersection point is the point at which the longitudinal axis, in particular rotation symmetry axis, of the tubes cross. In an exemplary embodiment, the intersection point represents an intersection point. However, the intersection point need not be a meeting point. Thus, in other embodiment, the turn-over checks may be spaced apart from each other in the starting material thickness direction so that the lines cross spaced apart from one another in the starting material thickness direction. In such an embodiment, the intersection point would be the point at which the lines cross when viewed in the starting material thickness direction.

The apparatus according to the third aspect of the disclosure may be formed according to the apparatus of the first and/or second aspect of the disclosure, and vice versa. Further, exemplary embodiments individual components of the apparatus described in connection with the first and/or second aspect of the disclosure may advantageously also be formed in the apparatus according to the third aspect of the disclosure, and vice versa.

In an exemplary embodiment, the turn-over cheeks run towards each other at an angle of at least 40°, 50°, 60°, 70°, 80° or 90° and/or at most 170°, 150°, 130°, 110°, 90° or 80°, particularly preferably 70°±10 or 70°±20. It has been found that as the angle increases, the extension of the apparatus in the conveying direction can be reduced, which is advantageous for miniaturization of the apparatus. On the other hand, an angle which is too large leads to a stronger transverse compression of the starting material in a small space, which is associated with an increased risk of tearing and thus jamming. The previously described region has turned out to be a surprisingly good compromise for solving this conflict of objectives. The side walls may run towards each other at an angle of at least 40°, 50°, 60°, 70°, 80° or 90° and/or at most 170°, 150°, 130°, 110°, 90° or 80°, particularly preferably of 70°±10 or 70°±20, and in particular the convergence channel tapers at a corresponding angle.

Alternatively, or additionally, the turn-over cheeks are spaced apart at their end, downstream in the conveying direction, in the starting material width direction by at least 5 mm, 10 mm or 15 mm and/or at most 40 mm, 30 mm or 25 mm. This distance has proved to be particularly advantageous in order, on the one hand, to enable the starting material to be turned into as small a three-dimensional packaging product as possible and, on the other hand, to keep the dimensions of the apparatus as small as possible.

In an exemplary embodiment, the turn-over cheeks are spaced apart from a limiting wall, in particular guide wall, of the convergence channel in the starting material thickness direction by at least 4 mm and/or at most 20 mm, in particular at least 6 mm and/or at most 16 mm, preferably between 8 mm and 12 mm. It has been found that this distance should preferably not be too small or large, so that the longitudinal edge strips can still be drawn around the turn-over cheeks. In this respect, the above region has been found to be particularly preferred. In an exemplary embodiment, the limiting wall is a limiting wall delimiting the convergence channel in the starting material thickness direction. In particular, such a positioning of the turn-over cheeks relative to the guide wall described above and below has proved advantageous for turning-in and rolling-in the starting material onto a packaging product with a small width extension.

In an exemplary embodiment, the turn-over cheeks are attached to a limiting wall of the convergence channel which is adjustable between an operating position in which the starting material is transversely compressed as it is conveyed through and a releasing position in which access into the convergence channel is released. The limiting wall may be the adjustable limiting wall previously described in connection with the first aspect of the disclosure having rotatably mounted drive means attached thereto and/or the pivotable limiting wall described in connection with the second aspect of the disclosure having a pivot axis extending transversely to the conveying direction at an end section of the limiting wall downstream in the conveying direction.

The apparatus according to the first, second and/or third aspect of the disclosure preferably comprises an embossing and/or perforating station arranged downstream of the forming station in the conveying direction. Alternatively, or additionally, the apparatus comprises a separating station downstream of the forming station in the conveying direction, in particular comprising a translationally guided blade for separating a packaging product of a desired length from the starting material. The apparatus may have both an embossing and/or perforating station and a separating device, wherein the separating device is arranged downstream of the embossing and/or perforating station in the conveying direction. Furthermore, the apparatus preferably comprises an output device for discharging the separated packaging product.

Furthermore, the disclosure relates to a system comprising an apparatus according to one or more of the previously described aspects of the disclosure and a starting material supply, in particular a starting material roll, in particular in the form of a coreless roll, or a leporello-stack, arranged in particular upstream of the apparatus in the conveying direction, wherein preferably a web-shaped starting material extends from the starting material supply, in particular from the outer circumference of the starting material roll, into the preforming station.

Furthermore, the disclosure relates to the use of an apparatus according to one or more of the aspects described above for producing a three-dimensional packaging product from a web-shaped starting material, in particular paper starting material, wherein the web-shaped starting material is drawn off from the outer circumference of the starting material roll, in particular in the form of a coreless roll.

The inventors of the present disclosure have found that, particularly by the first and second aspects of the present disclosure, the reliability of the feed of starting material can be increased such that reliable withdrawal of the starting material can be ensured even from a horizontal starting material roll, particularly in the form of a coreless roll.

Furthermore, the disclosure relates to a packaging product which is produced from a web-shaped starting material, in particular paper starting material, by means of an apparatus according to one or more of the aspects described above or in the system described above and/or whose width dimensioned transversely to the longitudinal web direction is less than 12 cm and/or whose length in the longitudinal web direction is less than 30 cm. It has been found in the prior art that there is a great need for miniature packaging products, which can be satisfied by the packaging products according to the disclosure.

In the following description of exemplary embodiments of the present disclosure, an apparatus according to the disclosure for producing a three-dimensional packaging product from a web-shaped starting material, in particular paper starting material, is generally provided with the reference numeral 1. For the description of the following embodiments with reference to the accompanying figures, it is to be assumed that the overall dimensions of the illustrated apparatuses 1 are such that the apparatus 1 can be placed on a standard industrial pallet and does not exceed the dimensions thereof. For example, the overall length of the apparatus is less than 650 mm, the overall width is less than 450 mm, and the overall height is less than 300 mm. The apparatus 1 of the embodiments illustrated in the figures is adapted to produce small or so-called miniature packaging cushions whose length in the web direction of the starting material is less than 120 mm, in particular is in the range of 80 mm to 90 mm, whose width measured transversely to the longitudinal direction is less than 120 mm, in particular is in the range of 80 mm to 90 mm, and whose height is less than 40 mm, in particular is in the range of 20 mm to 30 mm.

FIGS. 1 and 2 show schematic principle sketches of exemplary embodiments of systems according to the disclosure, each with an apparatus 1 according to the disclosure and a starting material supply 3 arranged upstream of the apparatus 1 in the conveying direction, which may be in the form of a leporello-stack (FIG. 2) or in the form of a starting material roll, in particular in the form of a coreless roll (FIG. 1). In FIG. 1, a web-shaped starting material 5 is shown extending from the outer circumference of the starting material roll 3 into the apparatus 1. In FIG. 2, the bent path of a web-shaped starting material 5 extending from a leporello stack into the apparatus 1 is shown. In FIGS. 1 and 2, the forming station for transversely compressing the starting material is indicated by the reference sign 7.

The apparatus 1 may further be provided with a stand 9 by means of which the apparatus 1 can be placed on the ground and with respect to which the apparatus 1 is adjustable in its orientation and on which the apparatus 1 is adjustable in height.

FIG. 3 shows a schematic representation of a packaging product 100 according to the disclosure, which is produced from a web-shaped starting material 5 by means of an apparatus 1 according to the disclosure and/or whose width a dimensioned transversely to the longitudinal web direction, is less than 12 cm, whose length c in the longitudinal web direction is less than 30 cm, whose vertical extension b is in the range from 2 cm to 3 cm. The packaging products 100 according to the disclosure comprise two lateral crumpled cavities 103, 105 extending in the longitudinal web direction, which are formed by radially inward folding or inward rolling-in of lateral starting material web sections, also referred to previously and hereinafter as longitudinal edge strips, of the starting material. Furthermore, the packaging product 100 according to the disclosure comprises a central attachment- and/or deformation zone 107, also referred to previously and subsequently as the central region of the starting material, in which the folded-over starting material web sections overlap and are bound to one another. A width d of the attachment and/or deformation zone measured in the width direction may be in the range of 2 cm to 2.5 cm, and its vertical extension e may be below 1.5 cm or below 1 cm.

An apparatus 1 according to the disclosure (FIGS. 4 and 5) can be divided into the following main components in the conveying direction, which is indicated by the arrow with the reference sign F in FIGS. 4 and 5:

- a forming station 7, which can also be called a preforming station 7, with a convergence channel for transverse compression of the web-shaped starting material 5, in particular for turning-in and rolling-in of the web-shaped starting material 5 into a three-dimensional intermediate product with at least one crumpled cavity 103, 105 extending in the web direction;
- an embossing and/or perforating station 13 adjoining the forming station 7 in conveying direction F and comprising a pair of intermeshing embossing and/or perforating wheels 15, 17 adapted to longitudinally connect longitudinal edge strips of the starting material to the central region of the starting material extending in web direction;
- a separating station 19 following the embossing and/or perforating station 13 in conveying direction F and having a translationally guided blade 21 for separating a packaging product 100 of a desired length from the starting material web 5; and
- an output device 23 following the separating station 19 in conveying direction F and having a pair of continuous conveyors 25, 27 opposite each other for discharging the separated packaging product 100.

Different embodiments and views of forming station 7 are discussed in detail below.

The starting material thickness direction S is indicated in the figures by the arrow S and the starting material width direction by the arrow B.

The forming station 7 has a convergence channel for transversely compressing, in particular turning-in or rolling-in, the starting material (not shown). The convergence channel 11 can best be seen in FIG. 13. The convergence channel 11 is delimited in the starting material thickness direction S by two opposite limiting walls 29, 65. The limiting walls 29, 65 are formed in a trapezoidal shape and taper in conveying direction F. In the starting material width direction, the convergence channel 11 is delimited by side walls 67. The side walls 67 run towards each other in conveying direction F. The limiting walls 29, 65 and the side walls 67 delimit the convergence channel 11 circumferentially in the operating position. As a result, starting material entering the forming station 7 in conveying direction Fis initially received via a limiting wall 65, against which the starting material is guided, in particular supported in starting material thickness direction S. This limiting wall 65 can also be referred to as guide wall 65 or mounting plate 65. Due to the course of the convergence channel 11 tapering in conveying direction F, longitudinal edge strips of the starting material are turned-in at the side walls 67 in starting material thickness direction S. For assisting this turning-in, the side walls 67 are concavely curved on their side facing the convergence channel 11. The radius of curvature is indicated by the arrow r. As they continue to pass through the convergence channel 11, in other embodiments, the folded-in longitudinal edge strips can push against the limiting wall 29, where they are rolled back in the opposite starting material thickness direction, forming crumpled cavities. In the embodiment shown here, this pushing against is avoided by sections 99 of the side walls projecting into the guide channel, which guide the longitudinal edge strips directly to turn-over cheeks 73, at which the longitudinal edge strips are then rolled back in the opposite starting material thickness direction S. In the embossing and/or perforating station 13 following the forming station, the turned-over longitudinal edge strips are then connected to a central region of the starting material.

As can be seen from FIGS. 4 and 5, for example, the forming station 7 preferably has two guiding devices 69, 71 in the form of reversing rollers 69, 71 for aligned feeding of the starting material into the forming station 7. In the operating position, a narrow gap can be formed between the two reversing rollers 69, 71, through which the starting material can be fed into the forming station 7. In particular, the reversing rollers can be freely rotatably mounted. FIGS. 8*a* and 8*b* show an embodiment in which both reversing rollers 69, 71 are attached to an attachment section 91 on the guide wall side. In this way, the reversing rollers 69, 71 remain close together regardless of the position of the adjustable limiting wall 29. FIG. 9 shows an alternative embodiment in which one of the reversing rollers 69 is attached to the adjustable limiting wall 29. This allows the reversing roller 69 to be spaced apart from the other reversing roller 71 in the releasing position, facilitating both the introduction of starting material and the removal of material jams.

The convergence channel 11 is delimited in the starting material thickness direction S by a guide wall 65 and an adjustable limiting wall 29.

The starting material entering the convergence channel 11 is guided on the guide side of the guide wall 65 facing the convergence channel 11. On the mounting side of the guide wall facing away from the convergence channel 11, a motor 39 is attached and at least one rotatably mounted drive means 33, here in the form of at least two conveying wheels 33 (FIGS. 8*a* and 8*b*). Since the guide wall 65 provides these three functions, namely guiding of the starting material, supporting of the motor, and rotatably bearing the at least one drive means, the guide wall 65 may also be referred to as the mounting plate 65. Hereinafter, the guide wall 65 and the mounting plate will also be referred to as the bottom 65. Transversely to the conveying direction F, here in the starting material thickness direction S, a plate-shaped wave limiter 83 is shown, the distance of which to the guide wall 65 is indicated by the reference numeral k in FIG. 5.

The adjustable limiting wall 29 is pivotable about a pivot axis 57, which extends in the starting material width direction B. Thereby, the pivot axis 57 is located at a downstream end section in the conveying direction indicated by the reference numeral 95 in FIG. 6. The pivotability is provided by a hinge 59 having two hinge members 61, 63. One hinge member 61 is attached to the adjustable limiting wall 29. The other hinge member 63 is attached to the embossing and/or perforating station 13. In FIG. 4, a wheel shaft 43 for receiving rotatable drive means (not shown in FIG. 4), such as conveying wheels (FIGS. 8*a*, 8*b*, 9, 11 and 12) and/or conveying rollers (FIGS. 13 and 14), is shown, as well as a U-shaped bearing 45 receiving the wheel shaft 43. Furthermore, FIG. 4 shows a preferred positioning of the turn-over checks 73 at their downstream end in the conveying direction in front of the embossing and/or perforation zone 77. Further shown in FIG. 4 is a structure providing the tab 49 described in detail below.

FIG. 5 shows the apparatus of FIG. 4, however not in perspective view, but in side view as well as with a central cut through the apparatus 1 in starting material width direction B. In contrast, in FIG. 4 the cut is offset to one side in starting material width direction B with respect to the center of the apparatus 1. Furthermore, FIG. 5 differs from FIG. 4 in that the drive means 31, 33 hidden in FIG. 4 are visible. Identical or similar components are given the same reference numerals in the following figures.

As can be seen from FIG. 5, the motor 39 is aligned in conveying direction F in such a way that its motor output shaft extends longitudinally, in particular parallel, to the conveying direction and projects out of the motor 39 in the direction opposite to conveying direction F and is coupled to the gear 97. In this case, the motor 39 is attached to the mounting plate 65 via the gear 97. The gear 97 in turn transmits the rotary drive movement of the motor output shaft via a drive shaft 81 to the at least one drive means, here in the form of two conveying wheels 33 (compare FIG. 11). As can be seen in particular from FIG. 11, the rotatable mounting of the at least one drive means, in FIG. 11 two conveying wheels 33, is realized via the drive shaft 81 extending in the starting material width direction B, which are attached to the mounting plate 65 via two rotary bearings 109. As can be seen in particular from FIGS. 8*b* and 11, in embodiments with two rotatably mounted drive means, in this case drive wheels 33, attached to the mounting plate 65, the gear 97 and the motor 39 are rotatably mounted in the starting material width direction B between the two rotatably mounted drive means. The wall thickness of the mounting plate is indicated by the reference sign m in FIG. 5.

In the operating position shown in FIG. 5, the wave limiter 83 extends parallel to the guide wall 65. Thereby, a limiting channel is formed between the wave limiter 83 and the guide wall 65. As can be seen in particular from FIGS. 8*a* and 8*b*, the wave limiter 83 and the guide wall 65 are formed in a trapezoidal shape and taper in the conveying direction F. The wave limiter 83 and the guide wall 65 are formed in a trapezoidal shape. In particular, the wave limiter 83 and the guide wall 65 taper at the same taper angle. Due to the trapezoidal shape of the wave limiter 83 and the guide wall 65, the limiting channel is also formed in a trapezoidal shape. As can be seen in particular from the embodiments shown in FIGS. 13 and 14 with conveying rollers 35, 37 instead of drive wheels, the limiting channel in the starting material width direction B is preferably delimited neither by the guide wall 65 nor by the wave limiter 83. This allows longitudinal edge strips of the starting material to leave the limiting channel as it is conveyed through in the starting material width direction B, in particular to be transversely compressed via the side walls 67 and/or the turn-over checks 73.

The length of the convergence channel 11 in conveying direction F between the channel input, via which the starting material is drawn into the convergence channel 11, and the channel output, via which the transversely compressed starting material leaves the convergence channel 11, is indicated in FIG. 5 by the reference numeral n and can also be referred to as convergence channel length n. The extension of the wave limiter in conveying direction F is indicated by reference numeral o in FIG. 5 and may also be referred to as wave limiter length o. As described before, the wave limiter length o is preferably at least 10%, 20%, 30%, 40%, 50% or 60% and/or at most 70%, 80% or 90% of the convergence channel length n. An output region of the convergence channel which extends from the channel output by at least 10%, 20% or 25% and/or at most 30%, 40% or 50% of the convergence channel length n in the direction opposite to the conveying direction F is indicated by the reference sign p in FIG. 5. As described above, the output region is preferably free of the wave limiter 83. In other words, the wave limiter 83 preferably extends in conveying direction F at most to the upstream end of the output region in the conveying direction.

In FIG. 5, a rotatably mounted drive means 31 is visible on the adjustable limiting wall 29. The drive means 31 is mounted via the wheel shaft 43 on the U-shaped bearings 45, which in turn are attached to the adjustable limiting wall 29 (FIG. 8*b*). A spring 47 is indicated between the wheel shaft 43 and the bearing 45, via which the wheel shaft 43 and the at least one drive means 31 attached thereto are movable, in particular spring-mounted, in the starting material thickness direction S. The movability is indicated via the arrow 89. The spring is generally indicated in the further figures by the reference numeral 41. As can be seen in particular from FIG. 11, the forming station 7 preferably has two springs 41 spaced apart from one another in the starting material width direction B, by means of which the wheel shaft 43 is spring mounted relative to the adjustable limiting wall 29. A detailed view of the spring 41 can be seen in FIG. 12.

In FIG. 5, the forming station 7 is shown in an operating position in which the at least one drive means 31 attached to the adjustable limiting wall 29 is pressed against the at least one drive means 33 attached to the guide wall, in particular mounting plate. This improvement can be provided by the previously described spring 41. For this purpose, the adjustable limiting wall 29 can first be displaced into the operating position, for example by a person pressing in the direction of the guide wall 65, against a restoring force provided by the at least one spring 47, and then be fixed in the operating position via a connecting element 49, 51, 53, 55.

As an alternative to a spring 47, the force transmission contact can also be provided by deformation restoring forces of conveying wheels 31, 33 or conveying rollers 35, 37 braced against one another in the operating position.

An example of connecting elements 49, 51 is shown in FIG. 5. Therein, a tab 49 of the adjustable limiting wall 29 engages around a lug 51 of a guide wall-side attachment section 91, which extends in the starting material thickness direction S so that the adjustable limiting wall 29 is held in the operating position.

Alternative connecting elements 53, 55 are shown in FIG. 10. Therein, a bolt 53 is attached to an attachment section 93, in particular a cover-side attachment section 93, of the adjustable limiting wall 29, which extends in the starting material thickness direction S. When displacing the adjustable limiting wall 29 from the releasing position to the operating position, the bolt 53 engages in a link recess 55 of a guide wall-side attachment section 93. In the present case, the link recess 55 is formed as a curved link, in particular as a J-shaped link 55. The same first extends in the starting material thickness direction S, then in the conveying direction F, and finally back in the opposite starting material thickness direction S. In conveying direction F, the movement is then delimited by the guide extending in the opposite starting material thickness direction S, which allows hooking of the bolt 53. In particular, the bolt 53 is forced into the section of the guide recess 55 extending in the opposite starting material thickness direction S by the restoring force of the spring 47. This can prevent the adjustable limiting wall from moving on its own from the operating position to the releasing position. For displacing into the releasing position, the limiting wall 29 must first be pressed down against the restoring force of the spring and then displaced in the direction opposite to the conveying direction F, where the spring force then assists the displacement of the limiting wall 29 into the releasing position.

FIG. 6 shows the forming station 7 described above in FIGS. 4 and 5 in an operating position in which the starting material is transversely compressed as it is conveyed through, in particular turned-in and rolled-up. FIG. 7 shows the forming station 7 in a releasing position in which access into the convergence channel is released. As can be seen in particular from FIG. 7, the attachment of the wave limiter 83, the at least one drive means 31, 35 and/or the turn-over checks 73 to the adjustable limiting wall 29 ensures that all of these components can be moved, in particular pivoted, away from the guide wall 65 and the side walls 67, which facilitates access into the convergence channel 11.

As can be seen in particular from FIGS. 8*a*, 8*b* and 13, the forming station 7 has turn-over checks 73 running towards one another in the conveying direction F, around which longitudinal edge strips of the starting material passing through the apparatus 1 are turned-over. The turn-over checks 73 are formed in a tube-shaped manner. As can be seen in particular from FIG. 13, the turn-over checks 73 preferably run parallel to the side walls 67, a distance being provided between the turn-over cheeks 73 and the side walls 67 in the starting material width direction B which allows the longitudinal edge strips to be turned over between the turn-over cheeks 73 and the side walls 67. As can be seen in particular from FIGS. 8*a* and 8*b*, the turn-over cheeks 73 are attached to the adjustable limiting wall 29.

As can be seen in particular from FIGS. 8*a* and 8*b*, at least one, in particular two, recesses 79 are preferably introduced in the guide wall 65, through which the drive means 33 project sectionally into the convergence channel. This allows the axes of rotation, in particular the drive shaft 81, of the drive means 33 to be arranged outside the convergence channel. In particular, this prevents starting material from becoming entangled with rotating parts, such as the drive shaft 81 and the drive means 33, and thus reduces the risk of material jams.

Furthermore, in the plate-shaped wave limiter 83 shown in FIG. 8*a*, recesses 85 are introduced through which the drive means 31 can extend into the limiting channel described above. In the embodiments shown in FIGS. 13 and 14 with driving rollers 35, 37, the recesses 79, 85 are adapted to the axial extension of the conveying roller 35. As can be seen in particular from FIG. 8*b*, the wave limiter 83 can be attached to the adjustable limiting wall 29 via spacers 41 to provide a mounting space for the drive means 31, 35 between the adjustable limiting wall 29 and the wave limiter. In the embodiment shown here, the spacers 41 act simultaneously as a rotary bearing and spring mounting for the drive means 31, 35.

FIG. 8*b* shows an embodiment in which the wave limiter has two rods 87 extending in conveying direction F, which are spaced apart transversely to the conveying direction by the distance of the wave limiter from the guide wall 65 according to the disclosure. Even though FIG. 8*b* shows the combination of a plate-shaped wave limiter 83 with rods 87 extending in conveying direction F, it should be made clear that the wave limiter does not necessarily have to be plate-shaped. Rather, the wave limiter can also be formed merely by at least one, preferably two, rods 87 extending in conveying direction F, as shown in FIG. 8*b*. In an embodiment with two rods 87 forming the wave limiter, these are preferably spaced apart from one another in the starting material width direction B, in particular by at least 10%, 20% or 30% of the extension of the convergence channel in the starting material width direction at the conveying direction height of the channel input.

In FIG. 8*a*, the angle at which the side walls 67 run towards each other in conveying direction F is indicated by the reference sign β. As can be seen from FIG. 8*a*, the angle β at which the side walls 67 run towards one another in the conveying direction corresponds substantially to the angle α at which the turn-over cheeks 73 run towards one another and/or to the angle at which the convergence channel 11, the guide wall 65 and/or the adjustable limiting wall 29 taper in a trapezoidal shape in the conveying direction F.

As shown, for example, in FIG. 11, the apparatus 1, in particular the forming station 7, has two panels 111 running towards each other in conveying direction F, which together with the mounting plate 65 form an enclosure for the at least one drive means 33 and the motor 39 as well as the gear 97. In the embodiment shown in FIG. 11, the panels 111 and the mounting plate 65 are formed from one piece, in particular bent.

The previously described side walls 67 delimiting the convergence channel 11 in the starting material width direction B, which run towards each other in the conveying direction F in order to turn-in longitudinal edge strips of the starting material passing through the apparatus 1 via the side walls 67, can be taken in particular from FIG. 11. The radius of curvature r according to the disclosure is indicated therein by the reference numeral r. The side walls 67 are formed in the shape of hollow-cylindrical sections. In this case, the jacket of the hollow-cylindrical-section-shaped side walls 67 project inwardly in the starting material width direction B beyond the outer edge 113 of the adjustable limiting wall 29 into the convergence channel 11. The section projecting beyond the outer edge 113 is marked with the reference numeral 99. As can be seen, particularly in the comparison of FIGS. 6 and 7, the side walls 67 are preferably attached to the mounting plate 65.

The at least one drive means 33, 37 rotatably mounted on the guide wall can, for example, have two drive means, in particular drive wheels 33, which are spaced apart from one another at the same height in the conveying direction F and in the starting material width direction B (FIGS. 8*a*, 8*a*, 11 and 15*a*). Alternatively, the at least one rotatably mounted drive means 33, 37 may be formed as at least one conveying roller 35 (FIGS. 13, 14 and 15*b*). For drawing off the starting material, the at least one drive means 33, 37 is motor-driven by the motor 39.

Furthermore, in all of the figures shown, the apparatus has at least one drive means 31, 35 rotatably mounted on the adjustable limiting wall 29, which drive means is freely rotatable, in particular is idle. The at least one freely rotatable drive means can likewise have at least two drive means 31, 35, in particular drive wheels 31, which in the operating state are each arranged opposite the at least two drive means 33 in the starting material thickness direction S (FIG. 11). Alternatively, the at least one freely rotatable drive means 31, 35 can be a conveying roller 35, which in the operating state is arranged opposite the driven conveying roller 37 in the starting material thickness direction S (FIGS. 13 and 14). Two rotatable drive means opposite each other in the operating position thereby form a pair of rotatably mounted drive means.

As can be seen from FIGS. 11, 13 and 14, in the presence of pairs of rotatable drive means, preferably the at least one drive means 31, 35 mounted on the adjustable limiting wall 29 has a smaller radius than the drive means 33, 37 mounted on the opposite limiting wall 65 in the starting material thickness direction S.

FIGS. 15*a* and 15*b* differ only in that conveying wheels 31, 33 are used as drive means in FIG. 15*a* and conveying rollers 35, 37 in FIG. 15*b*. In FIGS. 15*a* and 15*b*, the turn-over checks 73 are aligned with one another in such a way that an imaginary intersection point is distanced by a maximum of 30 mm upstream from the embossing and/or perforation zone in the conveying direction. The imaginary intersection point is indicated by the meeting point 75 of the dashed lines. The embossing and/or perforating zone is indicated by the indicated axis of rotation 77 of two embossing and/or perforating wheels mounted at the same conveying direction height. The preferred maximum upstream distance of the intersection point in the conveying direction from the embossing and/or perforation zone 77 is indicated by the letter f and is preferably a maximum of 30 mm, particularly preferably a maximum of 25 mm, 20 mm, 15 mm, 10 mm or 5 mm. The preferred maximum downstream distance of the intersection point in the conveying direction from the embossing and/or perforation zone 77 is marked with the letter g and is preferably a maximum of 30 mm, 25 mm, 20 mm, 15 mm, 10 mm or 5 mm. Furthermore, the angle at which the turn-over cheeks 73 run towards each other in conveying direction F is marked with the reference sign α. The distance in the starting material width direction B between the turn-over checks 73 at their end downstream in the conveying direction is indicated by the letter h. The distance between the turn-over cheeks 73 and the guide wall 65 is indicated by the letter i in FIG. 5.

In FIGS. 16 to 20, different embodiments of the conveying device are schematically indicated.

FIG. 16 shows an embodiment in which at least one drive means is formed as a conveying roller 35, 37. In this case, a conveying roller 35, 37 is to be understood in particular as a drive means whose axial extension is greater than its radial extension. In an exemplary embodiment, the jacket of the conveying rollers 35, 37 extends in the starting material width direction B by at least 20%, 30%, 40%, 50%, 60%, 70% or 80% of the width extension of the convergence channel 11 at the conveying direction height of the conveying roller 35, 37.

FIG. 17 shows an embodiment with two conveying rollers 35, 37. In an exemplary embodiment, the summed-up width extension of the jackets of the two conveying rollers in the starting material width direction B is at least 20%, 30%, 40%, 50%, 60%, 70% or 80% of the extension of the convergence channel in the conveying direction of the two conveying rollers 35, 37.

Figure 2:
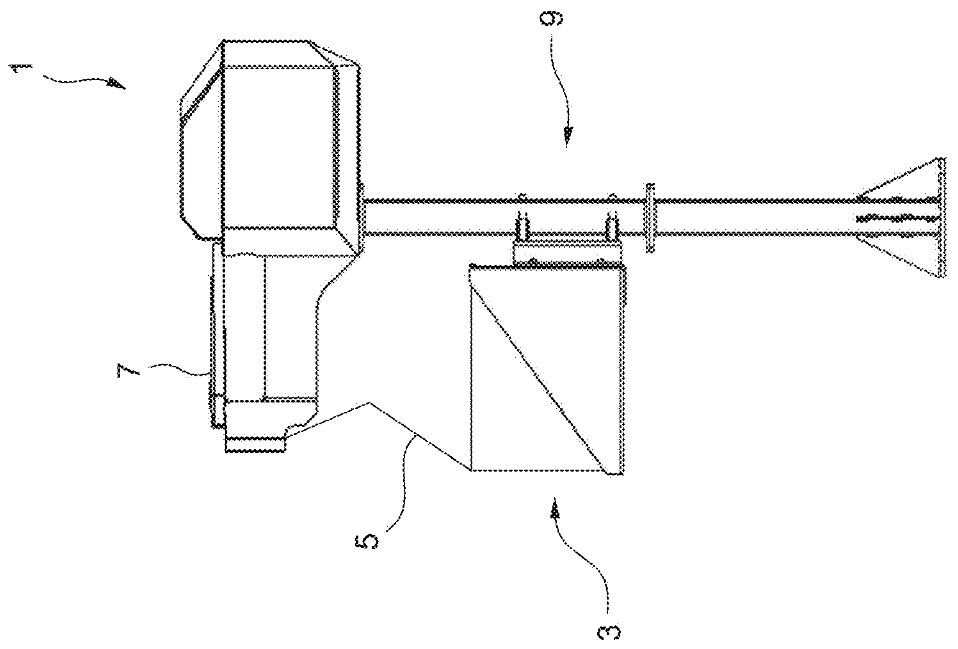
Figure 1:
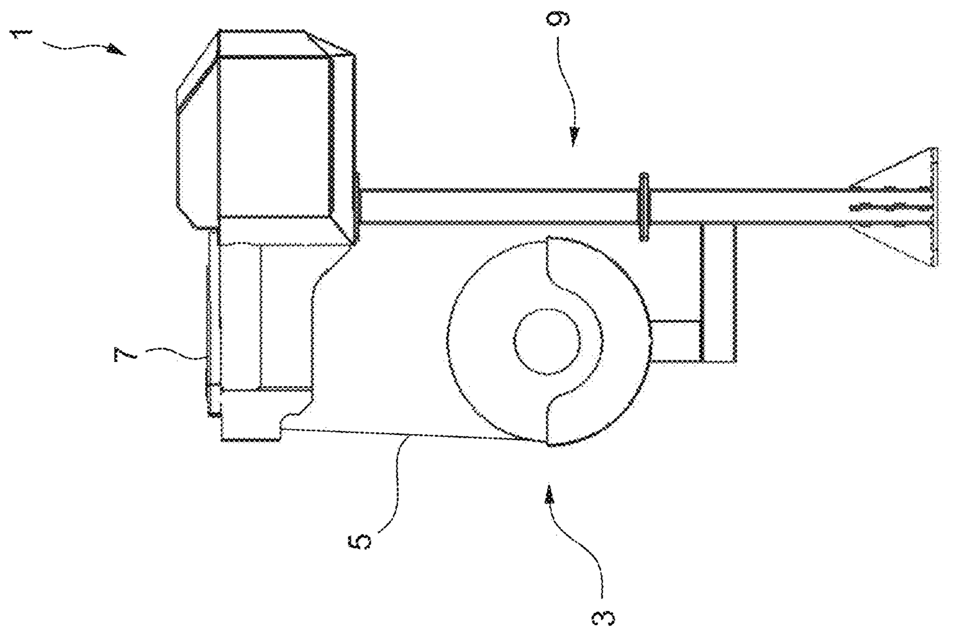
Figure 3:
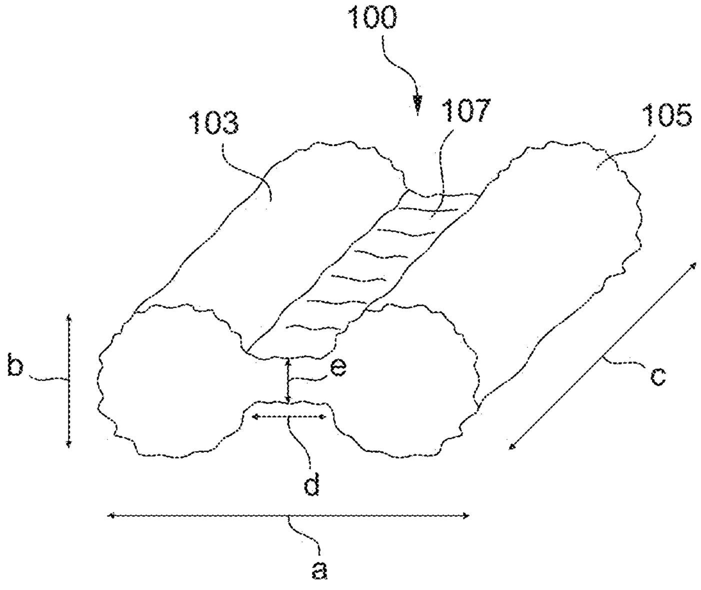

In the following, examples of drive means of apparatuses according to the disclosure are first described on the basis of FIGS. 21 to 27. Exemplary designs of further components of the forming station are then described with reference to FIGS. 4 and 5 and FIGS. 28 to 36. The starting material thickness direction S is indicated in the figures by the arrow S and the starting material width direction by the arrow B. Identical or similar components are given the same reference numerals in the following figures.

Figure 21:
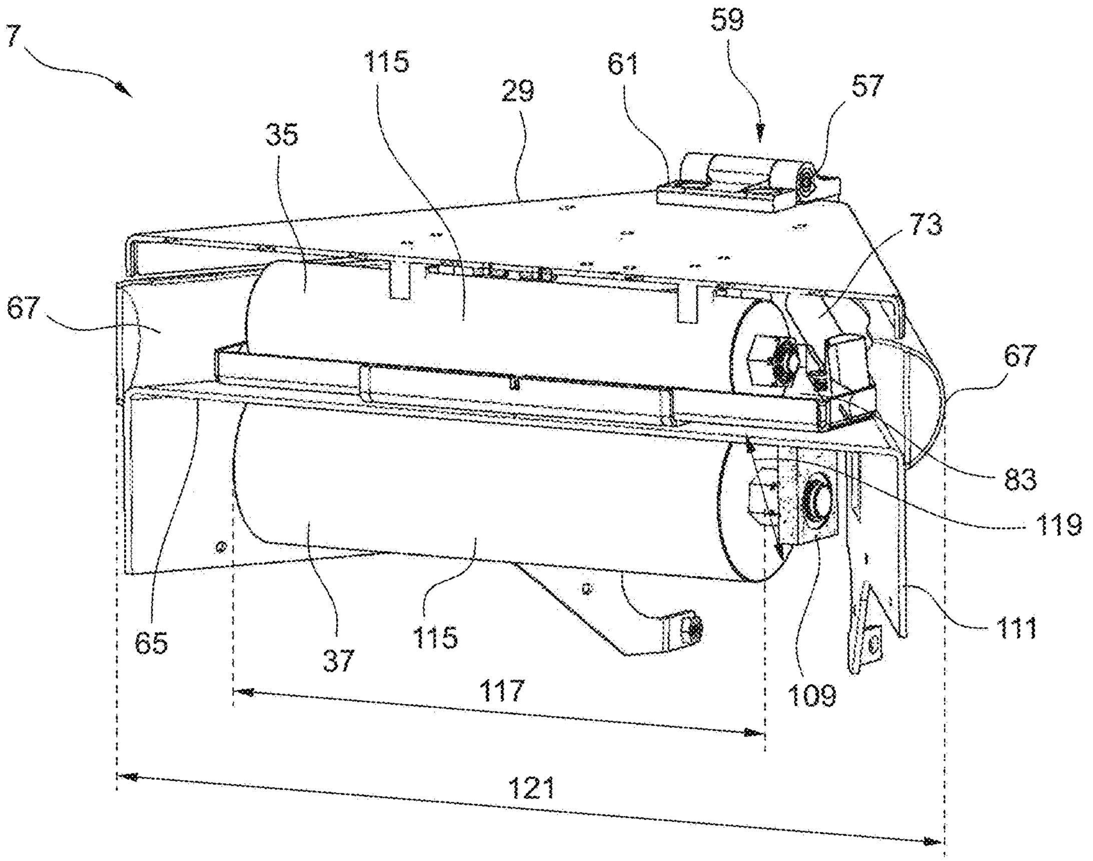
Figure 22:
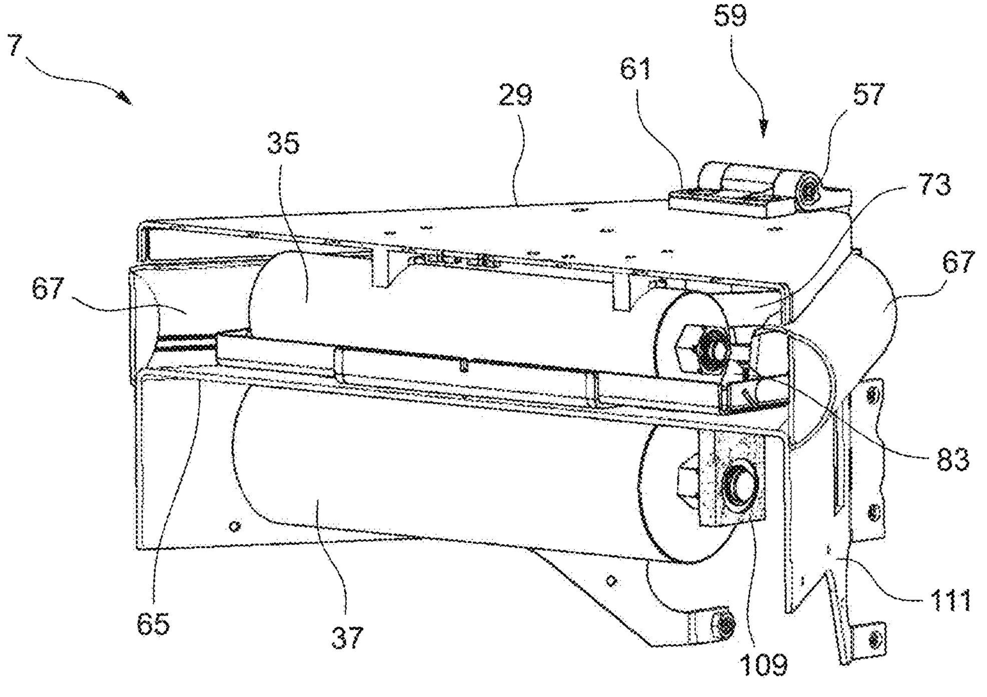
Figure 34:
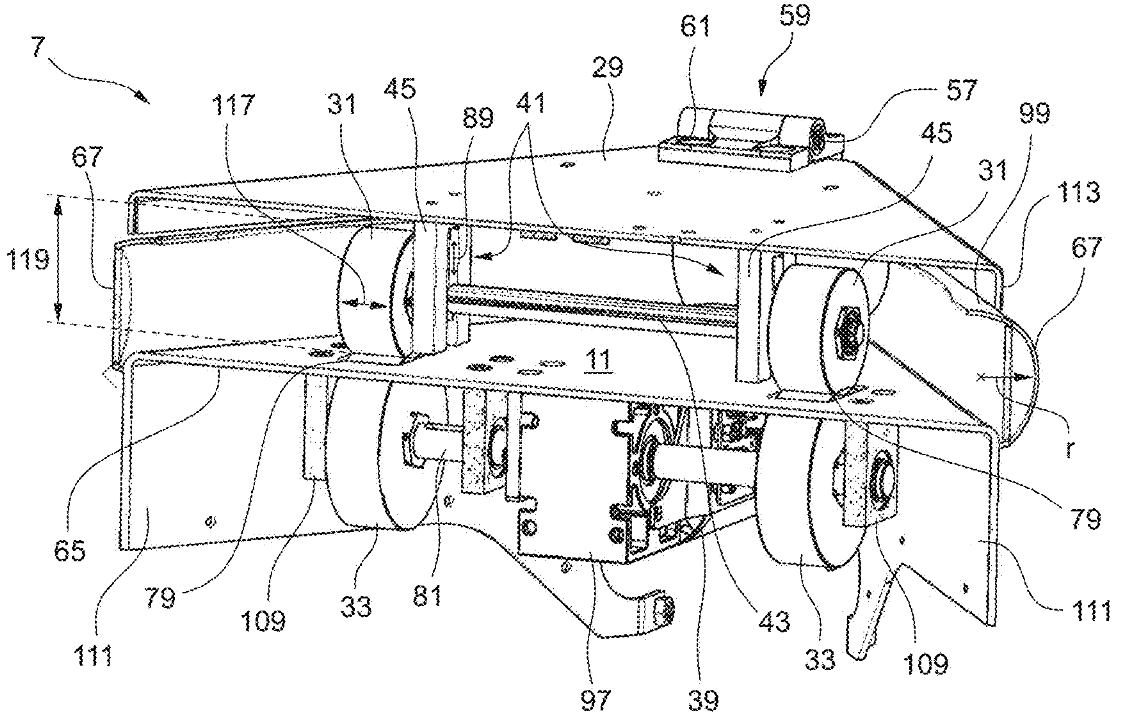
Figure 35:
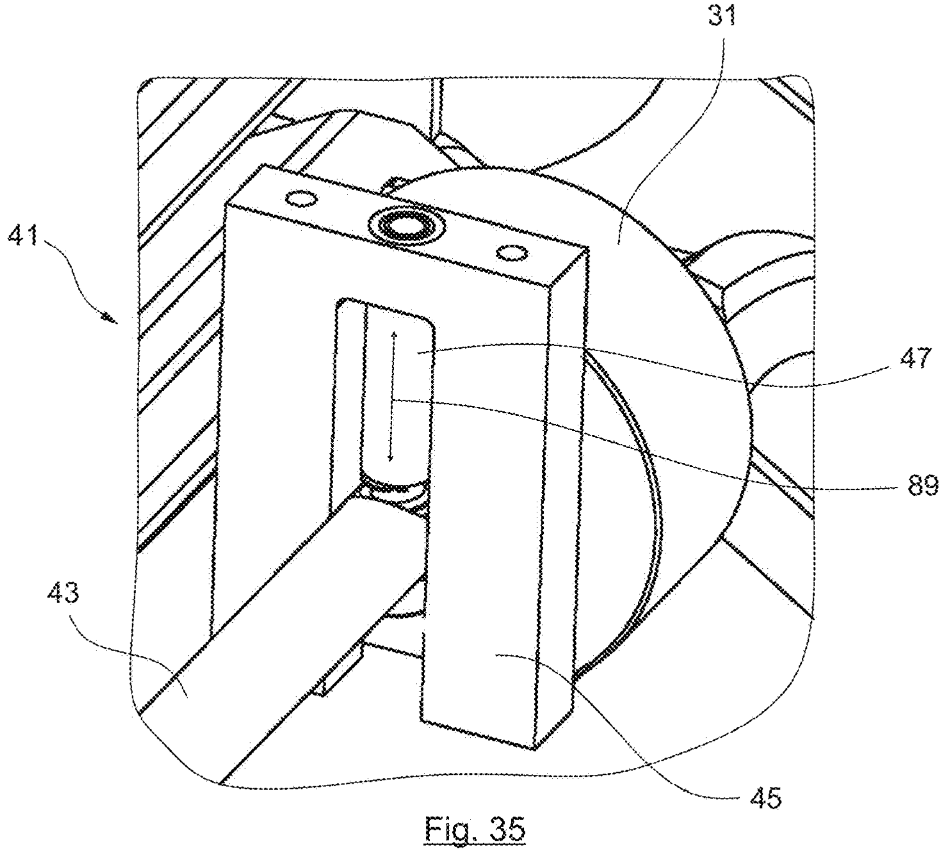

FIGS. 21 and 22 show different perspectives into a forming station 7 with a conveying device according to the first aspect of the disclosure. The conveying device has two drive means 35, 37 arranged opposite each other in the starting material thickness direction S, forming a pair of drive means. Both drive means comprise a cylindrically-shaped jacket 115 which engages the starting material during drawing off. The axial extension of the jacket of the drive means is indicated by reference numeral 117 and the radial extension is indicated by reference numeral 119. In FIGS. 21 and 22, the axial extension 117 is greater than the radial extension 119, so that these are conveying rollers 35, 37 in the sense of the present disclosure. In contrast, the axial extension 117 of the drive means in FIG. 34 is smaller than the radial extension 119, so that these are conveying wheels 31, 33 in the sense of the present disclosure. The convergence channel width at conveying direction height of the two conveying rollers 35 and 37 is indicated in FIG. 21 by the reference number 121. In the embodiment shown in FIG. 21, the axial extension 117 of the jacket 115 of both conveying rollers 35, 37 is more than 50% of the convergence channel width 121 at their conveying direction height. One of the conveying rollers 35 is rotatably mounted on the adjustable limiting wall 29. The other conveying roller 37 is rotatably mounted to the guide wall 65. The conveying rollers 35 mounted on the adjustable limiting wall 29 have a smaller radius than the drive rollers 65 mounted on the guide wall 65.

FIGS. 23 to 27 schematically show different drive means 31, 33, 35, 37 which can be used in an apparatus 1 according to the disclosure, such as that shown in FIGS. 21 and 22.

Figure 23:
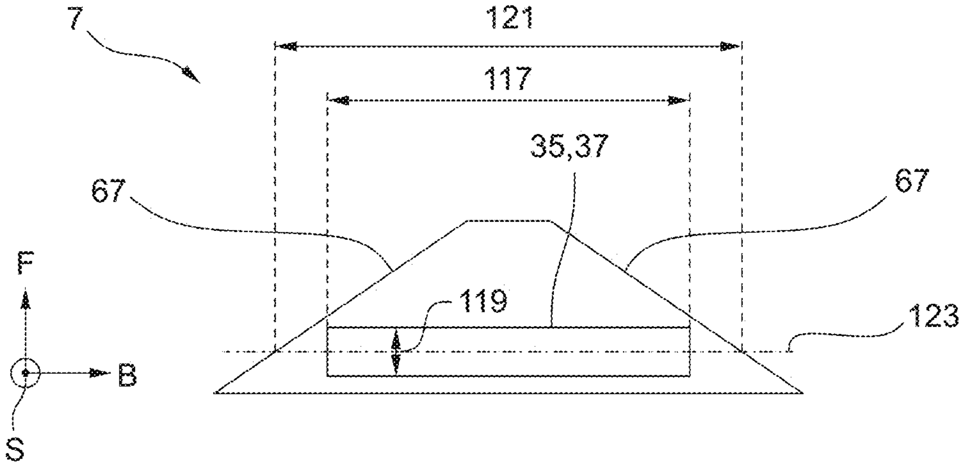

Thereby, FIG. 23 schematically represents a conveying roller 35, 37 as used according to the first aspect of the disclosure in FIGS. 21 and 22. It should be understood that already the use of such a conveying roller 35 or 37 represents an embodiment of the first aspect of the disclosure. In an exemplary embodiment, however, as shown in FIGS. 21 and 22, both drive means of the pair of drive means are formed with the axial extension 117 according to the disclosure.

Figure 24:
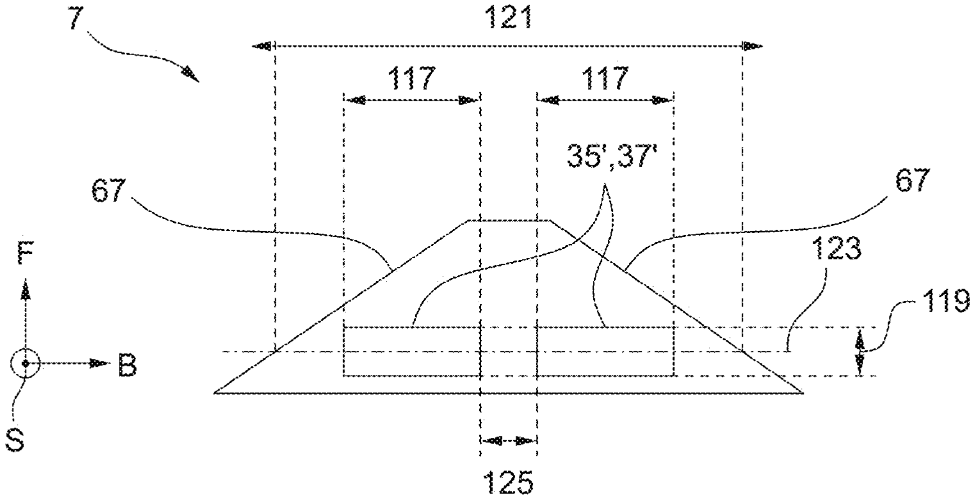

An example of the second aspect of the disclosure is shown in FIG. 24. This shows two drive means in the form of conveying rollers 35', 37' which are arranged at the same conveying direction height (indicated by the common axis of rotation 123) and are spaced apart from one another in the starting material width direction B (indicated by the distance 125). The summed-up axial extension of the jackets of the two conveying rollers 35', 37' is the sum of the axial extension 117 of both conveying rollers. The second aspect of the disclosure can be realized, for example, by replacing one of the drive rolls 35, 37 of FIG. 21 or 22 by two drive rolls as indicated in FIG. 24. In an exemplary embodiment of the second aspect of the disclosure, both the upper, continuous drive roller 35 is replaced by two drive rollers 35 as indicated in FIG. 21 and the lower, continuous drive roller 37 is replaced by two drive rollers 37 as indicated in FIG. 24.

Figure 25:
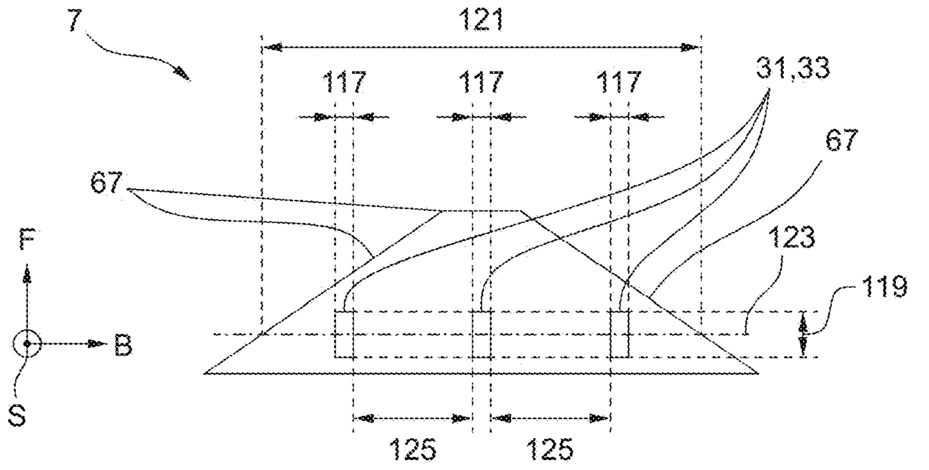

An example of the third aspect of the disclosure is indicated in FIG. 25. In this, the conveying device has three drive means 31, 33 arranged at the same conveying direction height (indicated by the common axis of rotation 123) and spaced apart from one another in the starting material width direction (indicated by the distances 125). In these drive means 31, 33 the radial extension 119 is greater than the axial extension 117, so that these are conveying wheels in the sense of the present disclosure. The three drive means 31, 33 are arranged at equal distances 125 from one another in the starting material width direction. One of the three drive means 31, 33 is arranged centrally in the starting material width direction B. The other two drive means are spaced apart in starting material width direction at equal distances from the side walls (indicated by reference numerals 67).

Figure 26:
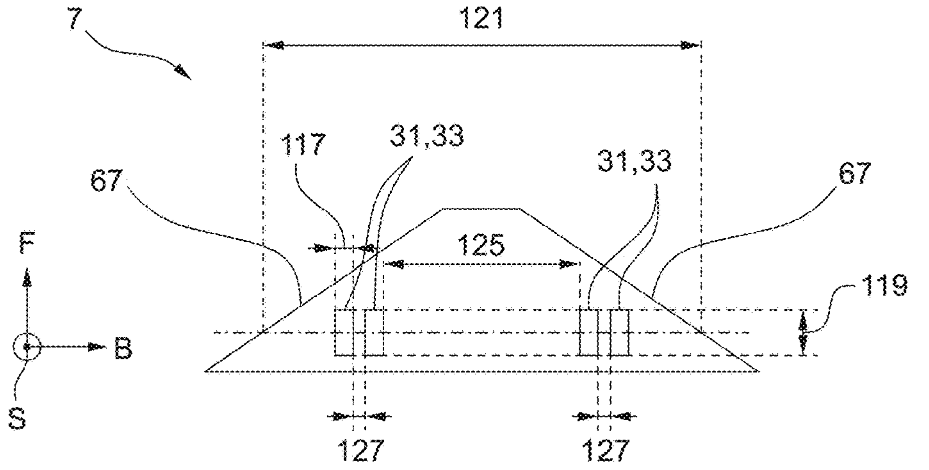

FIG. 26 shows an embodiment of the third aspect of the present disclosure, in which the at least three drive means 31, 33, comprise at least four conveying wheels 31, 33, forming at least two conveying double wheels, the distance 125 between them in the starting material width direction B being greater than the distance 127 in the starting material width direction B between the conveying wheels 31, 33 of the two conveying double wheels.

The third aspect of the disclosure may be implemented, for example, by replacing one of the drive rollers 35 or 37 of FIG. 21 or 22 with drive wheels as indicated in FIG. 25 or 26. In an exemplary embodiment of the third aspect of the disclosure, both the upper, continuous drive roller 35 is replaced with drive wheels as shown in FIG. 25 or 26 and the lower, continuous drive roller 37 is replaced with drive wheels as shown in FIG. 25 or 26.

Figure 27:
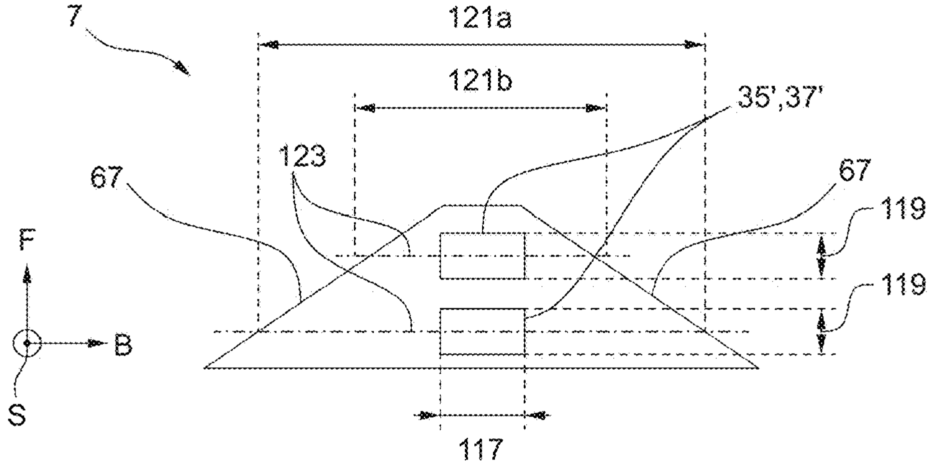

An example of the fourth aspect of the disclosure is indicated in FIG. 27, in which two drive means 35', 37' aligned with each other in conveying direction F are indicated in the form of drive rollers. As indicated by reference numerals 121*a* and 121*b*, when the axial extension 117 of the drive means relative to the convergence channel width is specified, the convergence channel width 121*a*, 121*b* at the conveying direction height of the respective drive means 35', 37' is decisive. The fourth aspect of the disclosure could be realized, for example, by providing, starting from the embodiment according to FIGS. 21 and 22, a further drive roller preferably with an axial extension adapted to the smaller convergence channel width downstream in the conveying direction of the illustrated upper drive roller 35 and/or lower drive roller 37.

Aspects of further components of the forming station are described below on the basis of FIGS. 4 and 5 and FIGS. 28 to 36. As can be seen from FIG. 4, the forming station 7 has a convergence channel 11 for transversely compressing, in particular turning-in or rolling-in, the starting material (not shown). The convergence channel is delimited in the starting material thickness direction S by two opposite limiting walls 29, 65. The limiting walls 29, 65 are formed in a trapezoidal shape and taper in conveying direction F. In the starting material width direction, the convergence channel is delimited by side walls 67 (see FIGS. 30 and 31). The side walls 67 run towards each other in conveying direction F. The limiting walls 29, 65 and the side walls 67 delimit the convergence channel circumferentially in the operating position. As a result, starting material entering the forming station 7 in conveying direction F is initially received via a limiting wall 65, against which the starting material is guided, in particular supported in starting material thickness direction S. This limiting wall 65 can also be referred to as guide wall 65 or mounting plate 65. Due to the course of the convergence channel tapering in conveying direction F, longitudinal edge strips of the starting material are turned-in at the side walls 67 in starting material thickness direction S. For assisting this turning-in, the side walls 67 are concavely curved on their side facing the convergence channel (see FIG. 31). The radius of curvature is indicated by the arrow r. As they continue to pass through the convergence channel, in other embodiments, the folded longitudinal edge strips can push against the limiting wall 29, where they are rolled back in the opposite starting material thickness direction, forming crumpled cavities. In the embodiment shown here, this pushing against is avoided by sections 99 of the side walls projecting into the guide channel, which guide the longitudinal edge strips directly to turn-over cheeks 73, at which the longitudinal edge strips are then rolled back in the opposite starting material thickness direction S. In particular, the side walls 67 are formed in the shape of hollow-cylindrical sections. In this case, the jacket section 99 of the side walls 67 formed in the shape hollow-cylindrical-sections projects inwardly in the starting material width direction B beyond the outer edge 113 of the adjustable limiting wall 29 into the convergence channel 11.

In the embossing and/or perforating station 13 following the forming station, the turned-over longitudinal edge strips are then connected to a central region of the starting material.

Figure 5:
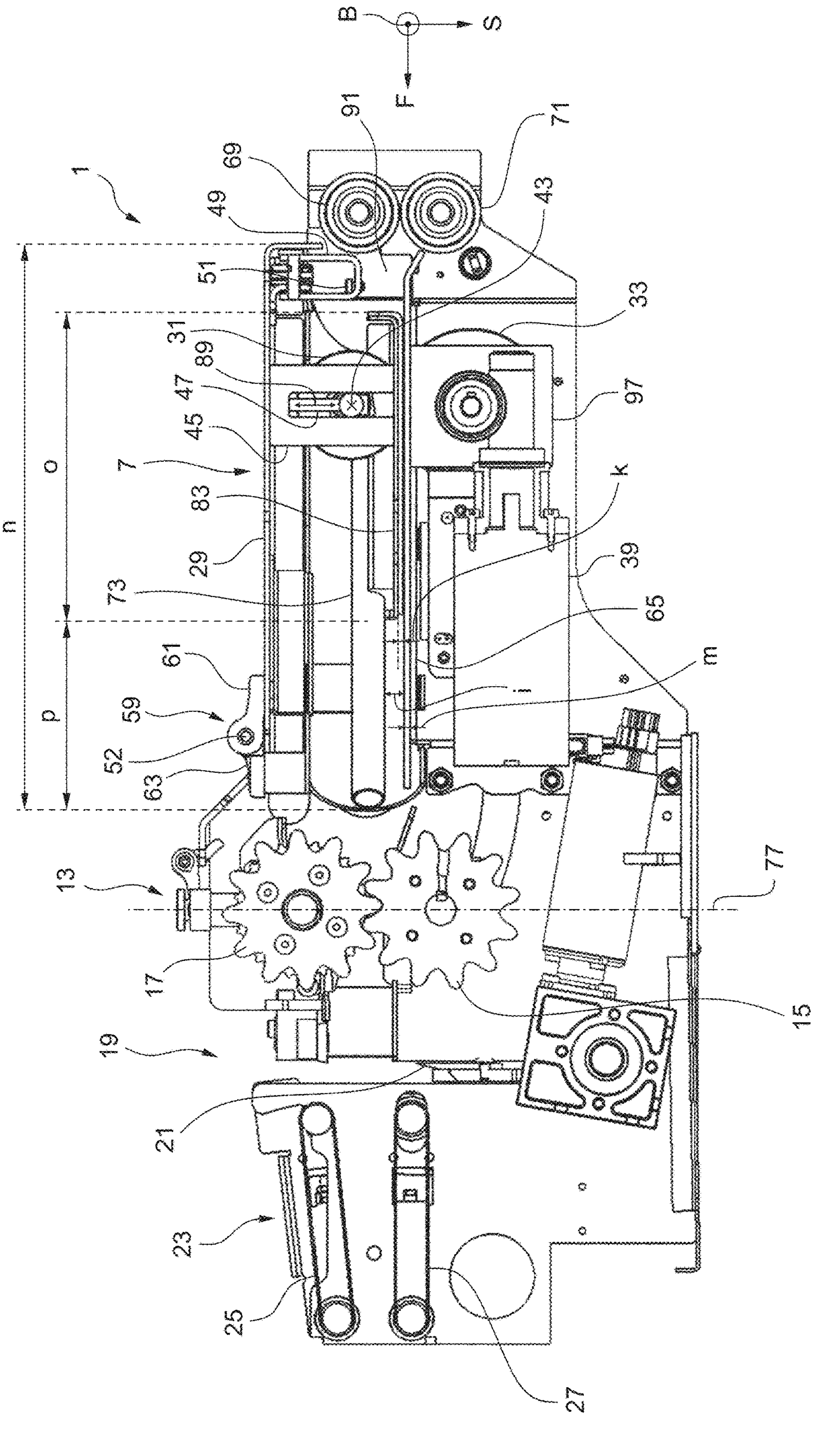
Figure 6:
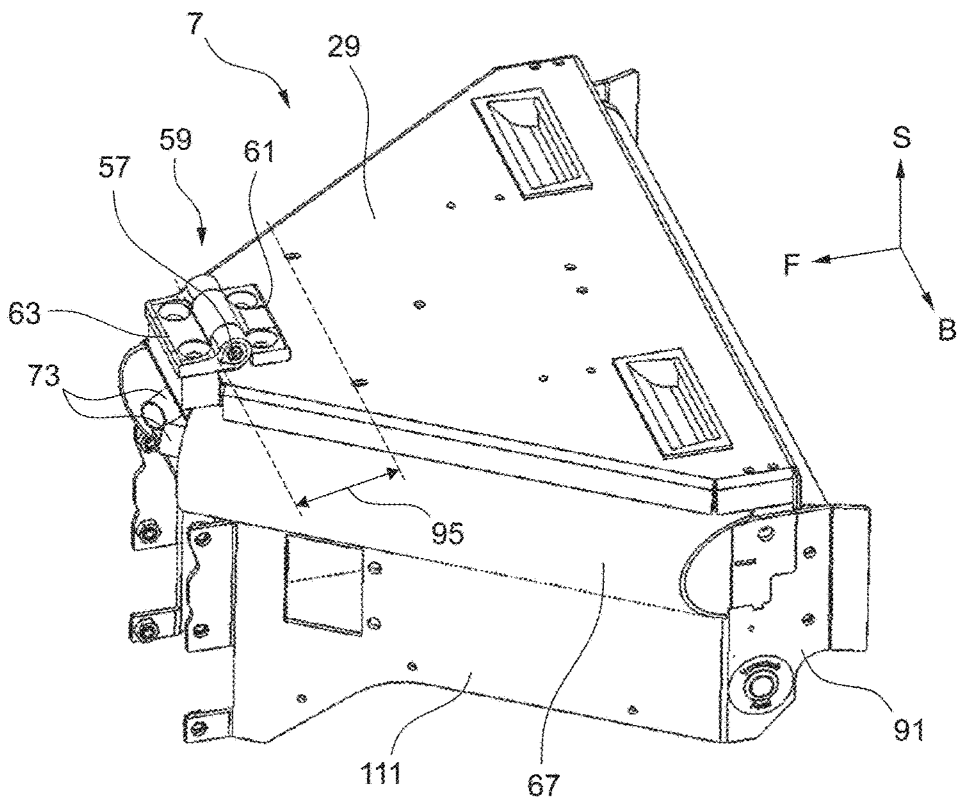
Figure 7:
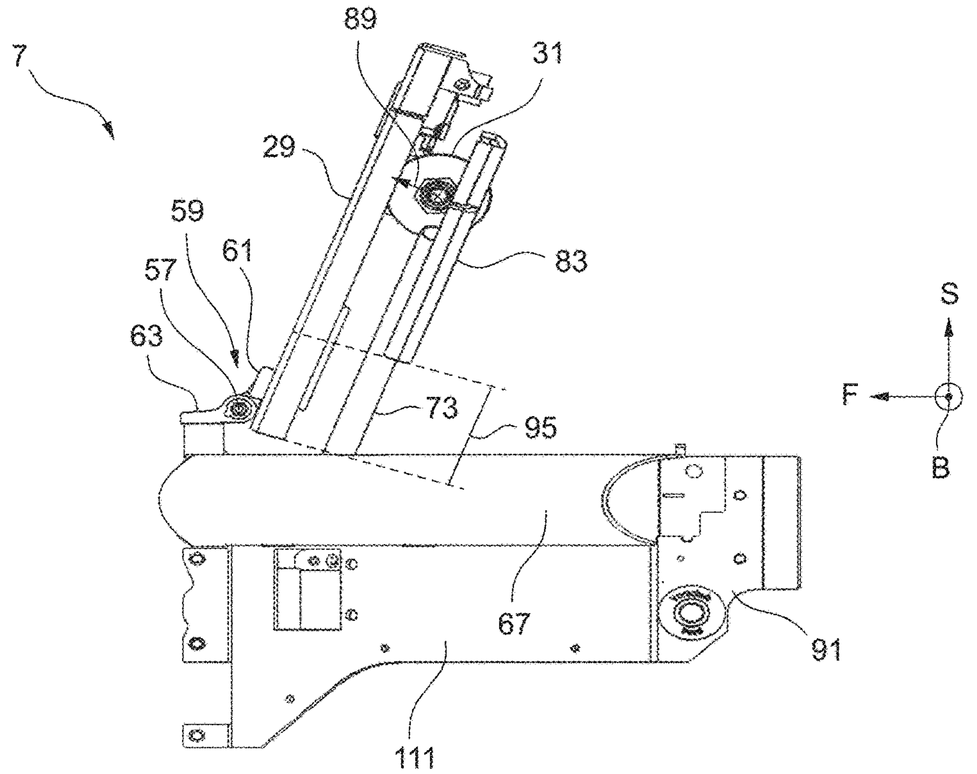

The length of the convergence channel 11 in conveying direction F between the channel input, via which the starting material is drawn into the convergence channel 11, and the channel output, via which the transversely compressed starting material leaves the convergence channel 11, is indicated in FIG. 5 by the reference sign n and can also be referred to as convergence channel length n. The preferred positioning of the at least one drive means in conveying direction F downstream of the channel input, as previously described in connection with the first aspect of the disclosure, is indicated in FIG. 5 by the reference sign o and is dimensioned in particular between the channel input and the axis of rotation 123 of the respective drive means. The alternative indication of the distance in conveying direction to the channel output is indicated by the reference numeral p. It should be understood that the positioning described above may also be embodied with respect to the drive means according to the second, third and fourth aspects of the disclosure.

Figure 4:
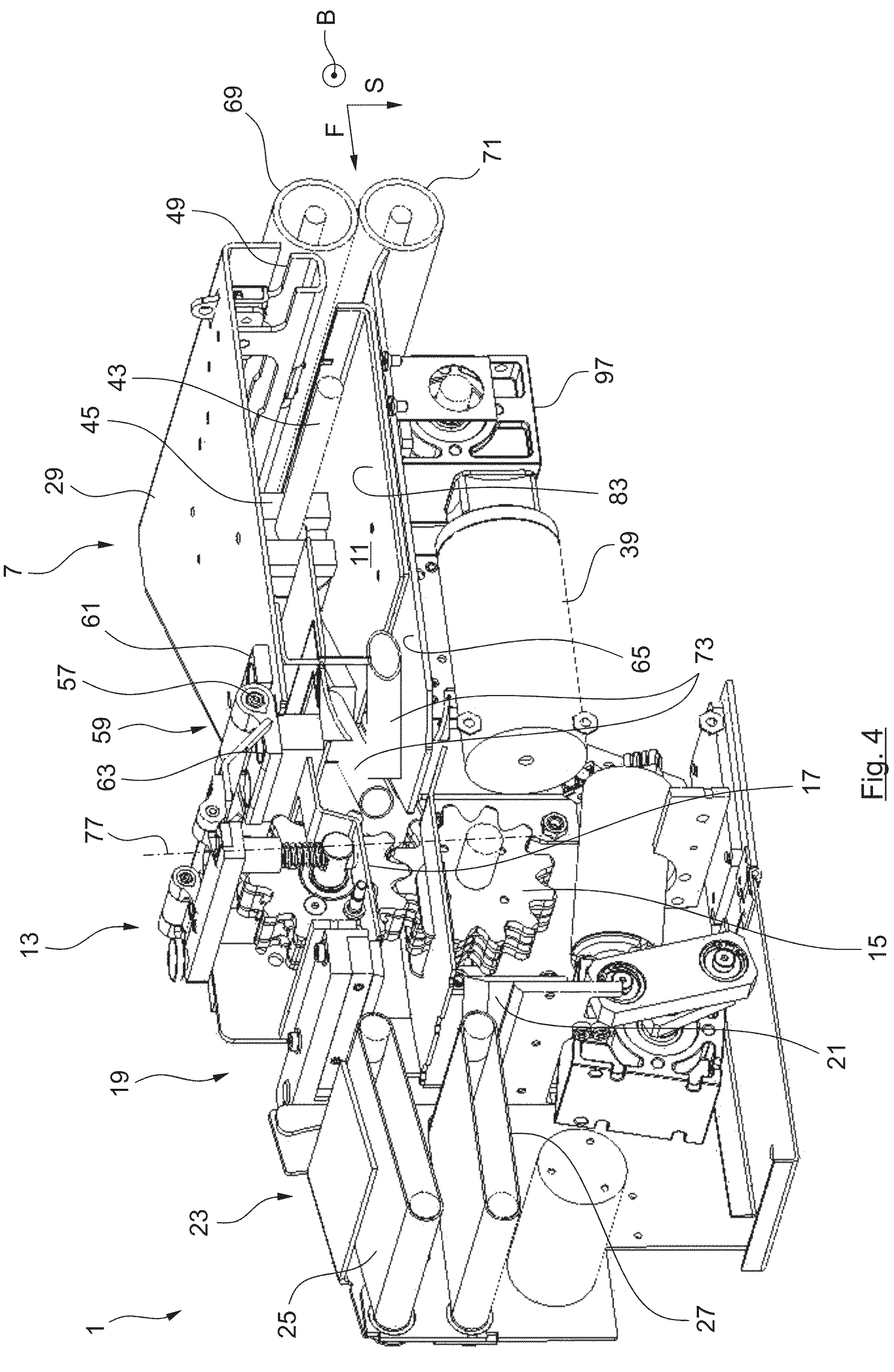
Figure 30:
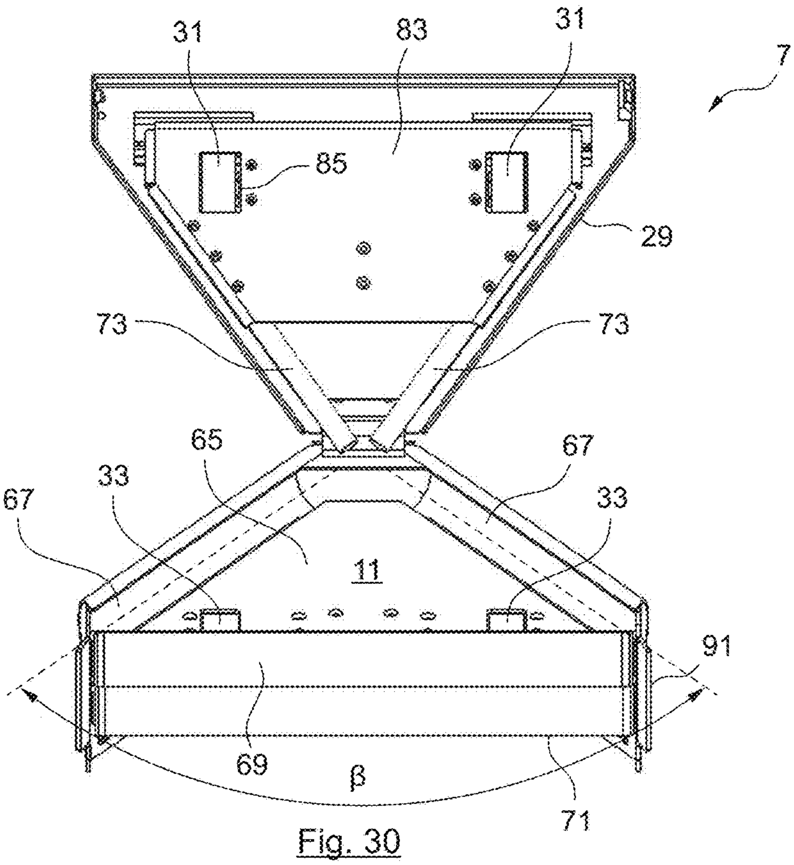
Figure 32:
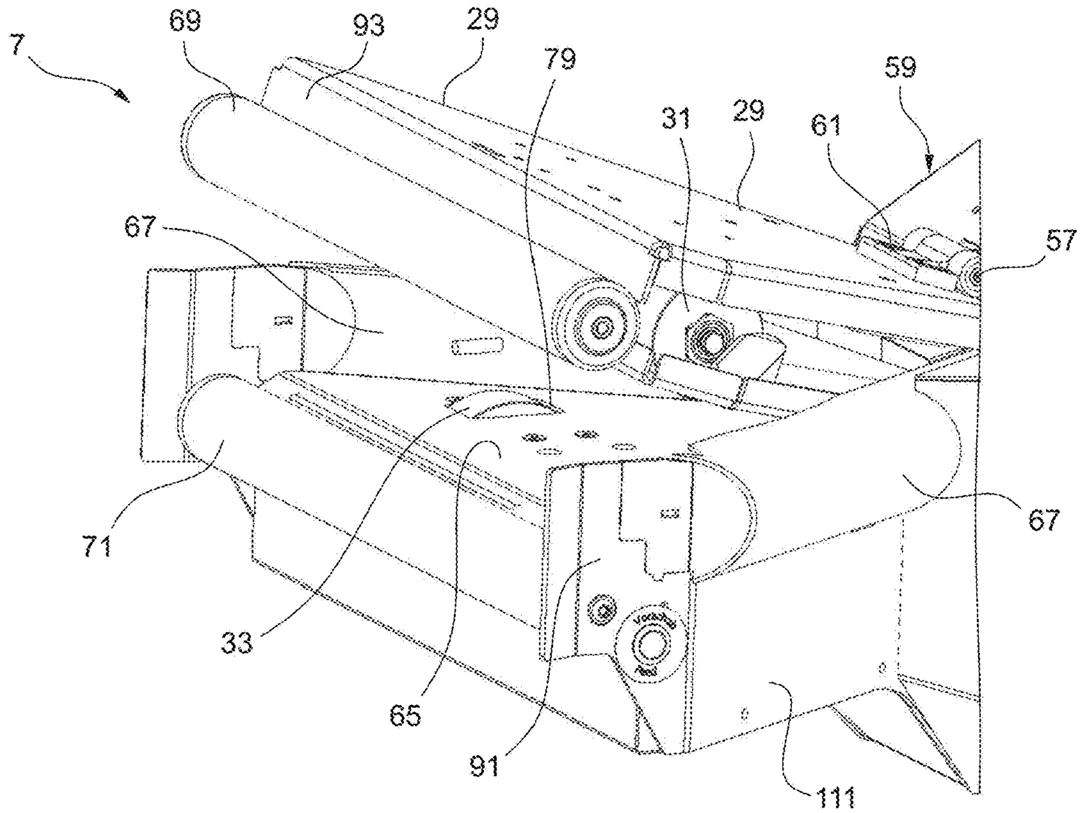

As can be seen from FIGS. 4 and 5, for example, the forming station 7 preferably has two guiding devices 69, 71 in the form of reversing rollers 69, 71 for aligned feeding of the starting material into the forming station 7. In the operating position, a narrow gap can be formed between the two reversing rollers 69, 71, through which the starting material can be fed into the forming station 7. In particular, the reversing rollers can be freely rotatably mounted. FIG. 30 shows an embodiment in which both reversing rollers 69, 71 are attached to an attachment section 91 on the guide wall side. In this way, the reversing rollers 69, 71 remain close together regardless of the position of the adjustable limiting wall 29. FIG. 32 shows an alternative embodiment in which one of the reversing rollers 69 is attached to the adjustable limiting wall 29. This allows the reversing roller 69 to be spaced apart from the other reversing roller 71 in the releasing position, facilitating both the introduction of starting material and the removal of material jams.

Figure 11:
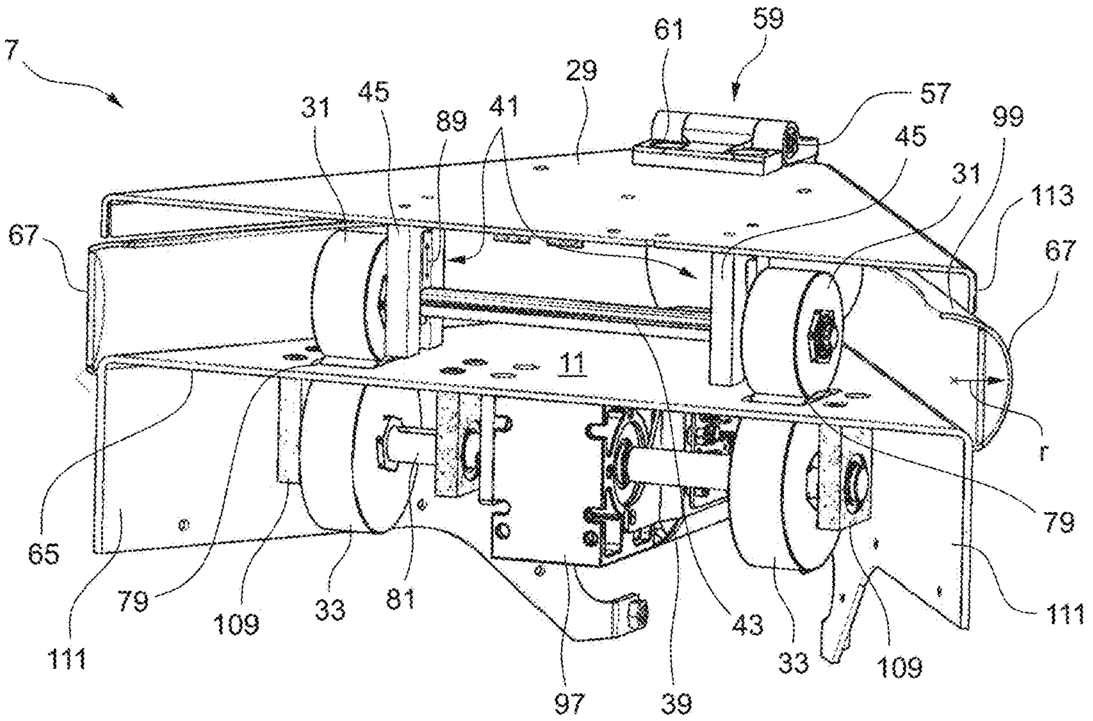
Figure 12:
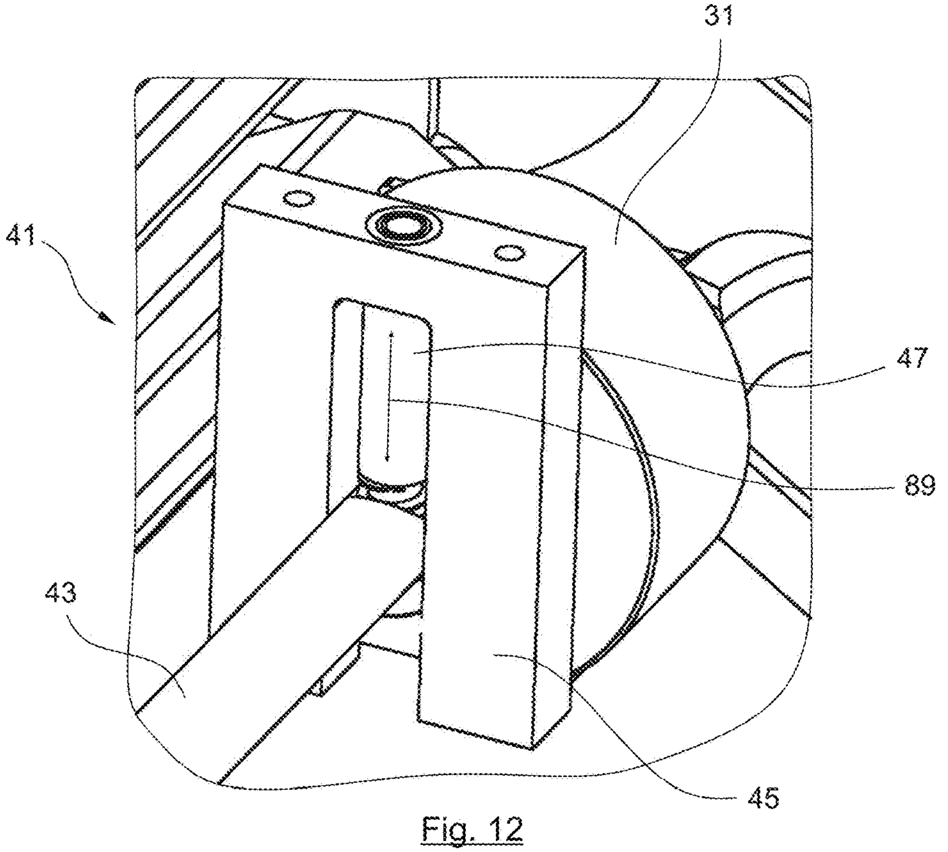
Figure 13:
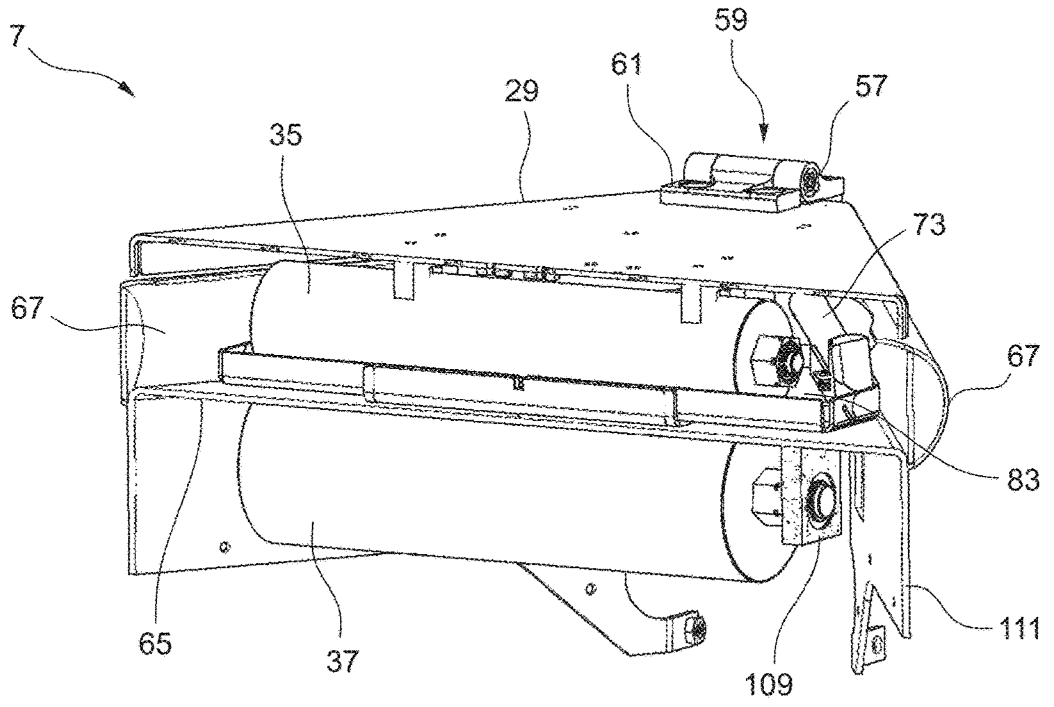
Figure 14:
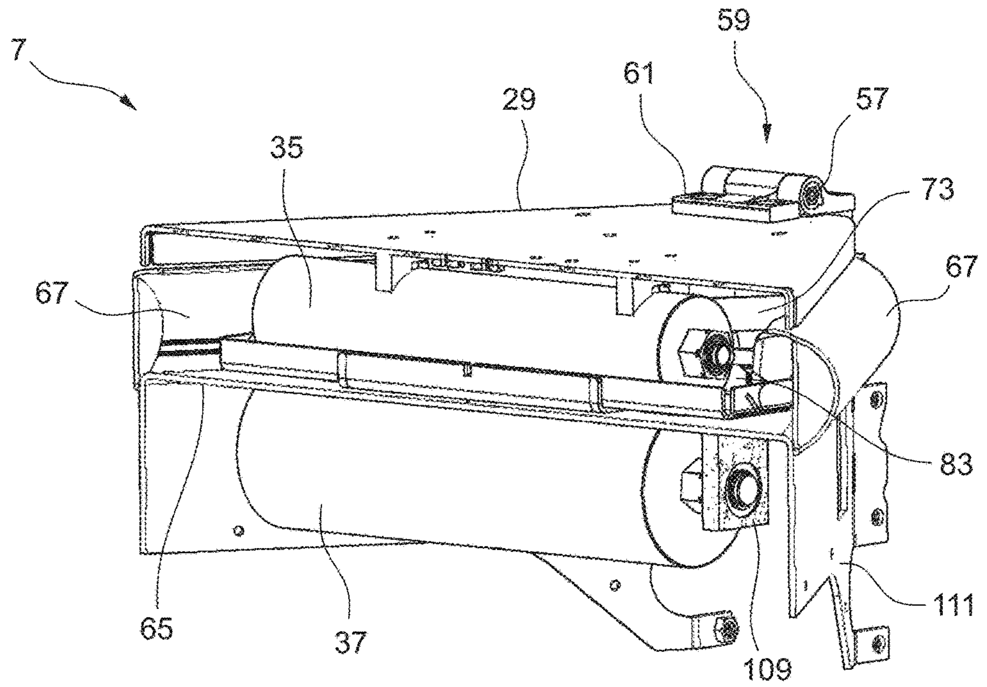
Figure 15B:
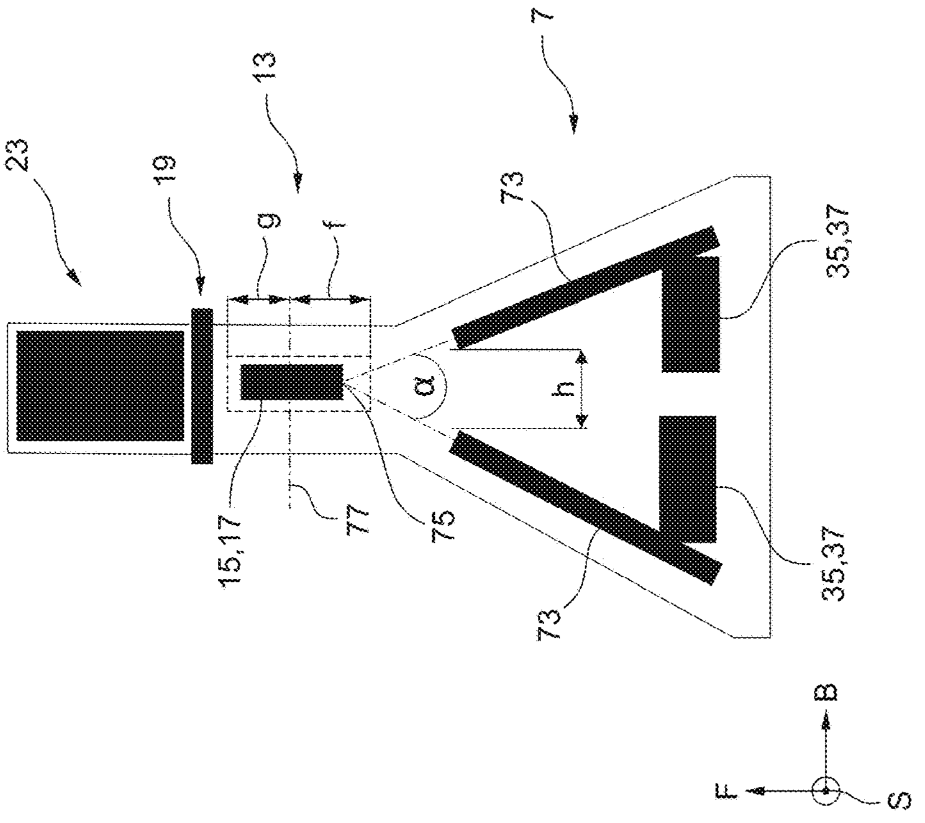
Figure 15A:
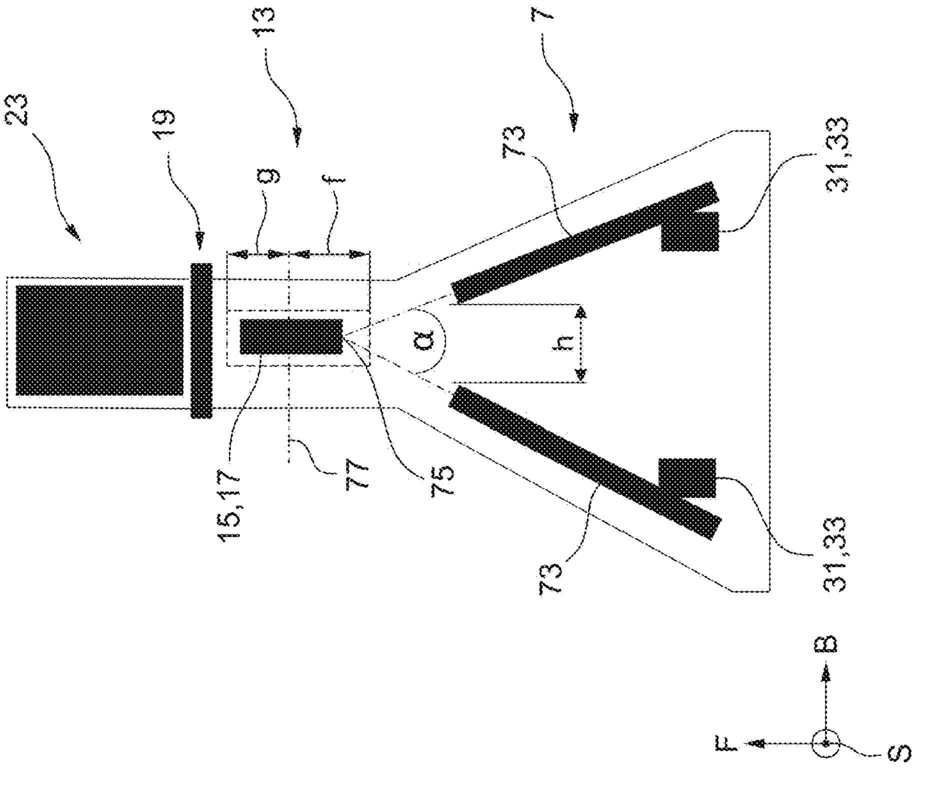
Figure 16:
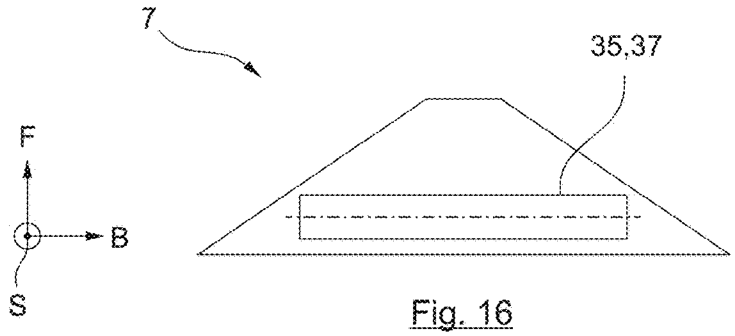
Figure 17:
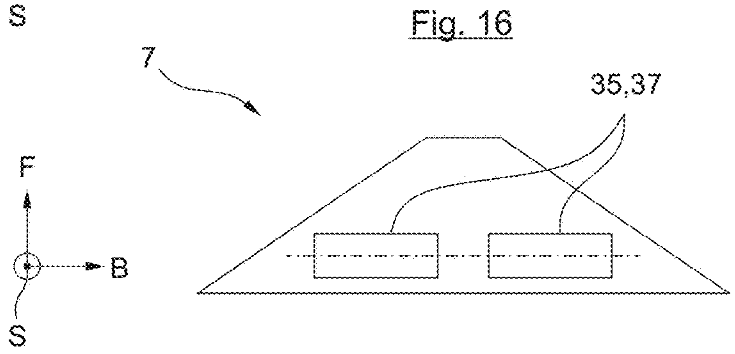
Figure 18:
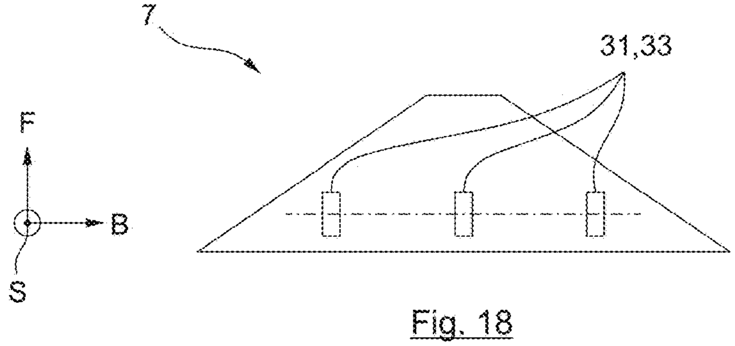
FIG. 18 shows an embodiment with at least three conveying wheels 31, 33 extending at the same conveying direction height and spaced apart from one another in the starting material width direction B.
Figure 19:
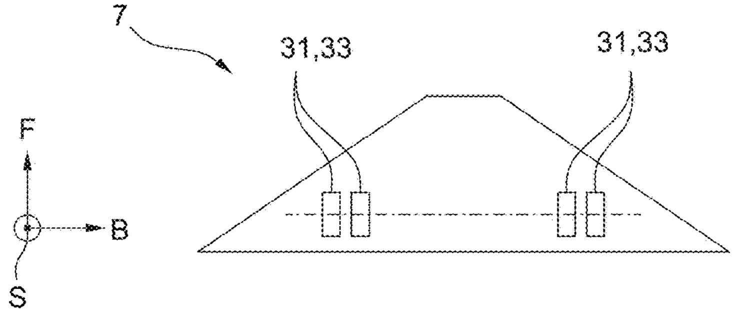
FIG. 19 shows an embodiment with four conveying wheels 31, 33 forming at least two conveying double wheels, wherein the distance in starting material width direction B between the conveying double wheels is greater than the distance in starting material width direction B between the conveying wheels of one respective conveying double wheel.

As shown, for example, in FIG. 34, the apparatus 1, in particular the forming station 7, has two panels 111 running towards each other in conveying direction F, which together with the guide wall 65 form an enclosure of the at least one drive means 33 and the motor 39 as well as the gear 97. In the embodiment shown in FIG. 11, the panels 111 and the guide wall 65 are formed from one piece, in particular bent.

The adjustable limiting wall 29 is pivotable about a pivot axis 57, which extends in the starting material width direction B. The pivot axis 57 is located at a downstream end section in the conveying direction indicated by the reference numeral 95 in FIG. 28. The pivotability is provided by a hinge 59 having two hinge members 61, 63. One hinge member 61 is attached to the adjustable limiting wall 29. The other hinge member 63 is attached to the embossing and/or perforating station 13. In FIG. 4, a wheel shaft 43 for receiving rotatable drive means (not shown in FIG. 4), such as conveying wheels and/or conveying rollers, is shown, as well as a U-shaped bearing 45 receiving the wheel shaft 43. In an exemplary embodiment, drive means according to the first, second and/or third aspect of the disclosure can be rotatably mounted on the wheel shaft shown in FIG. 4. By using a second wheel shaft displaced in conveying direction, drive means according to the fourth aspect of the disclosure could also be used.

FIG. 5 shows the apparatus of FIG. 4, but not in perspective view, but in side view as well as with a central cut through the apparatus 1 in starting material width direction B. In contrast, in FIG. 4 the cut is offset to one side in starting material width direction B with respect to the center of the apparatus 1. Furthermore, FIG. 5 differs from FIG. 4 in that a drive means 31, 33 is indicated in FIG. 4.

FIG. 5 shows a drive means 31 rotatably mounted on the adjustable limiting wall 29. This may be a drive means according to the first aspect of the disclosure or one of at least two or three drive means according to the second to fourth aspects of the disclosure. The drive means 31 is mounted via the wheel shaft 43 on the U-shaped bearings 45, which in turn are attached to the adjustable limiting wall 29 (FIG. 30). A spring 47 is indicated between the wheel shaft 43 and the bearing 45, via which the wheel shaft 43 and the at least one drive means 31 attached thereto are movable, in particular spring-mounted, in the starting material thickness direction S. The movability is indicated above the arrow 89. The spring is generally indicated in the further figures by the reference numeral 41. As can be seen in particular from FIG. 34, the forming station 7 can preferably have two springs 41 spaced apart from one another in the starting material width direction B, by means of which the wheel shaft 43 is spring mounted relative to the adjustable limiting wall 29. A detailed view of the spring 41 can be seen in FIG. 35.

Figure 8A:
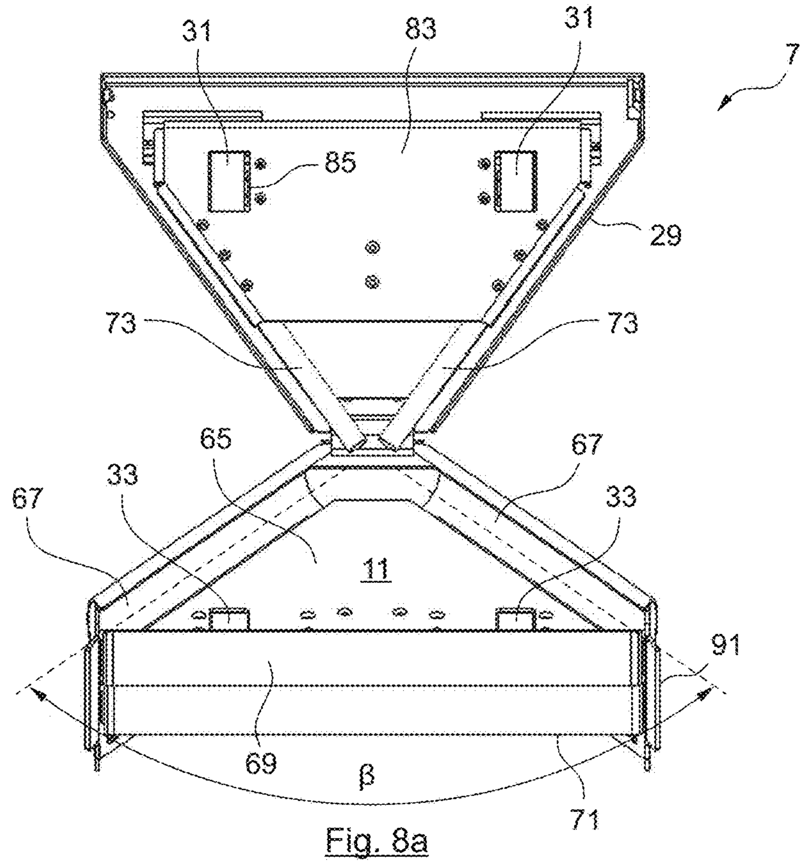
Figure 8B:
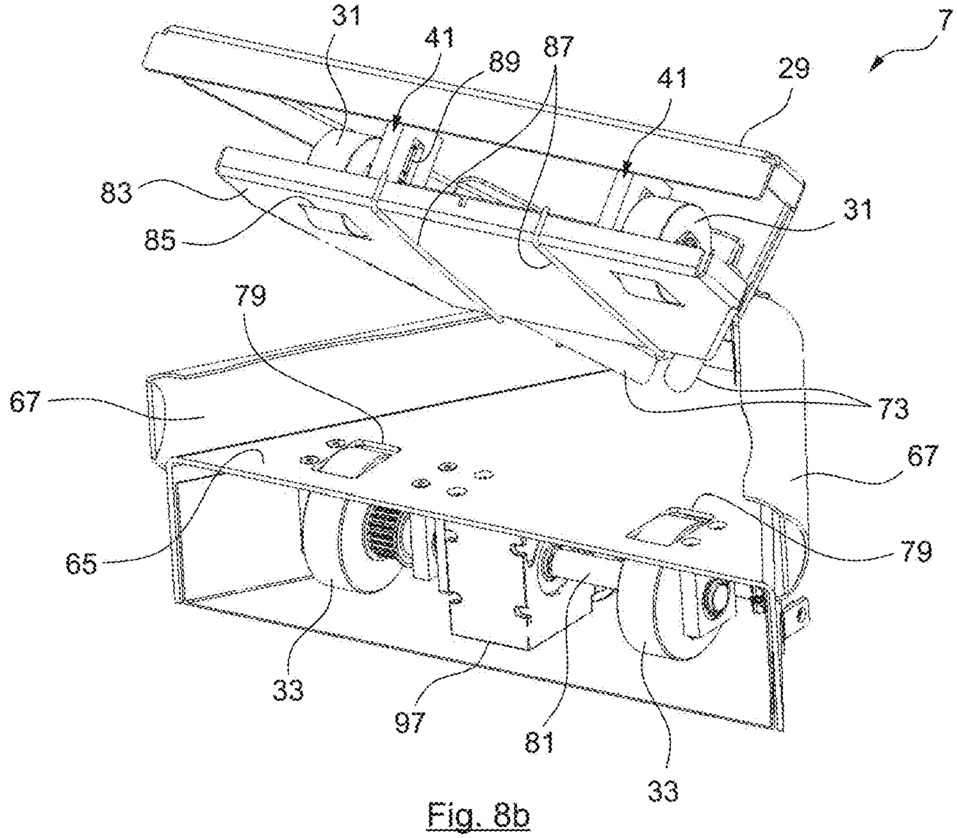
Figure 9:
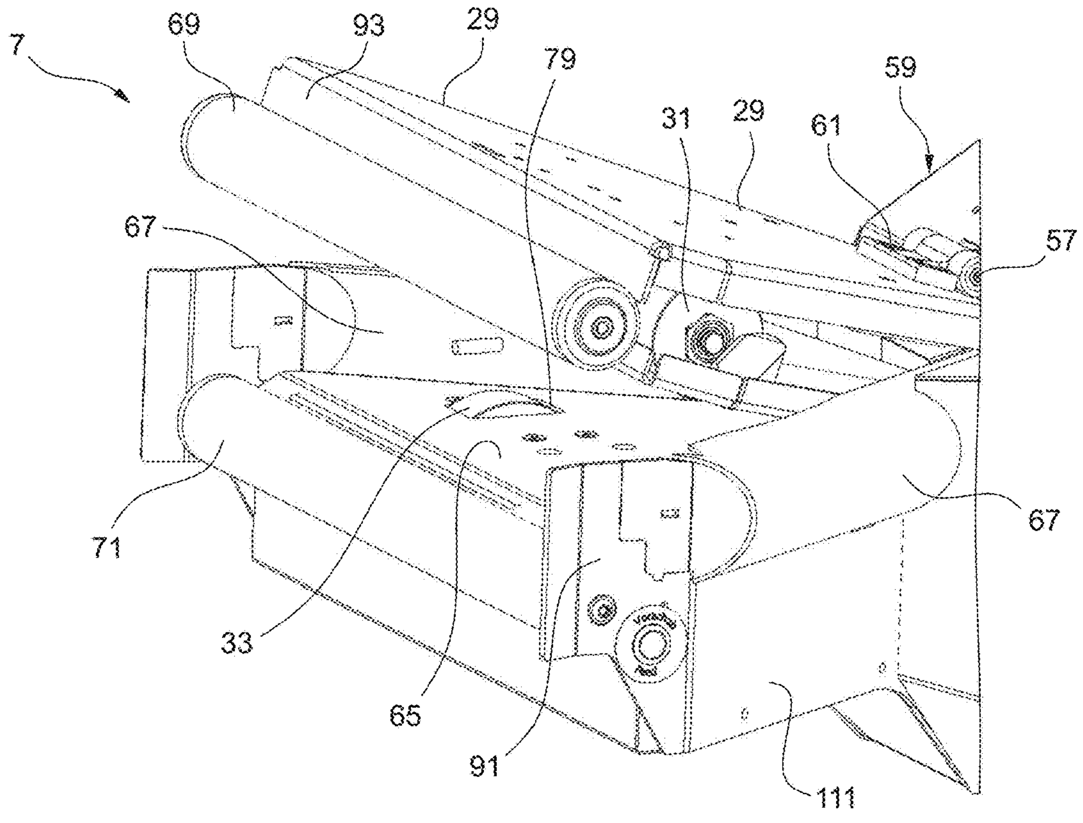
Figure 10:
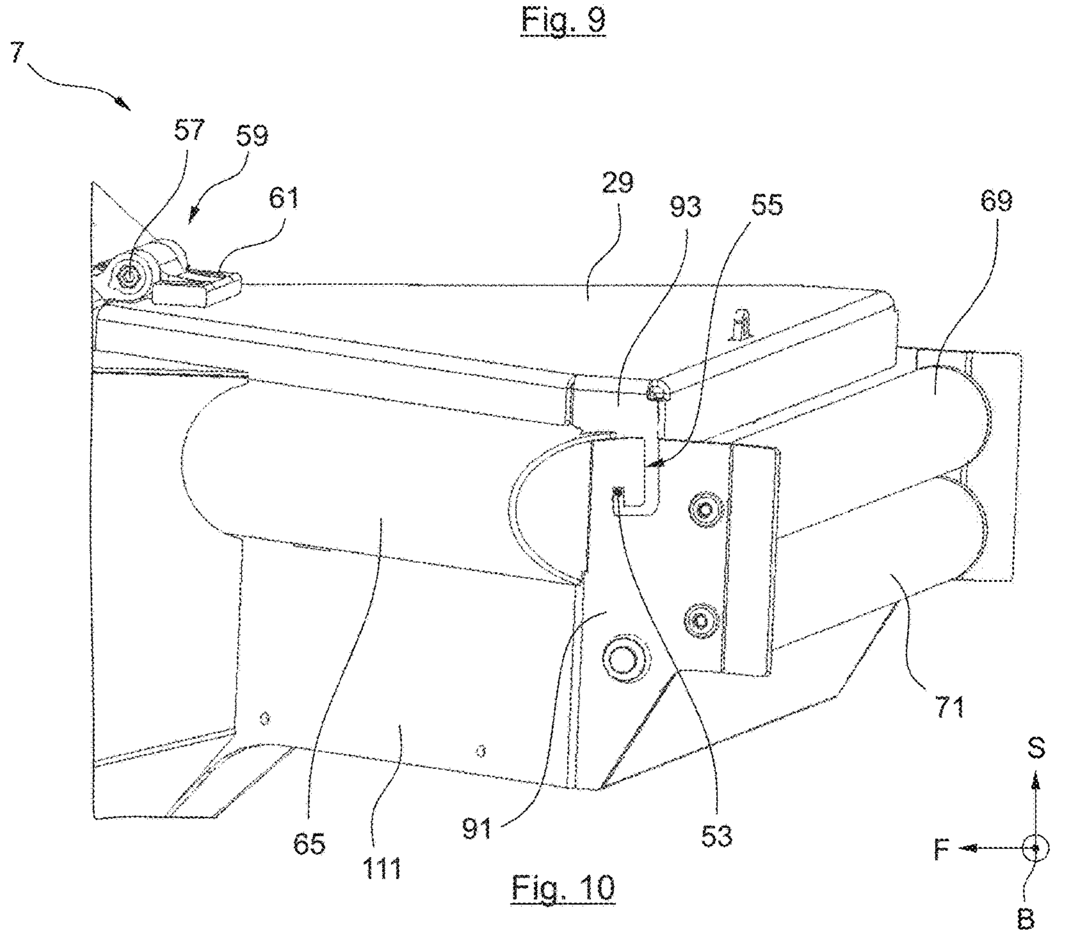

By replacing the two drive means 31 by a drive shaft with a corresponding axial extension, as indicated in FIG. 8, which in particular is supported between the two bearings 45, the apparatus according to FIG. 34 can in particular be formed as an apparatus according to the first aspect of the disclosure. Alternatively, or additionally, the apparatus according to FIG. 34 can be embodied as an apparatus according to the second aspect of the disclosure, in particular by replacing the drive means 31 of FIG. 34 by drive means with a larger axial extension, as for example indicated in FIG. 24. Alternatively, by positioning an additional drive means between the two drive means 31, the apparatus may be embodied according to the third aspect of the disclosure. Additionally, a drive means aligned with the third drive means in the conveying direction could be used to implement an apparatus according to the fourth aspect of the disclosure. It should be understood that embodiments of the forming station described above and below using at least one or two drive means may alternatively be embodied using the drive means according to one or more aspects of the disclosure and embodiments thereof.

In FIG. 5, the forming station 7 is shown in an operating position in which the at least one drive means 31 attached to the adjustable limiting wall 29 is spring biased against the at least one drive means 33 attached to the guide wall. This spring bias can be provided by the previously described spring 41. For this purpose, the adjustable limiting wall 29 can first be displaced into the operating position, for example by a person pressing in the direction of the guide wall 65, against a restoring force provided by the at least one spring 47, and then be fixed in the operating position via a connecting element 49, 51, 53, 55.

As an alternative to a spring 47, the force transmission contact can also be provided by deformation restoring forces of conveying wheels 31, 33 or conveying rollers 35, 37 braced against one another in the operating position.

An example of connecting elements 49, 51 is shown in FIG. 5. Therein, a tab 49 of the adjustable limiting wall 29 engages around a lug 51 of a guide wall-side attachment section 91, which extends in the starting material thickness direction S so that the adjustable limiting wall 29 is held in the operating position.

Figure 33:
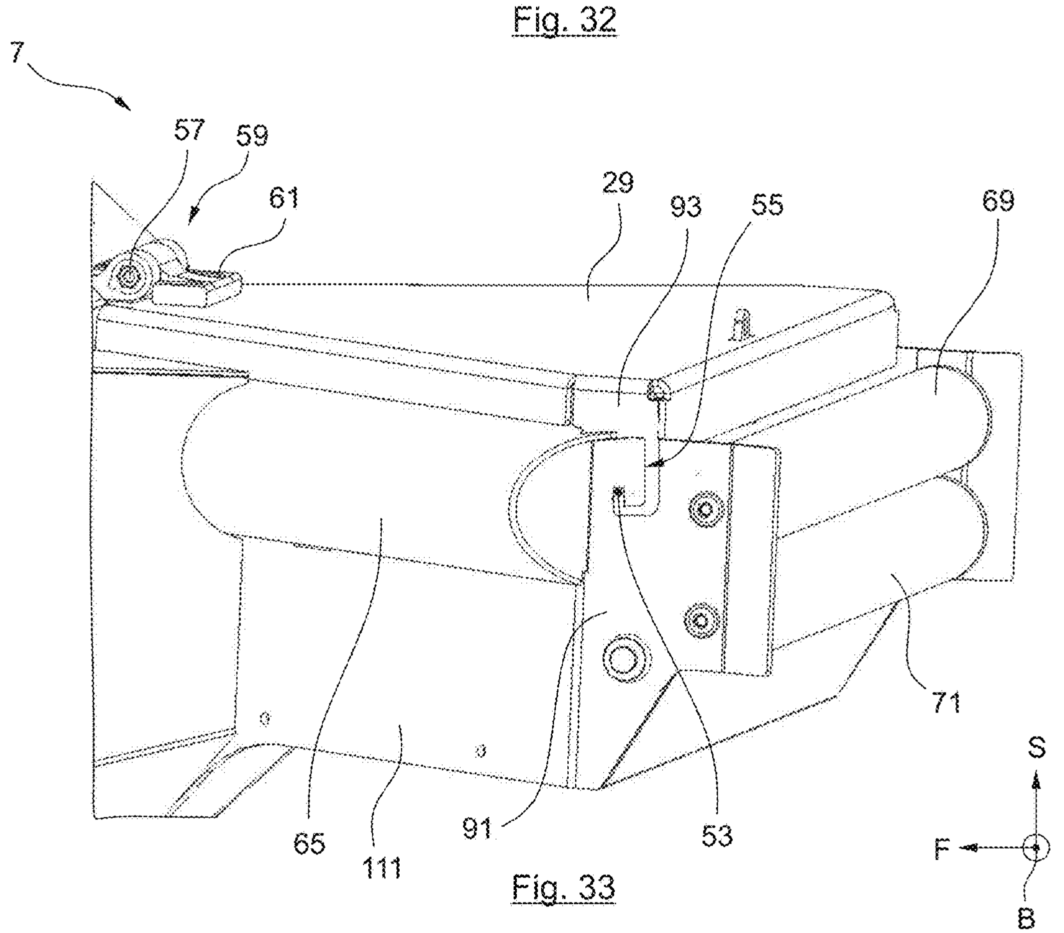

Alternative connecting elements 53, 55 are shown in FIG. 33. Therein, a bolt 53 is attached to an attachment section 93, in particular attachment section 93 associated with the adjustable limiting wall, of the adjustable limiting wall 29 extending in the starting material thickness direction S. When displacing the adjustable limiting wall 29 from the releasing position to the operating position, the bolt 53 engages in a link recess 55 of a guide wall-side attachment section 93. In the present case, the link recess 55 is formed as a curved link, in particular as a J-shaped link 55. The same first extends in the starting material thickness direction S, then in the conveying direction F, and finally back in the opposite starting material thickness direction S. As a result, displacing of the adjustable limiting wall 29 in the starting material thickness direction S and then in the conveying direction F can take place along the guide recess 55. In conveying direction F, the movement is then delimiting by the guide extending in the opposite starting material thickness direction S, which allows hooking of the bolt 53. In particular, the bolt 53 is forced into the section of the guide recess 55 extending in the opposite starting material thickness direction S by the restoring force of the spring 47. This can prevent the adjustable limiting wall from moving on its own from the operating position to the releasing position. For displacing into the releasing position, the limiting wall 29 must first be pressed down against the restoring force of the spring and then displaced in the direction opposite to the conveying direction F, where the spring force then assists the displacement of the limiting wall 29 into the releasing position.

Figure 28:
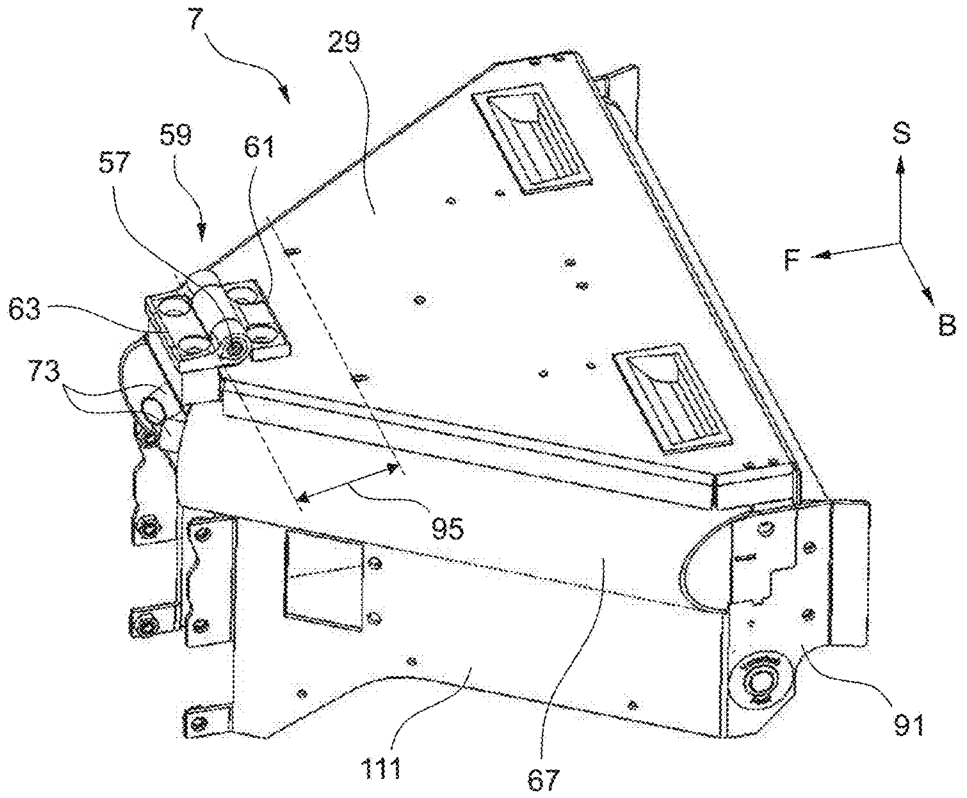
Figure 29:
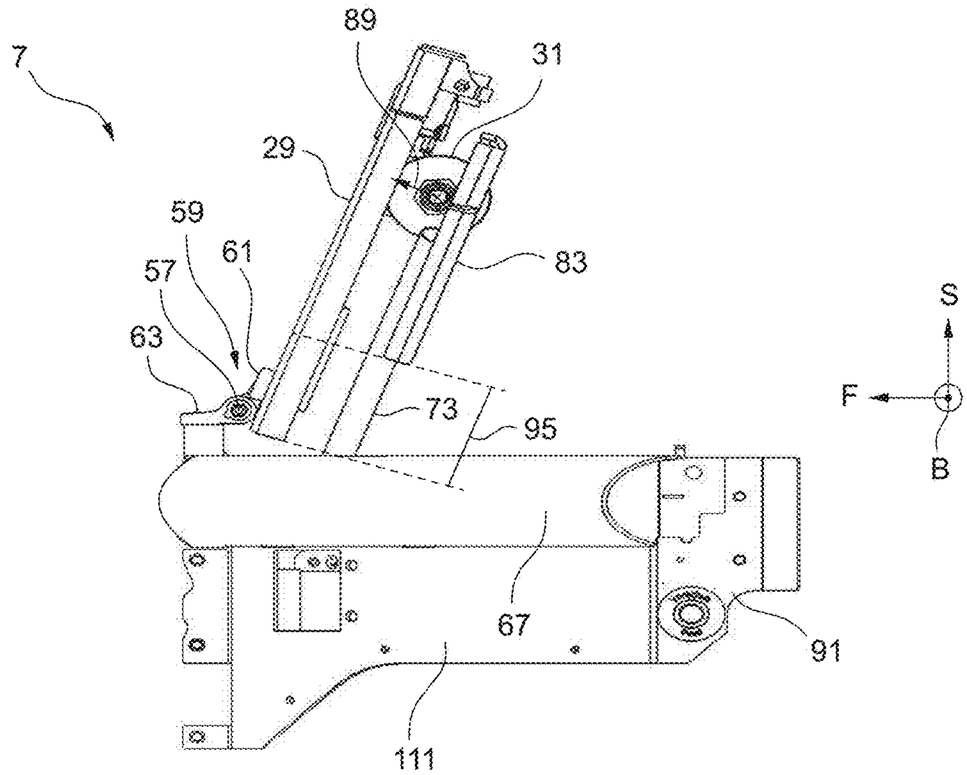

FIG. 28 shows the forming station 7 shown previously in FIGS. 4 and 5 in an operating position in which the starting material is transversely compressed as it is conveyed through, in particular turned-in and rolled-up. FIG. 29 shows the forming station 7 in a releasing position in which access to the convergence channel is released. As can be seen in particular from FIG. 29, the attachment of the wave limiter 83, the at least one drive means 31, 35 and/or the turn-over checks 73 to the adjustable limiting wall 29 ensures that all these components can be moved, in particular pivoted, away from the guide wall 65 and the side walls 67, which facilitates access into the convergence channel 11.

Figure 31:
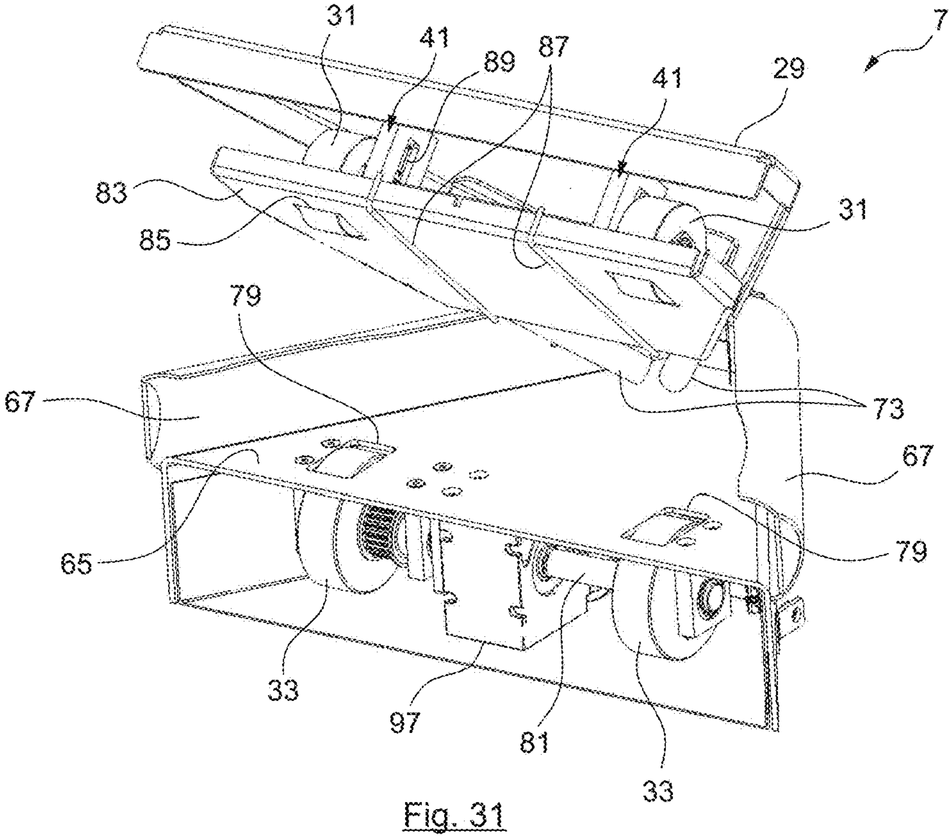

As can be seen in particular from FIGS. 30 and 31, at least one, in particular two, recesses 79 are preferably introduced in the guide wall 65, through which the drive means 33 project sectionally into the convergence channel 11. This allows the axes of rotation, in particular the drive shaft 81, of the drive means 33 to be arranged outside the convergence channel. In particular, this can prevent starting material from becoming entangled with rotating parts, such as the drive shaft 81 and the drive means 33, and thus reduce the risk of material jams. In particular, the drive shaft 81 of the at least one drive means 33 is attached to the guide wall 65 via two rotary bearings 109.

Figure 20:
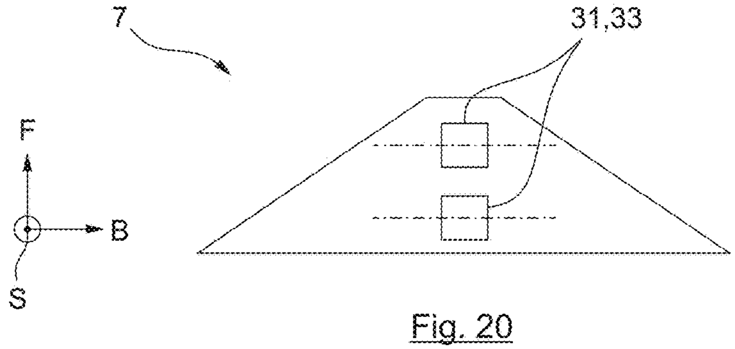
FIG. 20 shows an embodiment with two conveying wheels 31, 33 aligned with one another in conveying direction F.

Alternatively, or additionally, as shown in FIGS. 30 and 31, an intermediate wall 83 can be provided between the adjustable limiting wall 29 and the guide wall 65. The intermediate wall can be used to form a delimiting gap with a defined extension in the starting material thickness direction S, via which the extension of upset, in particular corrugated, starting material transversely to the conveying direction F, in particular in the starting material thickness direction S, can be delimited between the intermediate wall 83 and the guide wall 65. The intermediate wall 83 can therefore also be referred to as the wave limiter 83. The distance transversely to the conveying direction, in particular in the starting material thickness direction S, between the wave limiter 83 and the guide wall 79 is preferably 0.1 mm and at most 20 mm, particularly preferably at least 0.2 mm, 0.3 mm, 0.5 mm, 0.7 mm or 1.0 mm and/or at most 20 mm, 15 mm, 10 mm, 8 mm, 5 mm, 3 mm or 2 mm, and is indicated by the reference sign k in FIG. 5. Recesses 85 are introduced in the wave limiter 83, via which the drive means 31 can extend into the limiting channel described above. In the embodiments shown in FIGS. 20 and 21 with driving rollers 35, 37, the recesses 79, 85 are adapted to the axial extension of the conveying roller 35. As can be seen in particular from FIG. 30, the wave limiter 83 can be attached to the adjustable limiting wall 29 via spacers 41 to provide a mounting space for the drive means 31, 35 between the adjustable limiting wall 29 and the wave limiter. In the embodiment shown here, the spacers 41 act simultaneously as a rotary bearing and spring mounting for the drive means 31, 35. However, as an alternative or in addition to the intermediate wall 83, the function of the wave limiter can also be provided by rods 87 extending in the conveying direction F, as indicated in FIG. 31.

In FIG. 30, the angle at which the side walls 67 run towards each other in conveying direction F is indicated by the reference sign β. As can be seen from FIG. 30, the angle β at which the side walls 67 run towards one another in the conveying direction corresponds substantially to the angle α at which the turn-over checks 73 run towards one another and/or to the angle at which the convergence channel 11, the guide wall 65 and/or the adjustable limiting wall 29 taper in a trapezoidal shape in the conveying direction F.

Figure 36:
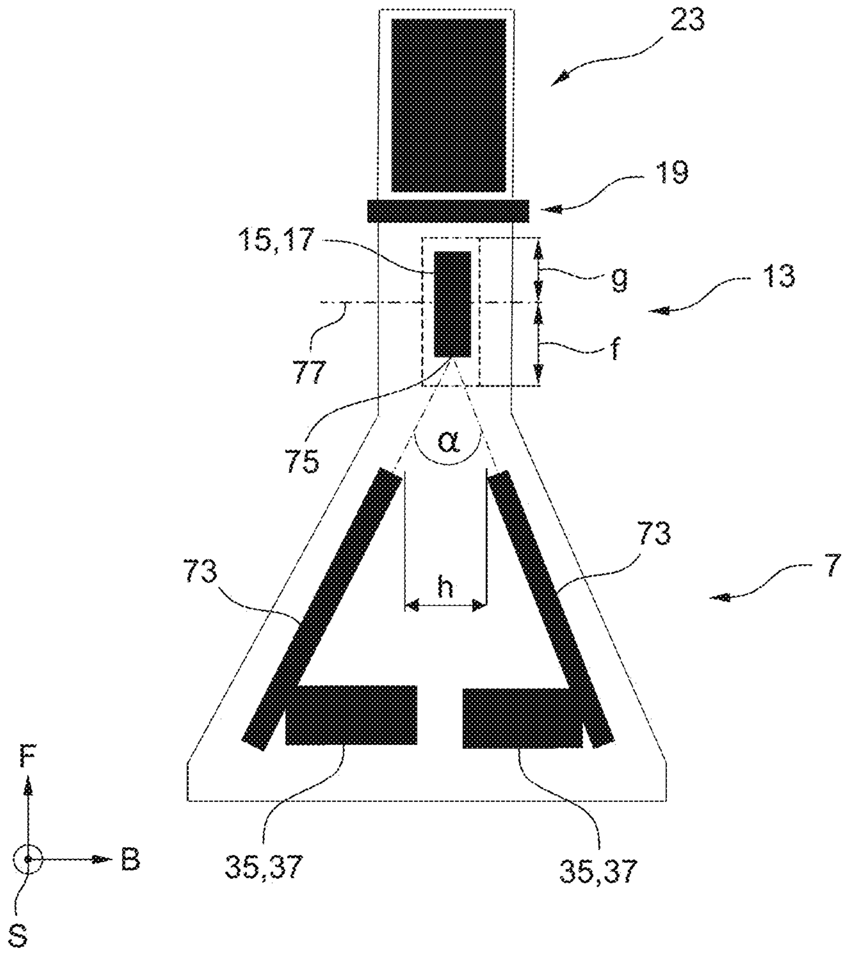

In FIG. 36, the turn-over checks 73 are aligned with one another in such a way that an imaginary intersection point is distanced a maximum of 30 mm upstream from the embossing and/or perforation zone in the conveying direction. The imaginary intersection point is indicated by the intersection point 75 of the dashed lines. The embossing and/or perforating zone is indicated by the indicated axis of rotation 77 of two embossing and/or perforating wheels mounted at the same conveying direction height. The preferred maximum upstream distance of the intersection point in the conveying direction from the embossing and/or perforation zone 77 is indicated by the letter f and is preferably a maximum of 30 mm, particularly preferably a maximum of 25 mm, 20 mm, 15 mm, 10 mm or 5 mm. The preferred maximum downstream distance of the intersection point in the conveying direction from the embossing and/or perforation zone 77 is marked with the letter g and is preferably a maximum of 30 mm, 25 mm, 20 mm, 15 mm, 10 mm or 5 mm. Furthermore, the angle at which the turn-over checks 73 run towards each other in conveying direction F is marked with the reference sign α. The distance in the starting material width direction B between the turn-over checks 73 at their downstream end in the conveying direction is indicated by the letter h. The distance between the turn-over checks 73 and the guide wall 65 is indicated by the letter i in FIG. 5.

The features disclosed in the foregoing description, figures, and claims may be significant, both individually and in any combination, for the realization of the disclosure in the various embodiments.

LIST OF REFERENCE SIGNS

1 Apparatus
3 Starting material supply
5 Web-shaped starting material
7 Forming station
9 Stand
11 Convergence channel
13 Embossing and/or perforating station
15, 17 Embossing and/or perforating wheels
19 Separation station
21 Blade
23 Output device
25, 27 Continuous conveyor
29 Adjustable/pivotable limiting wall/cover
31 Conveying wheel on adjustable limiting wall
33 Conveying wheel on guide wall
35 Conveying rollers on adjustable limiting wall
37 Conveying rollers on guide wall
35', 37' Conveying rollers
39 Motor
41 Spring/Bearing/Spacer
43 Wheel shaft
45 U-shaped bearing
47 Spring
49 Tab
51 Nose
53 Bolt
55 Guide recess
57 Pivot axis
59 Hinge
61, 63 Hinge member
65 Limiting wall/guide wall/bottom/mounting plate
67 Side walls
69, 71 Reversing rollers
73 Turn-over cheeks
75 Intersection point
77 Axis of rotation of the embossing and/or perforating wheels
79 Recesses Guide wall
81 Drive shaft
83 Wave limiter/Intermediate wall
85 Recesses Intermediate wall
87 Rod
89 Movability of the drive means
91 Guide wall side attachment section
93 Cover side attachment section
95 Downstream end section of the limiting wall 29 in the conveying direction
97 Gear
99 Section Side walls
100 Packaging product
103, 105 Crumpled cavity
107 Central region/central attachment and/or deformation zone
109 Rotary bearing
111 Panels
113 Outer edge of the cover
115 Jacket
117 Axial extension of the jacket
119 Radial extension of the jacket
121, 121*a*, 121*b* Convergence channel width
123 Axis of rotation
125 Distance
127 Distance
a Width of the packaging product
b Vertical extension of the packaging product
c Length of the packaging product
d Width of the attachment and/or deformation zone
e Vertical extension of the attachment and/or deformation zone
f Upstream distance of the intersection point in the conveying direction
g Downstream distance of the intersection point in the conveying direction
h Downstream distance between turn-over cheeks in the conveying direction
i Distance between turn-over cheeks and guide wall
k Distance between wave limiter and mounting plate
m Wall thickness mounting plate
n Convergence channel length
o Wave limiter length
p Output region
r Radius of curvature side walls
α Angle at which the turn-over cheeks run towards each other
β Angle at which the side walls run towards each other
F Conveying direction
S Starting material thickness direction
B Starting material width direction

The invention claimed is:

1. An apparatus for mechanically producing a three-dimensional packaging product from a web-shaped starting material, comprising:

a forming station including:

a convergence channel configured to transversely compress the starting material;

a conveying device configured to draw off the starting material from a starting material supply arrangeable upstream of the forming station in a conveying direction, the conveying device including at least one drive and a motor configured to drive the at least one drive, wherein the motor comprises a motor output shaft extending longitudinally to the conveying direction and/or projecting out of the motor in a direction opposite to the conveying direction; and a mounting plate configured to guide the starting material entering the forming station on a guide side thereof facing the convergence channel, the at least one drive of the conveying device being rotatably mounted on the mounting plate and the motor driving the at least one drive being attached to the mounting plate.

2. The apparatus according to claim 1, wherein the at least one drive comprises at least one conveying wheel or a conveying roller, an axis of rotation of the at least one conveying wheel or the conveying roller is arranged outside the convergence channel, wherein the at least one conveying wheel or the conveying roller is configured to project into the convergence channel through a recess in the mounting plate by at least 1% and/or at most 45% of a radial extension of the at least one drive beyond the guide side into the convergence channel.

3. The apparatus according to claim 1, wherein the at least one drive is rotatably mounted on a drive shaft extending in a starting material width direction and which is attached to the mounting plate via at least two bearings.

4. The apparatus according to claim 1, wherein the forming station further comprises a gear attached to the mounting plate via which the motor output shaft is coupled to the at least one drive.

5. The apparatus according to claim 1, wherein the mounting plate: has:

a wall thickness of at least 1 mm and at most 12 mm; and/or a flexural fatigue strength of at least 80 N/mm$^2$ and/or of at most 625 N/mm$^2$.

6. The apparatus according to claim 1, wherein the mounting plate has a trapezoidal shape tapering in the conveying direction.

7. The apparatus according to claim 1, wherein two panels running towards each other and the mounting plate form an enclosure of the at least one drive and the motor.

8. The apparatus according to claim 1, wherein the forming station may further comprises: a wave limiter spaced apart from the mounting plate transversely to the conveying direction and configured to delimit the starting material transversely to the conveying direction between the wave limiter and the mounting plate.

9. The apparatus according to claim 8, wherein a length of the convergence channel in conveying direction is defined by a channel input, via which the starting material is drawn into the convergence channel, and a channel output, via which the transversely compressed starting material leaves the convergence channel, the wave limiter extending in the conveying direction in the convergence channel length.

10. The apparatus according to claim 8, wherein the wave limiter comprises at least one rod extending in the conveying direction and spaced apart from the mounting plate transversely to the conveying direction.

11. The apparatus according to claim 8, wherein the wave limiter is attached to a limiting wall of the convergence channel, the limiting wall being adjustable from an operating position, in which the starting material is transversely compressed as the starting material is conveyed through, and a releasing position, in which access into the convergence channel is released.

12. The apparatus according to claim 1, further comprising two side walls delimiting the convergence channel in a starting material width direction transverse to the conveying direction, the two side walls approaching one another in the conveying direction and being configured to turn-in longitudinal edge strips of the starting material passing through the apparatus over the two side walls, wherein turn-over sides of the side walls facing the convergence channel are concavely curved.

13. The apparatus according to claim 1, wherein the at least one drive comprises a jacket configured to engage the starting material to draw off the starting material from the starting material supply.

14. The apparatus according to claim 1, wherein the convergence channel comprises a limiting wall that is pivotable between an operating position, in which the starting material is transversely compressed as it is conveyed through, and a releasing position, in which a distance between the limiting wall and the mounting plate increases.

15. The apparatus according to claim 14, wherein the limiting wall includes at least one further drive configured to engage the starting material when the limiting wall is in the operating position, the at least one further drive being movable relative to the adjustable limiting wall in the operating position.

16. The apparatus according to claim 14, wherein the limiting wall is pivotable about a pivot axis that extends transversely to the conveying direction at an end section of the limiting wall downstream in the conveying direction.

17. A system comprising an apparatus according to claim 1 and the starting material supply, wherein the web-shaped starting material extends from the starting material supply into the forming station.

18. A system comprising an apparatus according to claim 1 and the starting material supply, wherein the starting material supply comprises a starting material roll arranged upstream of the apparatus in the conveying direction, the web-shaped starting material extending from an outer circumference of the starting material roll into the forming station.

19. An apparatus for mechanically producing a three-dimensional packaging product from a web-shaped starting material, comprising:

a forming station including:

a convergence channel configured to transversely compress the starting material;

a conveying device configured to draw off the starting material from a starting material supply arrangeable upstream of the forming station in a conveying direction, the conveying device including at least one drive and a motor configured to drive the at least one drive; and a mounting plate configured to guide the starting material entering the forming station on a guide side thereof facing the convergence channel, the at least one drive of the conveying device being rotatably mounted on the mounting plate and the motor driving the at least one drive being attached to the mounting plate, wherein two panels running towards each other and the mounting plate form an enclosure of the at least one drive and the motor.

20. An apparatus for mechanically producing a three-dimensional packaging product from a web-shaped starting material, comprising:

a forming station including:

a convergence channel configured to transversely compress the starting material;

a conveying device configured to draw off the starting material from a starting material supply arrangeable upstream of the forming station in a conveying direction, the conveying device including at least one drive and a motor configured to drive the at least one drive;

a mounting plate configured to guide the starting material entering the forming station on a guide side thereof facing the convergence channel, the at least one drive of the conveying device being rotatably mounted on the mounting plate and the motor driving the at least one drive being attached to the mounting plate; and a wave limiter spaced apart from the mounting plate transversely to the conveying direction and configured to delimit the starting material transversely to the conveying direction between the wave limiter and the mounting plate, wherein the wave limiter comprises at least one rod extending in the conveying direction and spaced apart from the mounting plate transversely to the conveying direction.

21. An apparatus for mechanically producing a three-dimensional packaging product from a web-shaped starting material, comprising:

a forming station including:

a convergence channel configured to transversely compress the starting material;

a conveying device configured to draw off the starting material from a starting material supply arrangeable upstream of the forming station in a conveying direction, the conveying device including at least one drive and a motor configured to drive the at least one drive;

two turn-over cheeks extending towards one another in the conveying direction around, the turn-over cheeks being configured to turn over longitudinal edge strips of the starting material passing through the convergence channel; and a mounting plate configured to guide the starting material entering the forming station on a guide side thereof facing the convergence channel, the at least one drive of the conveying device being rotatably mounted on the mounting plate and the motor driving the at least one drive being attached to the mounting plate, wherein the turn-over cheeks are attached to a limiting wall of the convergence channel, the limiting wall and the turn-over cheeks being adjustable between an operating position, in which the starting material is transversely compressable as it is conveyed through, and a releasing position, in which the limiting wall and the turn-over cheeks are moved away from the mounting plate; and embossing and/or perforating station downstream of the forming station in the conveying direction, the embossing and/or perforating station being configured to connect, in an embossing and/or perforating zone, the turned-over longitudinal edge strips are connected to a central region of the starting material.

22. An apparatus for mechanically producing a three-dimensional packaging product from a web-shaped starting material, comprising:

a forming station including:

a convergence channel configured to transversely compress the starting material;

a conveying device configured to draw off the starting material from a starting material supply arrangeable upstream of the forming station in a conveying direction, the conveying device including at least one drive and a motor configured to drive the at least one drive; and a mounting plate configured to guide the starting material entering the forming station on a guide side thereof facing the convergence channel, the at least one drive of the conveying device being rotatably mounted on the mounting plate and the motor driving the at least one drive being attached to the mounting plate, wherein the motor and/or a gear of the forming station are attached to the mounting plate in a starting material width direction between two rotatably mounted drives of the at least one drive.

* * * * *